United States Patent [19]
Imagi et al.

[11] Patent Number: 5,650,697
[45] Date of Patent: Jul. 22, 1997

[54] MOTOR UNIT, MOTOR DRIVE UNIT, FAN UNIT AND METHOD OF CONTROLLING THE MOTOR DRIVE UNIT

[75] Inventors: Akihiko Imagi; Yoshio Yoshikuwa, both of Hyogo; Takuo Akiyama, Shizuoka; Norikazu Ishikawa, Shizuoka; Tatsunao Hayashida, Shizuoka; Yu Hasegawa, Shizuoka; Kenshi Kawagishi, Shizuoka; Kazuyuki Mitsushima, Shizuoka; Haruhiko Ishida, Shizuoka; Hidekazu Totsuka, Shizuoka, all of Japan

[73] Assignee: Mitsubishi Denki Kabushiki Kaisha, Tokyo, Japan

[21] Appl. No.: 477,786

[22] Filed: Jun. 7, 1995

[30] Foreign Application Priority Data

Dec. 7, 1994 [JP] Japan .................................. 6-303778
Apr. 27, 1995 [JP] Japan .................................. 7-103669

[51] Int. Cl.$^6$ ...................................................... H02P 7/36
[52] U.S. Cl. ........................ 318/254; 318/439; 318/751; 318/772
[58] Field of Search ............................ 318/254, 138, 318/439, 751, 752, 772

[56] References Cited

FOREIGN PATENT DOCUMENTS 61-240874  10/1986  Japan .
62-239895  10/1987  Japan .
5-328790   12/1993  Japan .

Primary Examiner—Brian Sircus
Attorney, Agent, or Firm—Oblon, Spivak, McClelland, Maier & Neustadt, P.C.

[57] ABSTRACT

The improved motor drive unit includes a zero-crossing voltage detector circuit composed of components (7) to (12) for detecting whether the voltage from an AC power supply (1) is zero-crossing and a switching circuit for performing on-off control by means of a thyristor 27 so as to switch between energization and de-energization of the AC power supply to a motor (2) and controls the speed of the motor by changing the ratio between the times of energization and de-energization of the AC power supply to the motor. The start of energization coincides with the zero-crossing of the AC power supply voltage whereas the timing of end of energization coincides with the zero-crossing of an energization current by means of the thyristor and wherein the energization time is fixed at a value either equal to or twice the power supply period whereas the de-energization time is varied in units that are integral multiples of one half the power supply period. If desired, a plurality of patterns for percent energization may be combined to attain a desired percent energization. Alternatively, a plurality of patterns that are equal in the ratio between the energization and de-energization times are used in combination. Only the main winding in the motor is preferably controlled for optimal energization.

24 Claims, 42 Drawing Sheets

FIG. 3A

| DRIVE PATTERN | | PERCENT ENERGIZATION | ROTATIONAL SPEED (r/min) | FUNDAMENTAL FREQUENCY OF ON-OFF CYCLES (Hz) |
|---|---|---|---|---|
| ON | OFF | | | |
| 2 | 0 | 100 | 674 | 30 |
| 2 | 1 | 84 | 563 | 20 |
| 2 | 2 | 75 | 509 | 15 |
| 2 | 4 | 67 | 428 | 10 |

FIG. 3B

| DRIVE PATTERN | | PERCENT ENERGIZATION | FUNDAMENTAL FREQUENCY OF ON-OFF CYCLES (Hz) |
|---|---|---|---|
| ON | OFF | | |
| 1 | 0 | 100 | 60 |
| 1 | 0.5 | 84 | 40 |
| 1 | 1 | 75 | 30 |
| 1 | 2 | 67 | 20 |

FIG. 36

| PATTERN 1 CYCLE NO. | | PATTERN 2 CYCLE NO. | | PATTERN 3 CYCLE NO. | | PATTERN 4 CYCLE NO. | | PERCENT ENERGIZATION |
|---|---|---|---|---|---|---|---|---|
| ON | OFF | ON | OFF | ON | OFF | ON | OFF | |
| 2 | 0 | 2 | 0 | 2 | 0 | 2 | 0 | 100 |
| 2 | 0 | 2 | 0 | 2 | 0 | 2 | 1 | 95.8 |
| 2 | 0 | 2 | 1 | 2 | 0 | 2 | 1 | 91.7 |
| 2 | 0 | 2 | 1 | 2 | 1 | 2 | 1 | 87.5 |
| 2 | 1 | 2 | 1 | 2 | 1 | 2 | 1 | 83.3 |
| 2 | 1 | 2 | 1 | 2 | 1 | 2 | 2 | 81.3 |
| 2 | 1 | 2 | 2 | 2 | 1 | 2 | 2 | 79.2 |
| 2 | 1 | 2 | 2 | 2 | 2 | 2 | 2 | 77.1 |
| 2 | 2 | 2 | 2 | 2 | 2 | 2 | 2 | 75.0 |
| 2 | 2 | 2 | 2 | 2 | 2 | 2 | 3 | 73.8 |
| 2 | 2 | 2 | 3 | 2 | 2 | 2 | 3 | 72.5 |
| 2 | 2 | 2 | 3 | 2 | 3 | 2 | 3 | 71.3 |
| 2 | 3 | 2 | 3 | 2 | 3 | 2 | 3 | 70.0 |
| 2 | 3 | 2 | 3 | 2 | 3 | 2 | 4 | 69.2 |
| 2 | 3 | 2 | 4 | 2 | 3 | 2 | 4 | 68.3 |
| 2 | 3 | 2 | 4 | 2 | 4 | 2 | 4 | 67.5 |
| 2 | 4 | 2 | 4 | 2 | 4 | 2 | 4 | 66.7 |

FIG. 62
PRIOR ART

| TOTAL ON-CYCLE NUMBER | CYCLE NO. IN PATTERN 1 | | CYCLE NO. IN PATTERN 2 | | CYCLE NO. IN PATTERN 3 | | CYCLE NO. IN PATTERN 4 | | PERCENT ENERGIZATION |
|---|---|---|---|---|---|---|---|---|---|
| | ON | OFF | ON | OFF | ON | OFF | ON | OFF | |
| 24 | 6 | 0 | 6 | 0 | 6 | 0 | 6 | 0 | 100 |
| 23 | 6 | 0 | 6 | 0 | 6 | 0 | 5 | 1 | 95.8 |
| 22 | 6 | 0 | 5 | 1 | 6 | 0 | 5 | 1 | 91.7 |
| 21 | 6 | 0 | 5 | 1 | 5 | 1 | 5 | 1 | 87.5 |
| 20 | 5 | 1 | 5 | 1 | 5 | 1 | 5 | 1 | 83.3 |
| 19 | 5 | 1 | 5 | 1 | 5 | 1 | 4 | 2 | 79.2 |
| 18 | 5 | 1 | 4 | 2 | 5 | 1 | 4 | 2 | 75.0 |
| 17 | 5 | 1 | 4 | 2 | 4 | 2 | 4 | 2 | 70.8 |
| 16 | 4 | 2 | 4 | 2 | 4 | 2 | 4 | 2 | 66.7 |
| 15 | 4 | 2 | 4 | 2 | 4 | 2 | 3 | 3 | 62.5 |
| 14 | 4 | 2 | 3 | 3 | 4 | 2 | 3 | 3 | 58.3 |
| 13 | 4 | 2 | 3 | 3 | 3 | 3 | 3 | 3 | 54.2 |
| 12 | 3 | 3 | 3 | 3 | 3 | 3 | 3 | 3 | 50.0 |
| 11 | 3 | 3 | 3 | 3 | 3 | 3 | 2 | 4 | 45.8 |
| 10 | 3 | 3 | 2 | 4 | 3 | 3 | 2 | 4 | 41.7 |
| 9 | 3 | 3 | 2 | 4 | 2 | 4 | 2 | 4 | 37.5 |
| 8 | 2 | 4 | 2 | 4 | 2 | 4 | 2 | 4 | 33.3 |
| 7 | 2 | 4 | 2 | 4 | 2 | 4 | 1 | 5 | 29.2 |
| 6 | 2 | 4 | 1 | 5 | 2 | 4 | 1 | 5 | 25.0 |
| 5 | 2 | 4 | 1 | 5 | 1 | 5 | 1 | 5 | 20.8 |

MOTOR UNIT, MOTOR DRIVE UNIT, FAN UNIT AND METHOD OF CONTROLLING THE MOTOR DRIVE UNIT

BACKGROUND OF THE INVENTION

1. Field of the Invention

The present invention relates to a motor unit that turns a switch on and off to perform cyclic motor energization and de-energization so that a single-phase or polyphase motor is driven with the number of revolutions that corresponds to the relevant percent energization. The invention also relates to an associated motor drive unit, a method of its control, and a fan unit.

2. Description of the Related Art

FIG. 59 is a circuit diagram illustrating a prior art motor drive unit as typically described in Japanese Patent Application No. 62-239895. Referring to FIG. 59, numeral 1 designates a commercial AC power supply of 100 V, 2 is a fan motor, 3 is a power transformer, 4 is a diode bridge, 5 is an electrolytic capacitor, and 6 is a three-terminal regulator. The diode bride 4, electrolytic capacitor 5 and three-terminal regulator 6 combine to form a constant-voltage power supply circuit.

Numerals 7 and 8 designate diodes, 9, 10 and 12 are resistors, and 11 is a transistor. Diodes 7 and 8, resistors 9, 10 and 12, and transistor 11 combine to form a zero-crossing detector circuit.

When the AC 100 V power supply 1 is zero-crossing, the potential difference across the secondary winding of the power transformer 3 is almost equal to zero, so the potential at either terminal of the secondary winding is lower than the GND level at the output of diode bridge 4 (i.e., the negative terminal of electrolytic capacitor 5). The GND level is normally higher than the lower of the potentials at the two terminals of the secondary winding of power transformer 3 and the difference is equivalent to the forward voltage at the diode in the diode bridge 4. Therefore, both diodes 7 and 8 will be reverse-biased and no base current can flow through transistor 11. Hence, transistor 11 is off and pull-up resistor 12 allows the collector potential of transistor 11 to be equal to the supply voltage of microcomputer 13, thereby developing "H" (high) level.

When the AC 100 V power supply 1 is not zero-crossing, the potential at either terminal of the secondary winding of power transformer 3 becomes higher than the potential at the other terminal and a base current will flow through diode 7 or 8 and resistor 9, causing transistor 11 to turn on; as a result, the collector potential of this transistor is on (at GND level), thereby developing "L" (low) level.

Thus, the collector potential of transistor 11 can be used as an indicator for detecting whether the AC 100 V power supply 1 is zero-crossing or not.

Shown by 13 in FIG. 59 is a microcomputer as an electronic circuit for controlling the percent energization of fan motor 2. The microcomputer has a power supply terminal P1, which is given an output (Vcc) from the constant-voltage power supply circuit composed of diode bridge 4, electrolytic capacitor 5 and three-terminal regulator 6. The microcomputer 13 also has a ground terminal P2 connected to GND (0 V), an input terminal P3 which is connected to the collector of transistor 11 (i.e., the output terminal of the zero-crossing detector circuit composed of diodes 7 and 8, resistors 9, 10 and 12, and transistor 11), and an output terminal P4 which is connected via resistor 18 to resistor 19 and the base of transistor 20. Shown by 22a is the light-emitting side of a photo-triac coupler and couples optically to the light-receiving side 22b of the coupler, which is an integral combination of 22a and 22b. The microcomputer 13 has an external input terminal P5 at which a command is entered to signal the percent energization of the electronic control circuit composed of the microcomputer 13. In the case under consideration, terminal P5 is controlled with another microcomputer.

If the output terminal P4 of microcomputer 13 becomes "H", transistor 20 will turn on and a trigger current will flow to the light-emitting side 22a of the photo-triac coupler, causing the light-receiving side 22b to turn on. As a result, a gate trigger circuit for triac 27 that is composed of resistors 23 and 24 is closed and the triac 27 which composes a switching circuit together with the gate trigger circuit turns on to energize fan motor 2.

When the output terminal P4 of microcomputer 13 is "L", transistor 20 is off and no trigger current will flow to the light-emitting side 22a of the photo-triac coupler; hence, the light-receiving side 22b of the photo-triac coupler will turn off and the gate trigger circuit will open, whereupon the triac 27 turns off. Hence, fan motor 2 is not energized. Shown by 25 and 26 are a resistor and a capacitor, respectively, which combine to compose a snubber circuit for the triac 27.

We now describe specific means for controlling a fan motor. As described in a prior art publication, "HANDBOOK OF ELECTRIC ENGINEERING", 1988 Edition, Section 16, pages 724 to 725, phase control is a technique widely adopted as means for achieving variable speed control of capacitor motors. An energization waveform and other waveforms related to phase control are shown by time charts as Prior Art Case 1 in FIG. 60. Referring to FIG. 60, numeral 28 indicates the waveform from the AC 100 V power supply 1; numeral 29 indicates the waveform of a zero-crossing signal to input terminal P3 of microcomputer 13; numeral 30 indicates the waveform to output terminal P4 of microcomputer 13; and numeral 31 indicates the waveform of a current being applied to energize fan motor 2 (which may be called the "energization waveform").

If the time from zero-crossing to the turning-on of triac 27 is written as $\beta$, one can control not only the power to be supplied to the motor but also the number of its revolutions by adjusting the value of $\beta$. For example, full energization is achieved if $\beta$ is zero but there will be not energization at all if $\beta$ is equal to one half the power source period. FIG. 60 refers to the case where $\beta$ is a quarter of the power source period and the power to be supplied to the motor is adjusted to be about one half the value from the power supply 1.

FIG. 61 shows various waveforms for illustrating Prior Art Case 2 which is described in Japanese Patent Application No. 62-239895, and FIG. 62 is a memory map showing patterns for energization of fan motor 2.

In order to realize the most appropriate percent energization for attaining the number of revolutions of fan motor 2 that is determined by control factors such as time and the temperature of the heat exchanger in a heater, the microcomputer 13 will energize fan motor 2 in accordance with patterns typically described in the FIG. 62 memory map. The memory map has patterns that consist of a total of 24 cycles for each value of energization from the AC 100 V power supply 1, and every shift from one on-off pattern to the next is made after 6 cycles (24 cycles divided by 4).

Consider, for example, the case of 83.3% energization. Fan motor 2 is energized according to the following patterns in the memory map;

5 cycles ON and 1 cycle OFF 5 cycles ON and 1 cycle OFF 5 cycles ON and 1 cycle OFF 5 cycles ON and 1 cycle OFF Since the total number of energization cycles is 20 (=5+5+5 +5) out of the 24 cycles, the percent energization is 20/24 =0.833.

If 20.8% energization is necessary, fan motor 2 is energized according to the following patterns in the memory map;

2 cycles ON and 4 cycles OFF 1 cycle ON and 5 cycles OFF 1 cycle ON and 5 cycles OFF 1 cycle ON and 5 cycles OFF Since the total number of energization cycles is 5 (=2+1+1+1) out of the 24 cycles, the percent energization is 5/24 =0.208.

As is also clear from FIG. 62, energization or de-energization cycles occur in a minimum unit of one.

Problems to be Solved by the Invention:

Being constructed in the manner described above, the prior art motor unit and motor drive unit have suffered from the noise problem during the driving of the motor. The present inventors conducted extensive studies on the development of noise and have found the following possible causes.

First, in Prior Art Case 1, switching at a frequency of $2f$ causes torque pulsations in the capacitor motor at $2f$ and at integral multiples of $2f$, thereby developing magnetic sound at $2f$ and at integral multiples of $2f$. Additionally, the capacitor motor normally turns on at times that are offset from zero-crossing points of the supply voltage and, hence, at the moment the motor turns on, a current will flow so abruptly that a great vibrational force and a large magnetic sound will occur.

Secondary, in Prior Art Case 2, 5 or more ON cycles are employed in the range of "high values of percent energization" as shown in FIG. 62 and, in those periods where 5 or more ON cycles occurs, the capacitor motor will experience $2f$ torque pulsations and produce $2f$ magnetic sound. Additionally, the basic number of cycles for the shift from one ON-OFF pattern to the next is 6 and, therefore, if the supply frequency (f) is 60 Hz, ON and OFF cycles will be repeated at every 10 Hz. With such low repetition frequency, ON and OFF cycles may occasionally be discernible by the auditory sense and will produce intermittent sounds that jar on the ear as noise.

Additionally, if mechanical resonance occurs in a single-phase or polyphase motor or when the main and auxiliary windings on a single-phase motor are simultaneously subjected to control over energization and de-energization, a magnet center displacement and other defects will cause the shaft of the fan motor to vibrate greatly in the axial direction, producing abnormal vibrations as exemplified by the occurrence of a "tapping" sound.

The conventional method of controlling the number of revolutions of a motor has had another problem in that noise and vibrations occur during the drive of the motor. A cause of the occurrence of noise and vibrations is that since motor energization is subjected to cyclic on-off control in accordance with predetermined patterns in a memory map, the repetition is occasionally discernible as a "tapping" sound by the auditory sense and the base frequency due to the repetition of ON and OFF cycles causes noise and vibrations.

Additionally, the fan being driven by the motor produces continual "swishes" that also jar on the ear.

SUMMARY OF THE INVENTION

The present invention has been accomplished under these circumstances and has as an object attenuating the noise that occurs during the driven of a motor or eliminating any sound that jars on the ear.

Another object of the present invention which has been accomplished under the circumstances described above is to attenuate the vibrations and other abnormal phenomena that occur during the drive of a motor.

Means for Solving the Problems:

An first aspect of the invention has been achieved by the provision of a motor drive unit that includes a zero-crossing voltage detector circuit for detecting whether the voltage from an AC power supply is zero-crossing and a switching circuit for performing on-off control so as to switch between energization and de-energization of the AC power supply to a motor and which controls the speed of said motor by changing the ratio between the times of energization and de-energization of the AC power supply to said motor. The improvement is that the timing of start of energization is allowed to coincide with the timing of zero-crossing of said AC power supply voltage whereas the timing of end of energization is allowed to coincide with the zero-crossing of an energization current by means of said switching circuit and that said energization time is fixed at a value either equal to or twice the power supply period whereas said de-energization time is varied in units that are integral multiples of one half said power supply period.

A second aspect of the invention has been achieved by the provision of a motor drive unit according to the first apsect of the invention wherein a plurality of patterns for percent energization that are attained by varying the de-energization time in units that are integral multiples of one half said power supply period while the energization time is fixed at a value either equal to or twice said power supply period are combined to attain a desired percent energization.

A third aspect of the invention has been achieved by the provision of a motor drive unit that includes a zero-crossing voltage detector circuit for detecting whether the voltage from an AC power supply is zero-crossing and a switching circuit for performing on-off control so as to switch between energization and de-energization of the AC power supply to a motor and which controls the speed of the motor by changing the ratio between the times of energization and de-energization of the AC power supply to said motor. The improvement is that the timing of start of energization is allowed to coincide with the timing of zero-crossing of said AC supply voltage whereas the timing of end of energization is allowed to coincide with the zero-crossing of an energization current by means of said switching circuit and that a plurality of patterns that are equal in the ratio between said energization and de-energization times are used in combination.

A fourth aspect of the invention has been achieved by the provision a motor drive unit according to the first, second or third aspect of the invention wherein the motor is a single-phase capacitor motor having the main winding and an auxiliary winding that is to be energized via a capacitor and wherein the ratio between the time of energization of said main winding from the AC power supply and the time of de-energization is varied.

A fifth aspect of the invention has been achieved by the provision of a motor unit comprising a motor, an AC power supply of an energization current to said motor, a switching circuit by which the energization from said AC power supply is turned on off so that the motor is energized or de-energized, and a drive unit that controls the turning on and off of said switching circuit so as to vary the ratio between the energization and de-energization cycles; said drive unit controls the speed of the motor by varying said de-energization or energization cycle in units that are integral multiples of one half the cycle period of said AC power supply while said energization or de-energization cycle is fixed at a predetermined value that is an integral multiple of one half the cycle period of said AC power supply.

A sixth aspect of the invention has been achieved by the provision of a motor unit according to the fifth aspect of the invention wherein said drive unit controls the speed of the motor by varying said de-energization or energization cycle in units that are integral multiples of one half the cycle period of said AC power supply while said energization or de-energization cycle is fixed at a predetermined value that is an integral multiple of one half the cycle period of said AC power supply, said predetermined value being selected in such a way that the fundamental frequency at which the switching circuit is turned on or off is at least 15 Hz over of the range of high values of percent energization of said motor.

A seventh aspect of the invention has been achieved by the provision of a motor unit according to the sixth aspect of the invention wherein a plurality of patterns for percent energization that are based on at least two kinds of the predetermined value are combined to attain a desired percent energization.

An eighth aspect of the invention has been achieved by the provision of a motor unit according to the fifth aspect of the invention wherein said drive unit controls the speed of the motor by varying said de-energization or energization cycle in units that are integral multiples of one half the cycle period of said AC power supply while said energization or de-energization cycle is fixed at a predetermined value that is an integral multiple of one half the cycle period of said AC power supply, and wherein a plurality of patterns that are equal in the ratio between said energization and de-energization cycles are set on the basis of at least two kinds of the predetermined value, said respective patterns being selectively used in order.

A ninth aspect of the invention has been achieved by the provision of a method of controlling a motor drive unit that feeds an energization current to a motor from an AC power supply and which turns on and off the energization from said AC power supply by means of a switching circuit so that said motor is energized and de-energized, with the speed of said motor being controlled by varying the ratio between said energization and de-energization cycles. The improvement is that the method comprises the step of providing a plurality of patterns for attaining the same percent energization that are equal in the ratio between said energization and de-energization cycles, and the step of selecting a specified pattern from said plurality of patterns and setting the thus selected patterns to control the speed of said motor.

A tenth aspect of the invention has been achieved by the provision of a control method according to the ninth aspect of the invention which includes the step of selecting as said specified pattern a pattern for producing small noise or vibrations during motor running.

An eleventh aspect of the invention has been achieved by the provision of a fan unit comprising a fan, a motor for driving said fan, an AC power supply of an energization current to said motor, a switching circuit that turns on and off the energization from said AC power supply so as to energize and de-energize the motor, and a drive unit for controlling the turning on and off of said switching circuit so as to vary the ratio between the energization and de-energization cycles; said drive unit varies the speed of the motor by varying either said energization cycle or said de-energization cycle or both cycles in units that are integral multiples of one half the cycle period of said AC power supply; the ratio between said energization and de-energization cycles is set in such a way that the fundamental frequency at which said switching circuit is turned on or off lies within a predetermined range over the high range of speeds to be controlled by said drive unit.

A twelfth aspect of the invention has been achieved by the provision of a fan unit according to the eleventh aspect of the invention wherein said predetermined range is such that said fundamental frequency lies between 15 and 30 Hz.

A thirteenth aspect of the invention has been achieved by the provision of a fan unit comprising a fan, a motor for driving said fan, an AC power supply of an energization current to said motor, a switching circuit that turns on and off the energization from said AC power supply so as to energize and de-energize the motor, and a drive unit for controlling the turning on and off of said switching circuit so as to vary the ratio between the energization and de-energization cycles; said drive unit varies the percent energization to the motor by varying either said energization cycle or said de-energization cycle or both cycles in units that are integral multiples of one half the cycle period of said AC power supply; the ratio between said energization and de-energization cycles is set in such a way that the patterns in which said switching circuit is turned on and off lies within the range from 4 to 2 cycles over the high range of percent energization to be controlled by said drive unit.

A fourteenth aspect of the invention has been achieved by the provision of a fan unit according to the eleventh, twelfth or thirteenth aspect of the invention wherein means for supporting the motor is adapted to have a natural frequency of no more than 100 Hz.

A fifteenth aspect of the invention has been achieved by the provision of a fan unit according to the eleventh, twelfth or thirteenth aspect of the invention which is so constructed that an axial force is applied to the shaft of the motor.

A sixteenth aspect of the invention has been achieved by the provision of a method of controlling a motor drive that feeds an energization current to a motor from an AC power supply and which turns on and off the energization from said AC power supply by means of a switching circuit so that said motor is energized and de-energized, with the speed of said motor being controlled by varying the ratio between said energization and de-energization cycles. The improvement is that either said energization cycle or said de-energization cycle or both cycles are changed randomly for a plurality of times in units that are integral multiples of one half the power supply period and that the average for said plurality of times is used to attain a desired percent energization, thereby controlling the speed of said motor.

A seventeenth aspect of the invention has been achieved by the provision of a method of controlling a motor drive unit that includes a zero-crossing voltage detector circuit for detecting whether the voltage from an AC power supply is zero-crossing and a switching circuit for performing on-off control so as to switch between energization and de-energization of the AC power supply to a motor and which controls the speed of the motor by changing the ratio between the times of energization and de-energization of the AC supply to said motor. The improvement is that the timing of start of energization is allowed to coincide with the timing of zero-crossing of said AC power supply voltage whereas the timing of end of energization is allowed to coincide with the zero-crossing of an energization current by means of said switching circuit and that a desired percent energization is attained by changing randomly either said energization time or said de-energization time or both times in units that are integral multiples of one half the power supply period.

An eighteenth aspect of the invention has been achieved by the provision of a control method according to the sixteenth or seventeenth aspect of the invention wherein either the energization cycle or the de-energization cycle or both cycles, or either the energization time or the de-energization time or both times are changed randomly in units that are integral multiples of one half the power supply period, randomly on the randomly obtained numeric value and the numeric value that is obtained by either adding said randomly obtained numeric value to a predetermined value or subtracting said randomly obtained numeric value from said predetermined value are combined to attain the desired percent energization.

A nineteenth aspect of the invention has been achieved by the provision of a control method according to the sixteenth or seventeenth aspect of the invention wherein either the energization cycle or the de-energization cycle or both cycles, or either the energization time or the de-energization time or both times are changed randomly in units that are integral multiples of one half the power supply period, and wherein the randomly obtained numeric value is selected from among numeric values in a predetermined range.

A twentieth aspect of the invention has been achieved by the provision of a control method according to the sixteenth or seventeenth aspect of the invention wherein either the energization cycle or the de-energization cycle or both cycles, or either the energization time or the de-energization time or both times are changed randomly in units that are integral multiples of one half the power supply period, and wherein the randomly obtained numeric value is selected from among numeric values in a predetermined range and subsequently processed to undergo a certain change.

A 21st of the invention has been achieved by the provision of a control method according to any one of the sixteenth to twentieth aspects of the invention wherein both the energization and de-energization cycles or both the energization and de-energization times are multiplied by an integer so as to increase the number of patterns for the appearance of random numbers.

A 22nd aspect of the invention has been achieved by the provision of a control method according to any one of sixteenth to 21st aspects of the invention wherein both the energization and de-energization cycles or both the energization and de-energization times are controlled randomly.

A 23rd aspect of the invention has been achieved by the provision of a motor unit comprising a motor, an AC power supply of an energization current to said motor, a switching circuit by which the energization from said AC power supply is turned on and off so that the motor is energized and de-energized, and a drive unit that controls the turning on and off of said switching circuit so as to vary the ratio between the energization and de-energization cycles; said drive unit randomly changes either said energization cycle or said de-energization cycle or both cycles for a plurality of times in units that are integral multiples of one half the power supply period; and the average for said plurality of times is used to attain a desired percent energization so as to control the speed of said motor, which is a single-phase motor having the main winding and an auxiliary winding that is to be energized via a capacitor.

A 24th aspect of the invention has been achieved by the provision of a motor unit comprising a motor, an AC power supply of an energization current to said motor, a switching circuit by which the energization from said AC power supply is turned on and off so that the motor is energized and de-energized, and a drive unit that controls the turning on and off of said switching circuit so as to vary the ratio between the energization and de-energization cycles; said drive unit randomly changes either said energization cycle or said de-energization cycle or both cycles for a plurality of times in units that are integral multiples of one half the power supply period; and the average for said plurality of times is used to attain a desired percent energization so as to control the speed of said motor, which has a multi-contact tap lead connected from a winding so that it can be selectively used depending upon the value of the desired percent energization.

Operation:

In the first aspect of the invention, the timing of start of energization is allowed to coincide with the timing of zero-crossing of an AC power supply whereas the timing of end of energization is allowed to coincide with the zero-crossing of an energization current by means of a thyristor; in addition, the energization time is fixed at a value either equal to or twice the power supply period whereas the de-energization time is varied in units that are integral multiples of one half said power supply period. Since the ON cycles can be fixed at a smaller cycle number, the number of ON cycles can be reduced, whereby the fundamental frequency of ON-OFF cycles can be set a sufficiently high value to suppress the amplitude of vibrations caused by the vibrational force that develops upon ON-OFF operations.

In the second aspect of the invention, a plurality of patterns for percent energization that are attained by varying the de-energization time in units that are integral multiples of one half the power supply period while fixing the energization time at a value either equal to or twice said power supply period are combined to attain a desired percent energization. This technique is effective for controlling the motor speed in a fine manner.

In third aspect of the invention, the timing of start of energization is allowed to coincide with the timing of zero-crossing of an AC supply voltage whereas the timing of end of energization is allowed to coincide with the zero-crossing of an energization current by means of a thyristor; in addition, a plurality of patterns that are equal in the ratio between the energization and de-energization times are used in combination. Since this is effective in dispersing the fundamental frequency of ON-OFF cycles, the continual sound that occurs if due to repeated ON-OFF operations at frequencies near 10 Hz can be attenuated. Dispersing the fundamental frequency of ON-OFF cycles is also effective in dispersing the dominance of a specific frequency in torque pulsations, thereby attenuating the development of unwanted magnetic sound.

In the fourth aspect of the invention, the ratio between the time of energization of the main winding, rather than the auxiliary winding, on the motor from the AC power supply and the time of de-energization is varied; hence, the abnormal "tapping" sound which occurs when the motor shaft is significantly vibrated during the turning on or off of the energization can be attenuated.

In the fifth aspect of the invention, the motor speed is controlled by varying the de-energization or energization cycle in units that are integral multiples of one half the cycle period of an AC power supply while the energization or de-energization cycle is fixed at a predetermined value that is an integral multiple of one half the cycle period of the AC power supply. This is effective in reducing the 2f torque pulsations that will occur to the motor.

According to the sixth aspect of the invention, when controlling the motor speed by varying the de-energization or energization cycle in units that are integral multiples of one half the cycle period of an AC power supply while the energization or de-energization cycle is fixed at a predetermined value that is an integral multiple of one half the cycle period of said AC power supply, the predetermined value is selected in such a way that the fundamental frequency at which a switching circuit is turned on or off is at least 15 Hz over the range of high values of percent energization to the motor. As a result, the development of continual sounds at an increased rotational speed can be prevented.

In the seventh aspect of the invention, a plurality of patterns for percent energization that are based on at least two kinds of the predetermined value are combined to attain a desired percent energization. This enables an operation in a finely controlled manner.

According to the eighth aspect of the invention, the motor speed is also controlled by varying the de-energization or energization cycle in units that are integral multiples of one half the cycle period of an AC power supply while the energization or de-energization cycle is fixed at a predetermined value that is an integral multiple of one half the cycle period of the AC power supply, but in this case a plurality of patterns that are equal in the ratio between the energization and de-energization cycles are set on the basis of at least two kinds of the predetermined value and the respective patterns are selectively used in order.

In the ninth aspect of the invention, a plurality of patterns for attaining the same percent energization that are equal in the ratio between the energization and de-energization cycles are provided and a specified pattern is selected from said plurality of patterns and the thus selected pattern is set. This approach provides freedom in combining various kinds of motors and drive units.

In the tenth aspect of the invention, a pattern for the development of small noise or vibrations during motor running can be selected as the predetermined patterns, thereby enabling an operation under optimal conditions.

In the eleventh aspect of the invention, the motor speed is varied by varying either the energization cycle or the de-energization cycle or both cycles in units that are integral multiples of one half the cycle period of an AC power supply and, in addition, the ratio between the energization and de-energization cycles is set in such a way that the fundamental frequency at which a switching circuit is turned on or off lies within a predetermined range over the high range of speeds under control.

In the twelfth aspect of the invention, the fundamental frequency at which the switching circuit is turned on or off lies between 15 and 30 Hz.

In the thirteenth aspect of the invention, the ratio between the energization and de-energization cycles is set in such a way that the patterns in which the switching circuit is turned on and off lie within the range from 4 to 2 cycles over the high range of percent energization under control.

In the fourteenth aspect of the invention, the system for supporting the motor load is adapted to have a natural frequency of no more than 100 Hz.

In the fifteenth aspect of the invention, a fan unit is so constructed that an axial force is applied to the shaft of the motor.

In the sixteenth aspect of the invention, the ratio between the energization and de-energization cycles is varied by randomly changing either the energization cycle or the de-energization cycle or both cycles in units that are integral multiples of one half the power supply period; this is effective in dispersing the frequency of ON-OFF cycles.

In the seventeenth aspect of the invention, the timing of start of energization is allowed to coincide with the timing of zero-crossing of an AC power supply voltage whereas the timing of end of energization is allowed to coincide with the zero-crossing of an energization current by means of a switching circuit; in addition, the patterns of energization are varied by changing randomly either the energization time or the de-energization time or both times in units that are integral multiples of one half the power supply period. This is effective in dispersing the base frequency.

According to the eighteenth aspect of the invention, either the energization cycle or the de-energization cycle or both cycles, or either the energization time or the de-energization time or both times are changed randomly in units that are integral multiples of one half the power supply period and by combining the randomly obtained numeric value with the numeric value that is obtained by either adding said randomly obtained numeric value to a predetermined value or subtracting said randomly obtained numeric value from said predetermined value, a desired percent energization can easily be attained.

In the nineteenth aspect of the invention, either the energization cycle or the de-energization cycle or both cycles, or either the energization time or the de-energization time or both times are changed randomly in units that are integral multiples of one half the power supply period, and the randomly obtained numeric value is selected from among numeric values in a predetermined range that can provide the desired percent energization.

In the twentieth aspect of the invention, either the energization cycle or the de-energization cycle or both cycles, or either the energization time or the de-energization time or both times are changed randomly in units that are integral multiples of one half the power supply period, and the randomly obtained numeric value is selected from among numeric values in a predetermined range and multiplied by a coefficient for providing a certain change, thereby rendering the effect of random numbers variable.

In the 21st aspect of the invention, both the energization and de-energization cycles or both the energization and de-energization times are multiplied by an integer so as to increase the number of patterns for the appearance of random numbers, thereby ensuring that they will not become monotonous.

In the 22nd aspect of the invention, both the energization and de-energization cycles or both the energization and de-energization times are controlled randomly to attain a desired percent energization.

In the 23rd aspect of the invention, the average for a plurality of random changes in either the energization cycle or the de-energization cycle or both cycles is used to attain a desired percent energization for controlling the speed of a single-phase motor.

In the 24th aspect of the invention, a motor is used that has a multi-contact tap lead connected from a winding so that it can be selectively used depending upon the value of the desired percent energization, thereby insuring effective damping of vibrations over the entire operating frequency range from low to high values.

BRIEF DESCRIPTION OF THE DRAWINGS

FIGS. 3A and 3B illustrate the contents of the memory map stored in the electronic control circuit in the motor drive unit of Example 1 of the invention;

FIG. 36 illustrates the contents of the memory map stored in the electronic control circuit in the motor drive unit of Example 2 of the invention;

Figure 49:
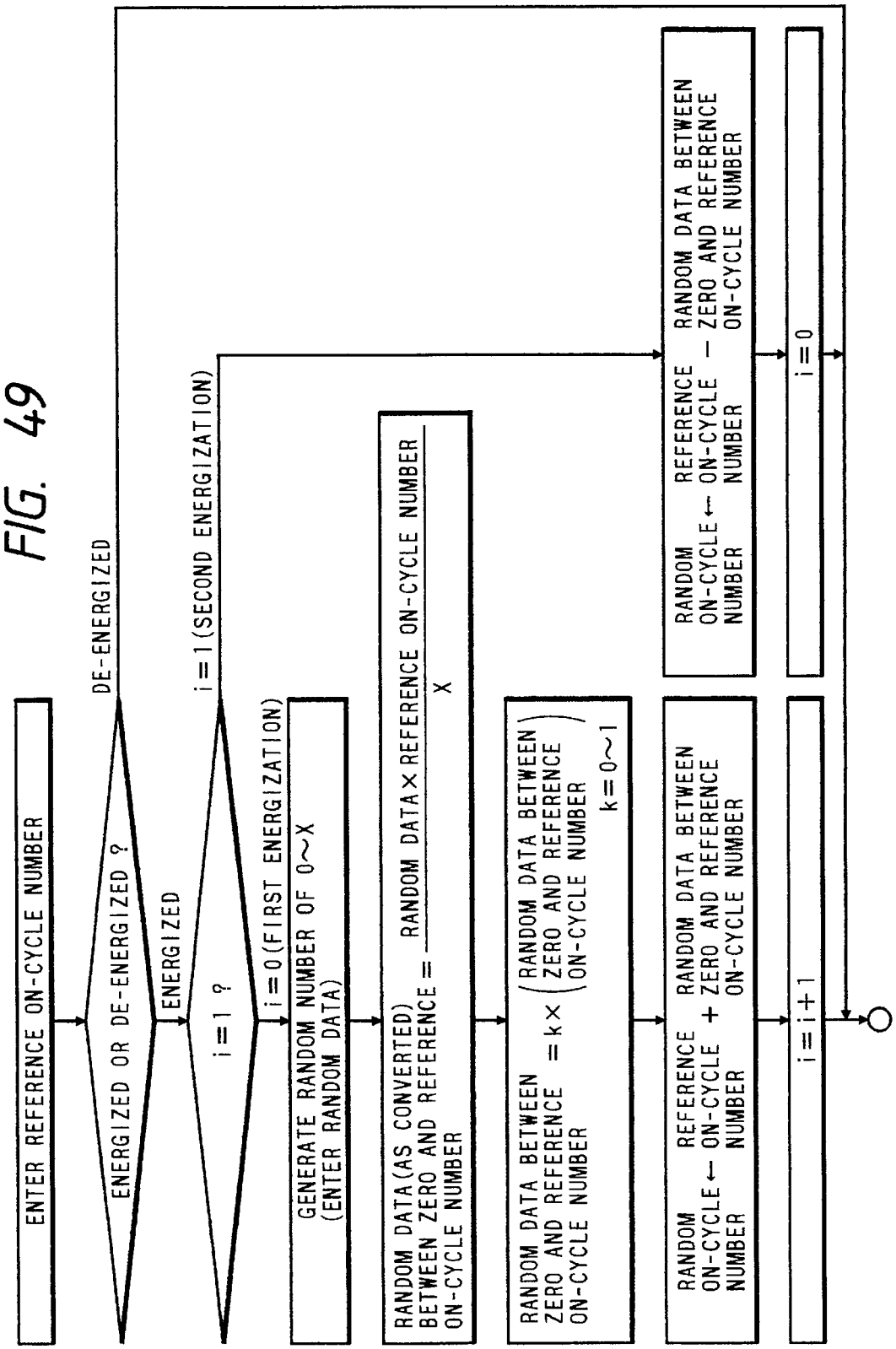
FIG. 49 is a flowchart describing means for controlling the randomly changing energization time in Example 6 of the invention.
Figure 52:
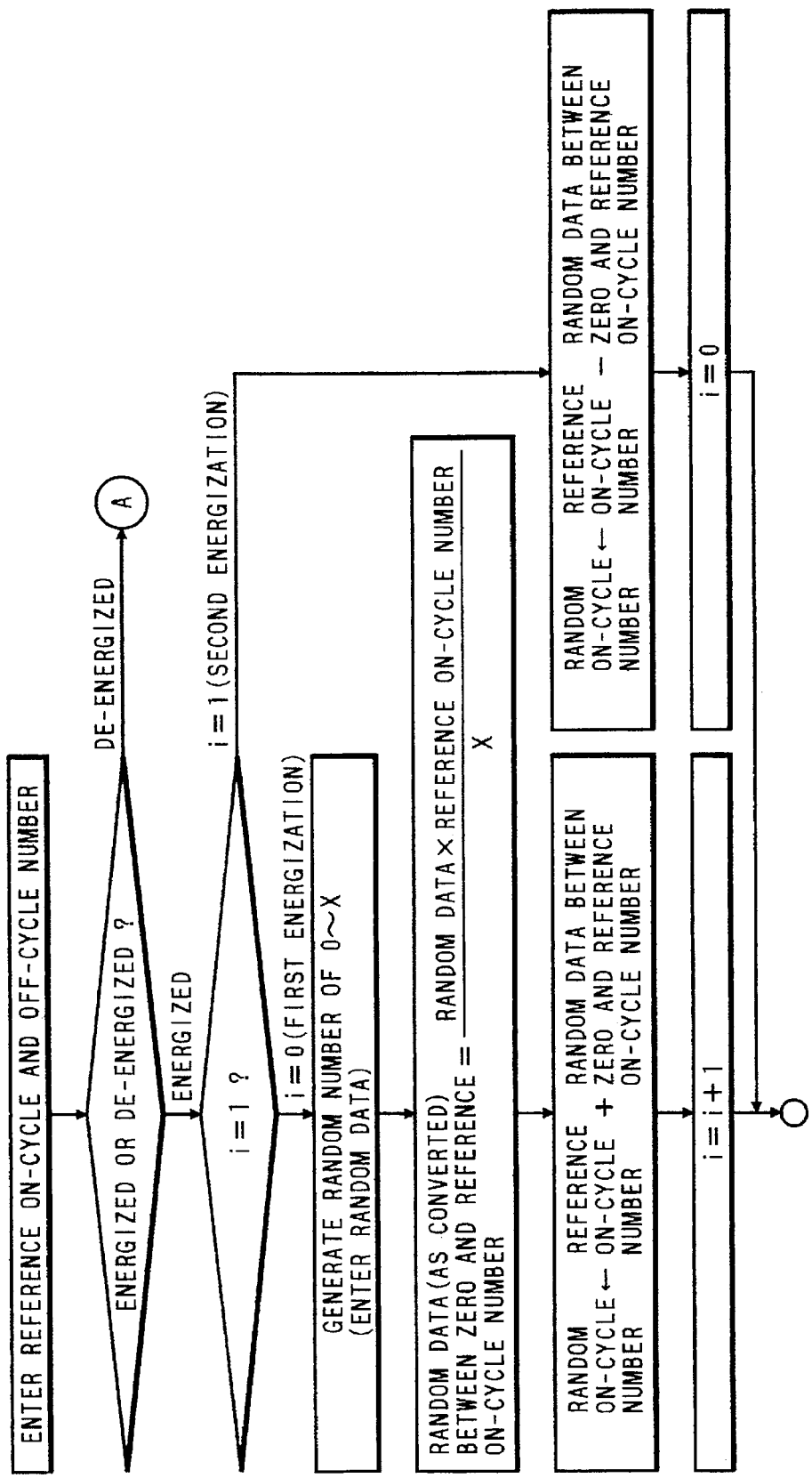
Figure 53:
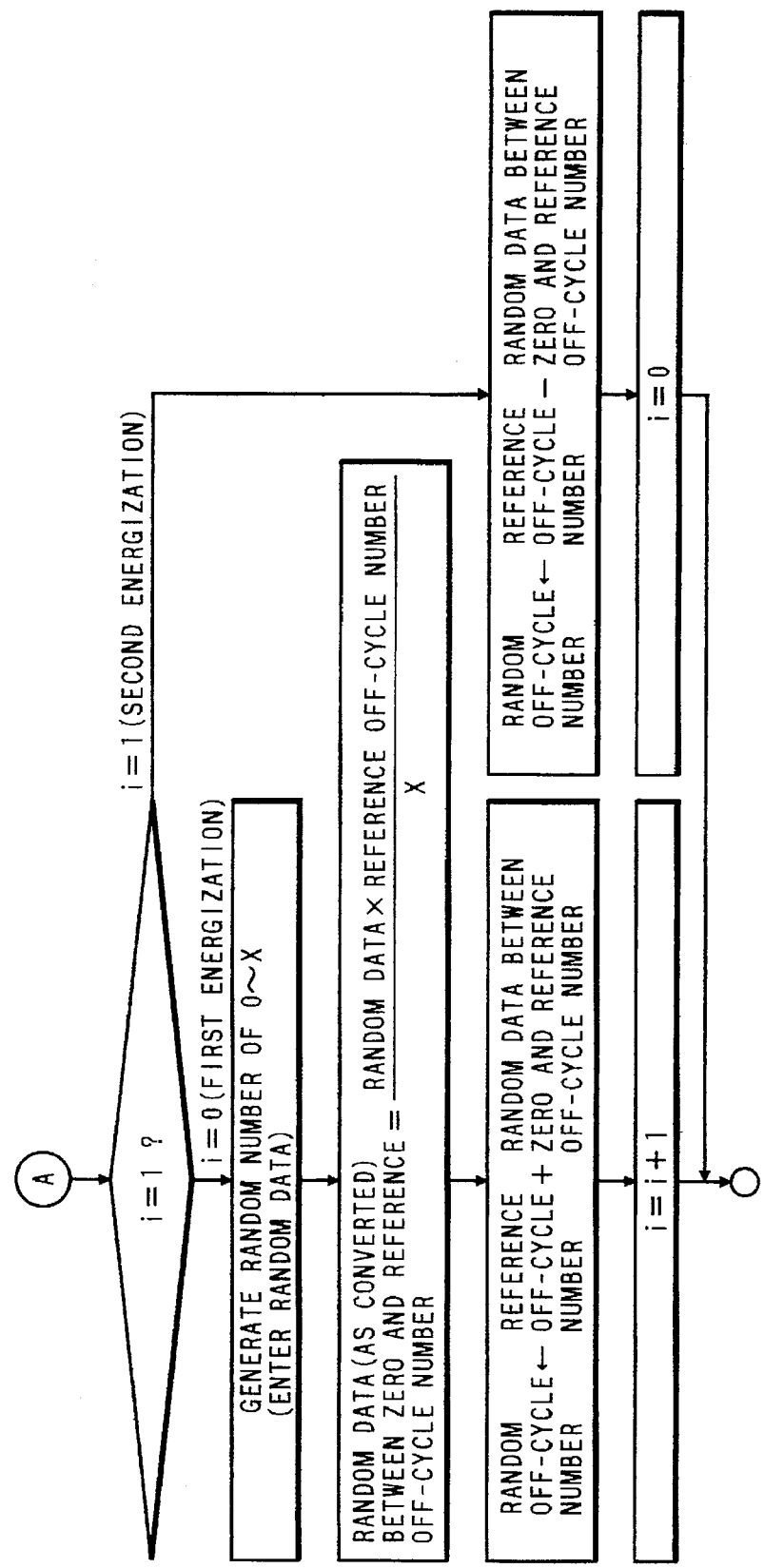
Figure 54:
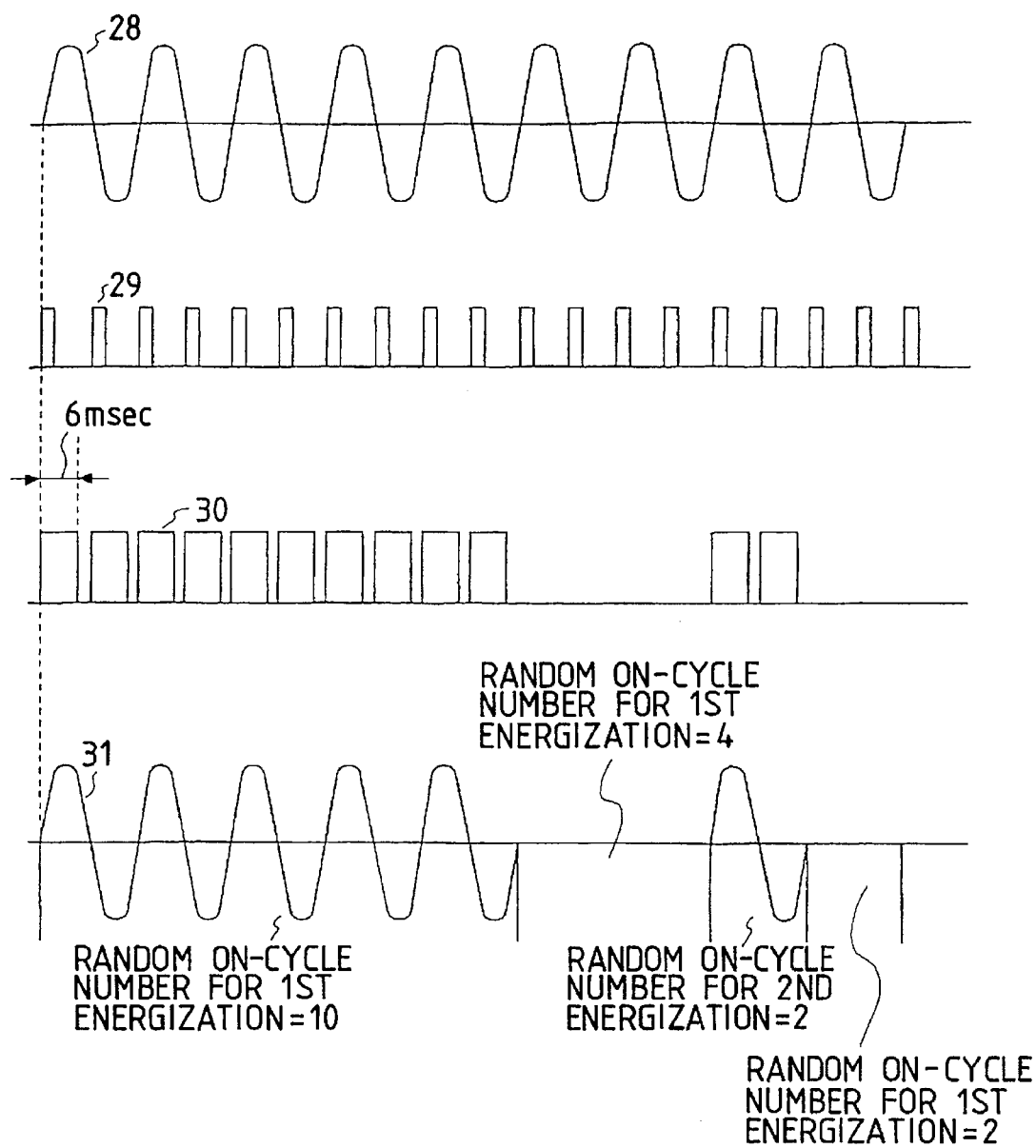
Figure 55:
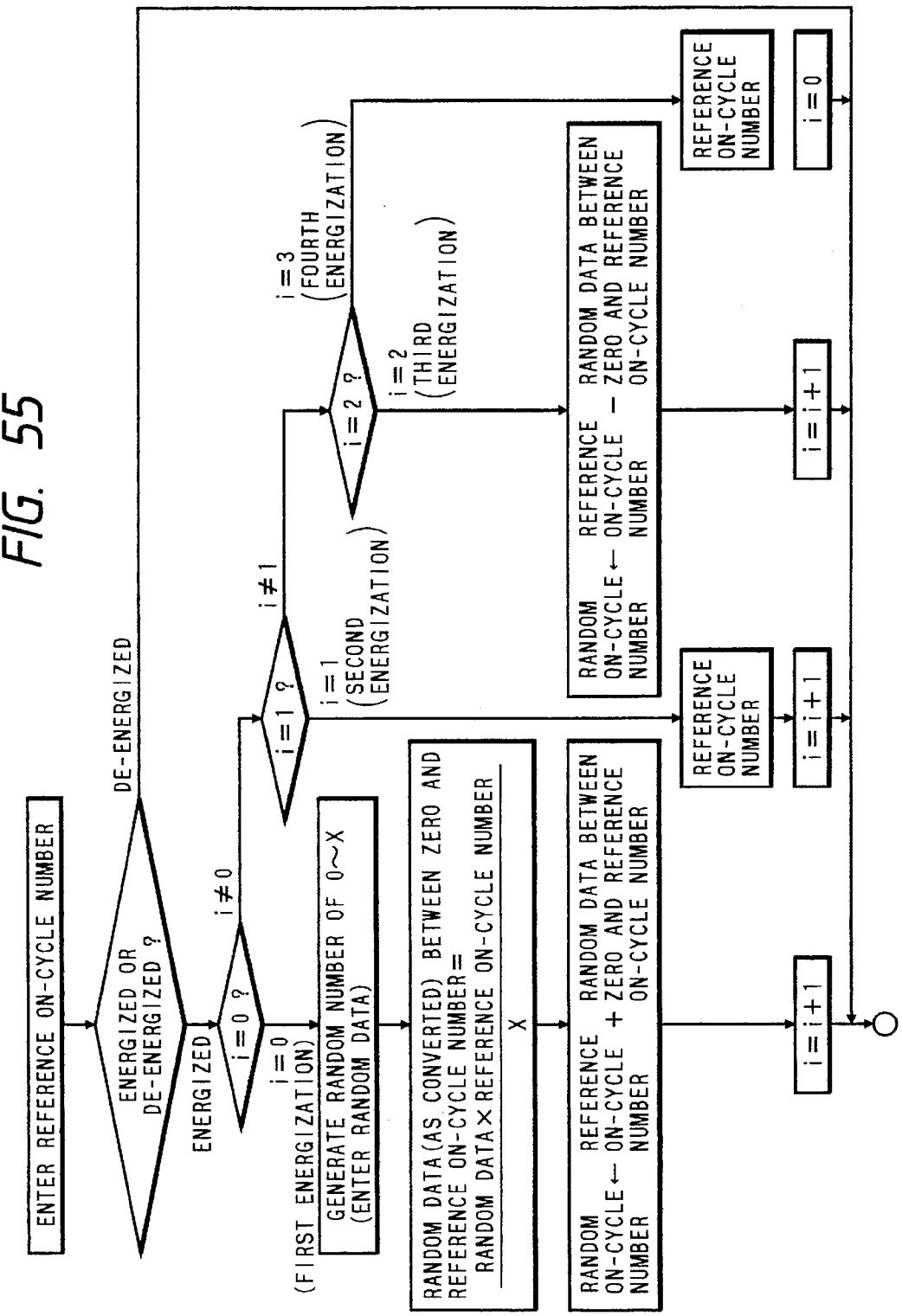
Figure 56:
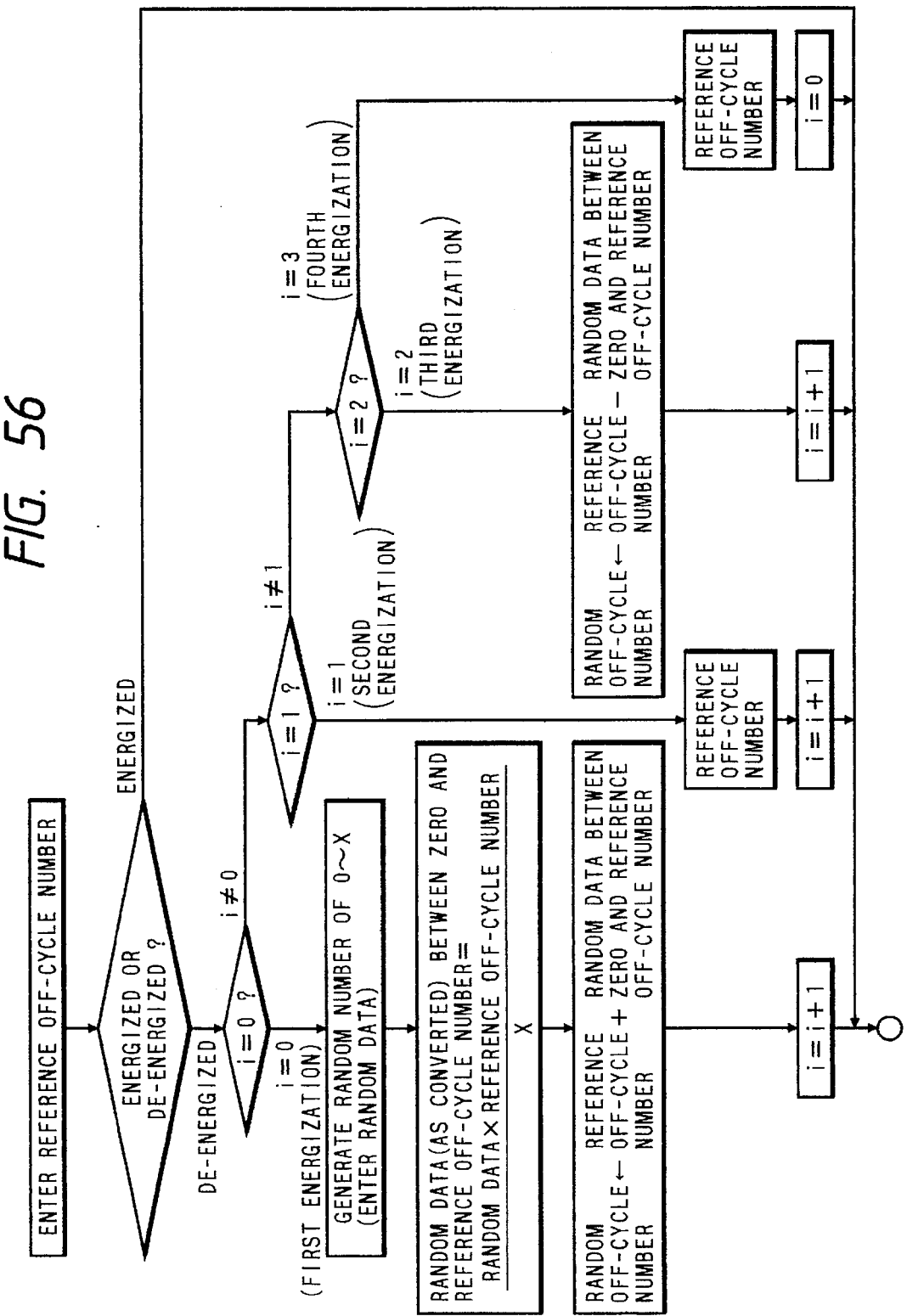
Figure 57:
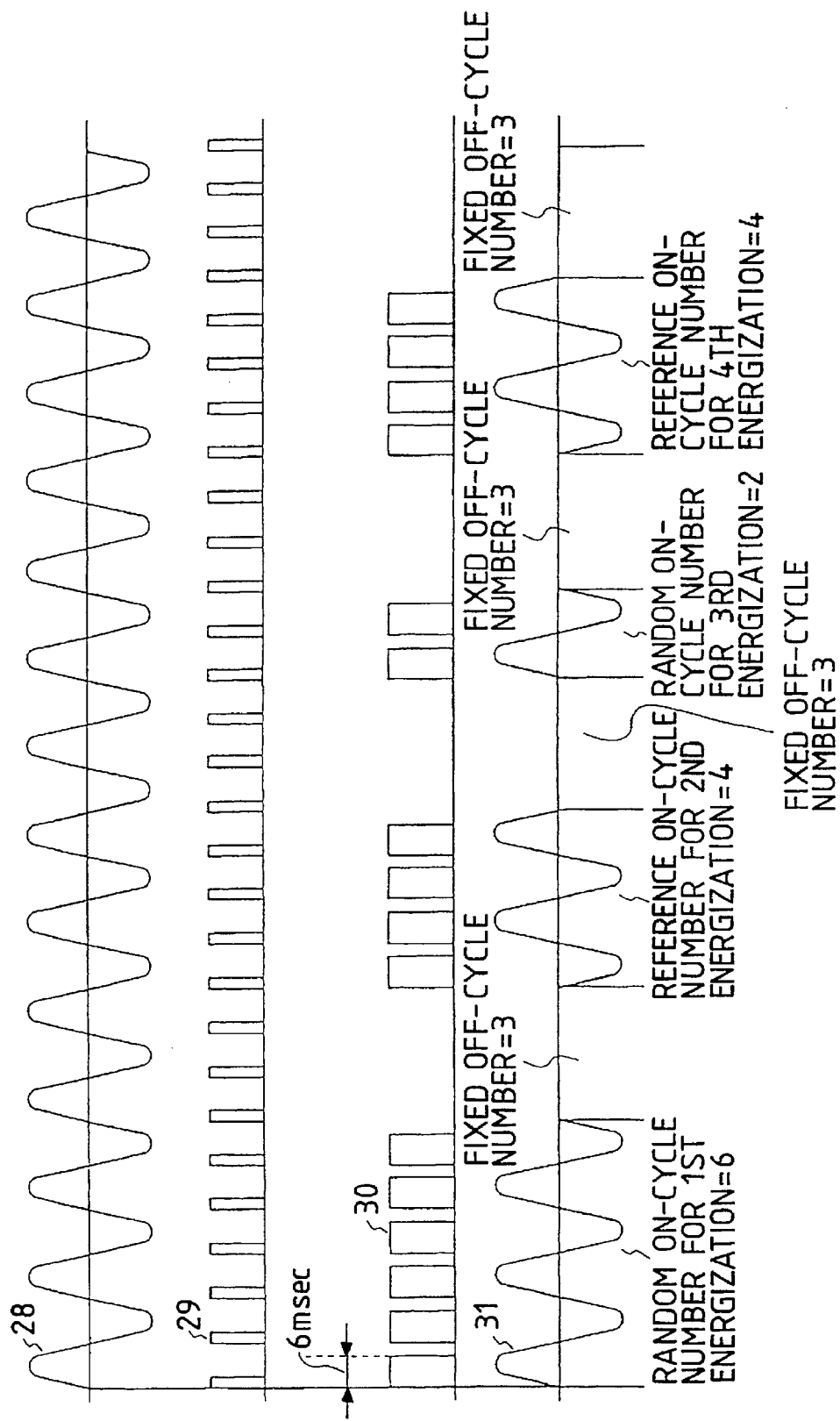
Figure 58:
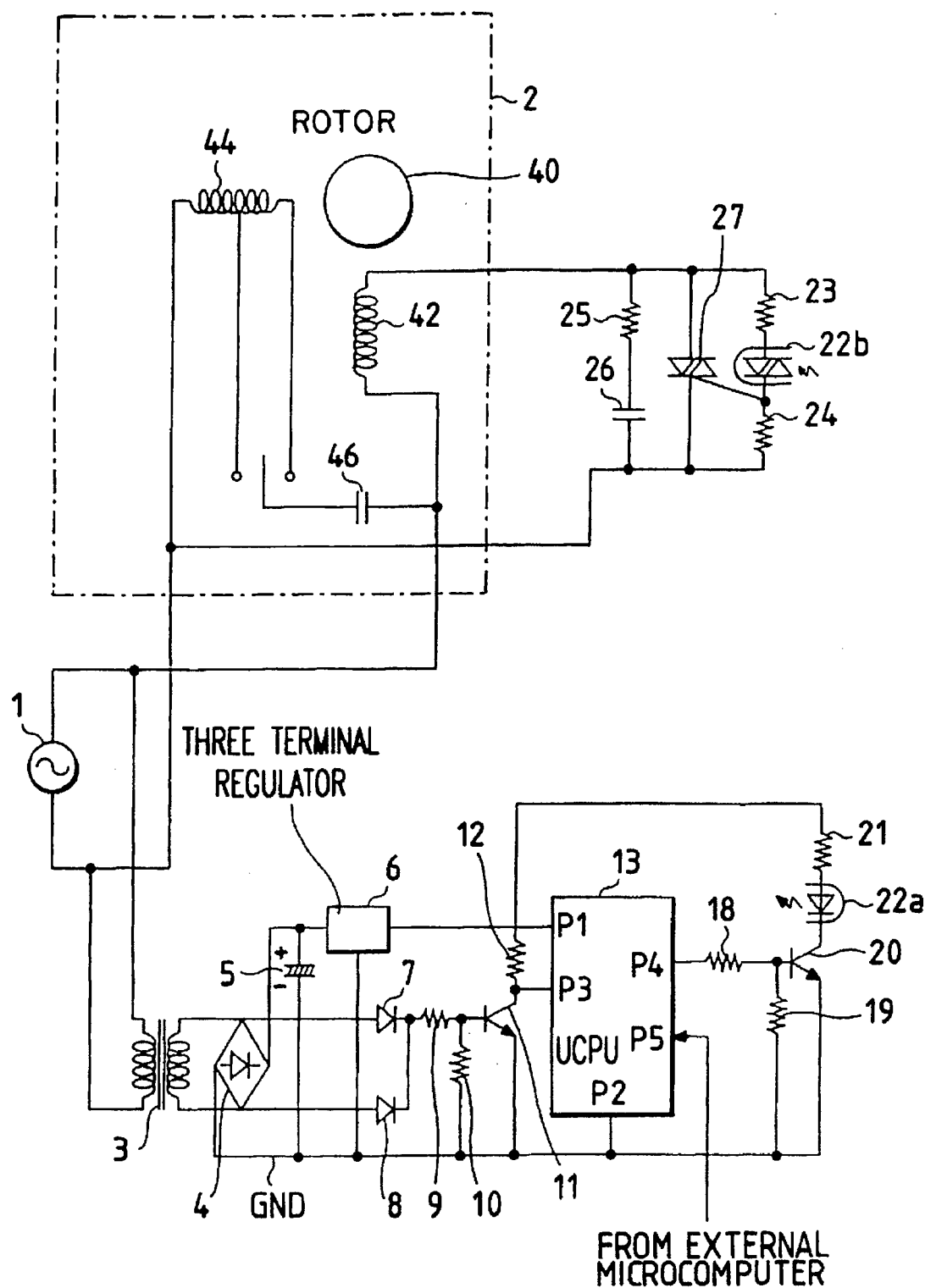
Figure 59:
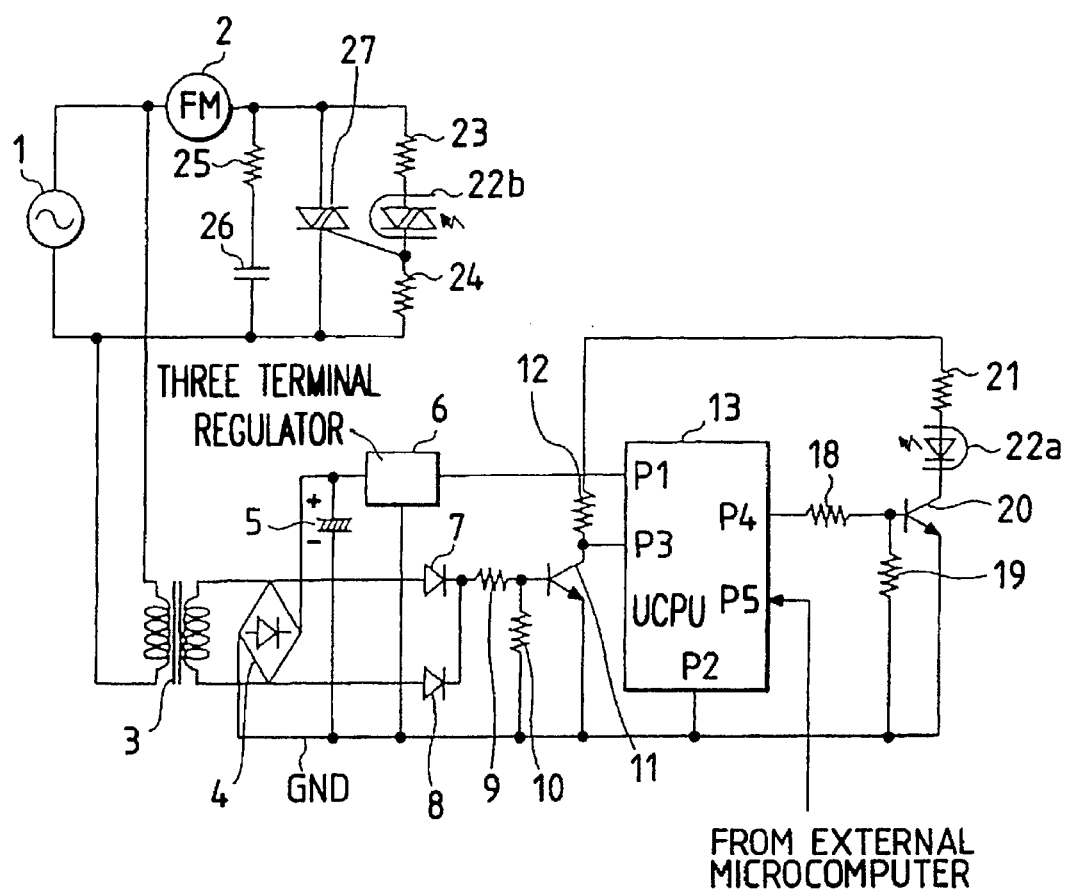
Figure 60:
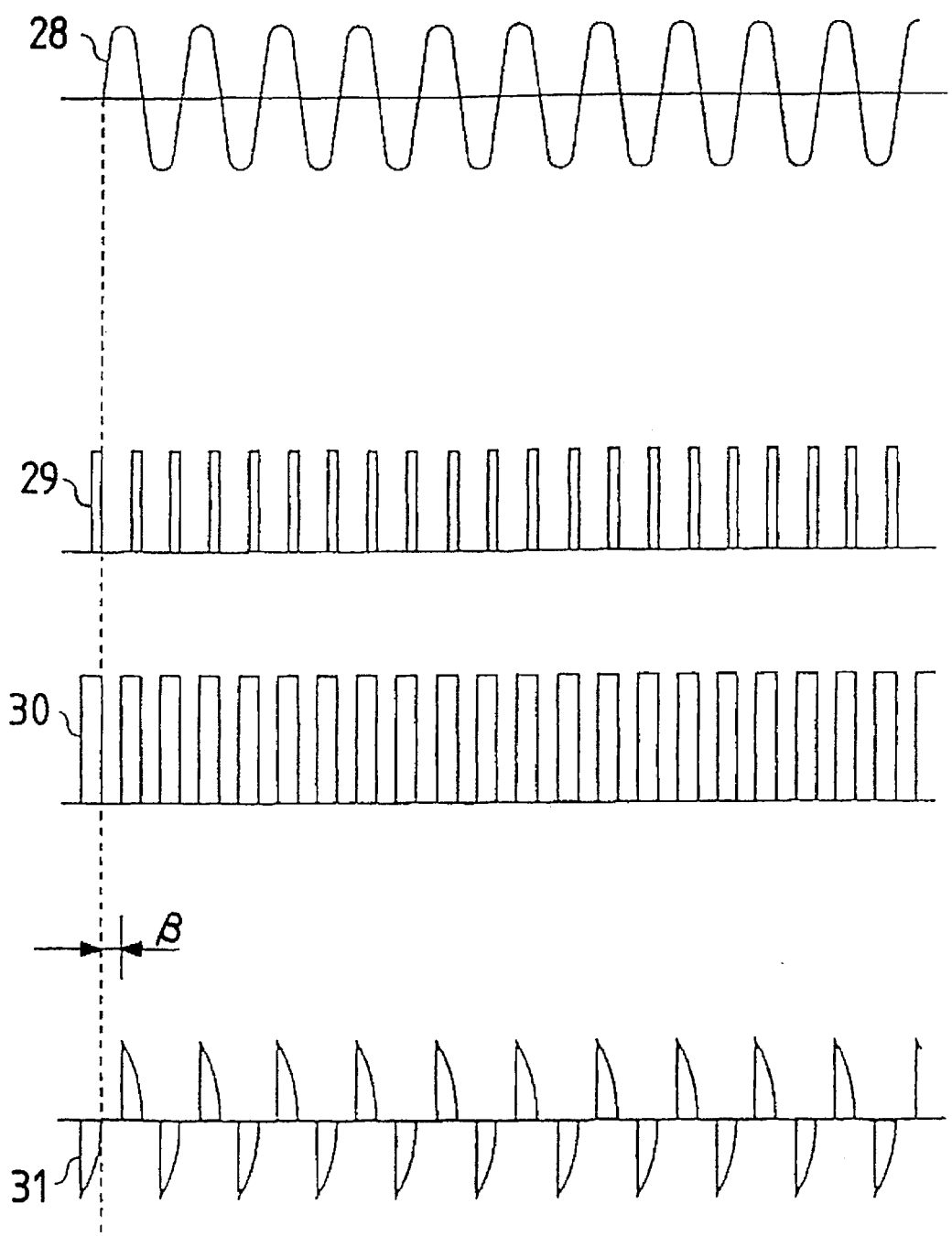
Figure 61:
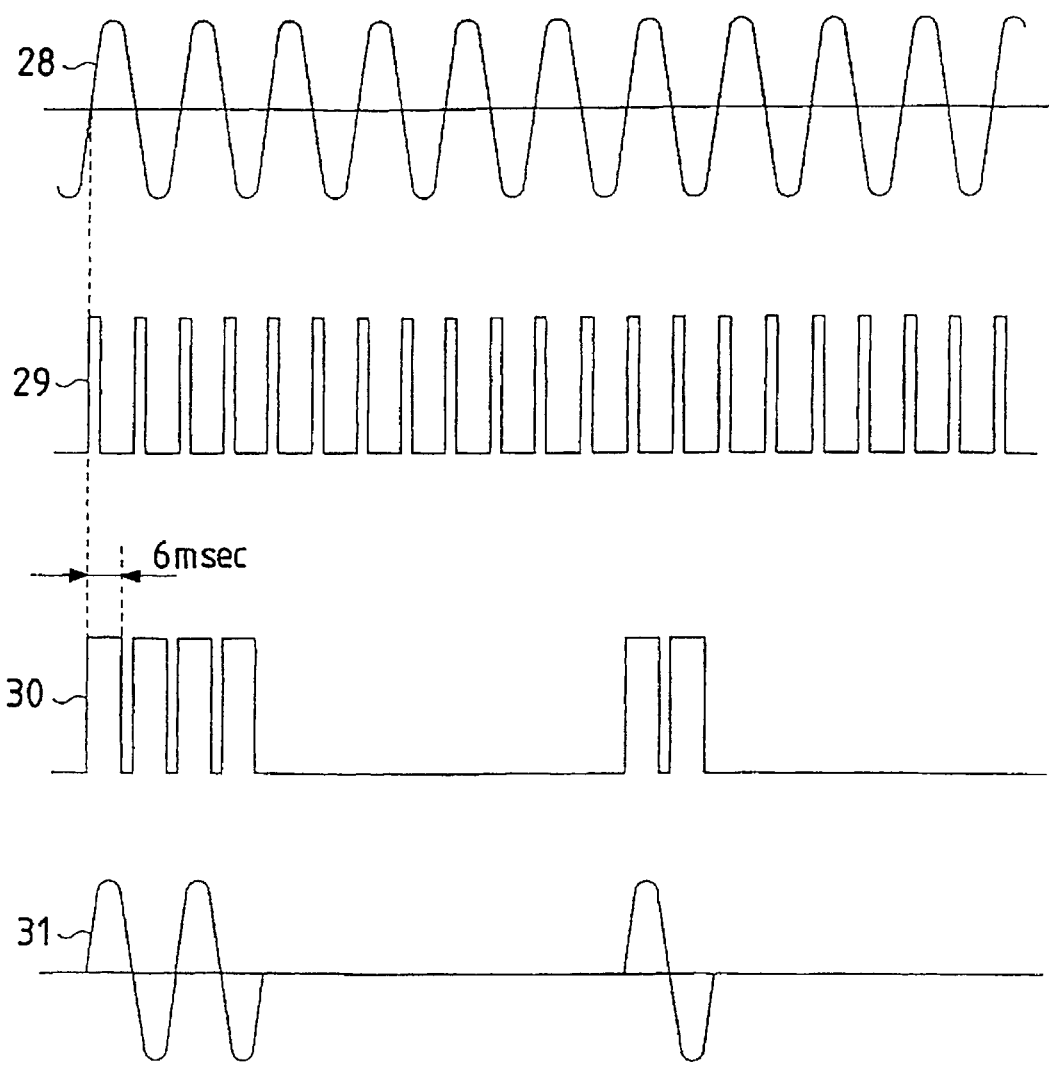

FIG.. 51 shows the waveforms that are produced when a fan motor is energized with the randomly changing energization time being controlled by the means described in FIG. 49;

FIG. 52 is a flowchart for the case of random energization in Example 8 of the invention;

FIG. 53 is a flowchart for the case of random de-energization in Example 8 of the invention;

FIG. 54 shows the waveforms that are produced when a fan motor is energized with randomly changing energization and de-energization times being both controlled according to the flowcharts shown in FIGS. 52 and 53;

FIG. 55 is a flowchart describing means for controlling randomly changing energization in Example 9 of the invention;

FIG. 56 is a flowchart describing means for controlling randomly changing de-energization in Example 9 of the invention;

FIG. 57 shows the waveforms that are produced when a fan motor is energized with randomly changing energization being controlled by the means described in FIG. 55;

FIG. 58 shows the configuration a circuit for controlling the rotational speed of a motor by means of providing taps on a winding in Example 10 of the invention;

FIG. 59 is a circuit diagram illustrating a prior art motor drive unit;

FIG. 60 shows various waveforms to illustrate the motor drive unit of Prior Art Case 1;

FIG. 61 shows various waveforms to illustrate the motor drive unit of Prior Art Case 2; and FIG. 62 illustrates the contents of the memory map stored in the electronic control circuit in the motor drive unit of Prior Art Case 2.

DETAILED DESCRIPTION OF THE PREFERRED EMBODIMENTS

EXAMPLE 1

An example of the present invention will now be described in detail.

Figure 1:
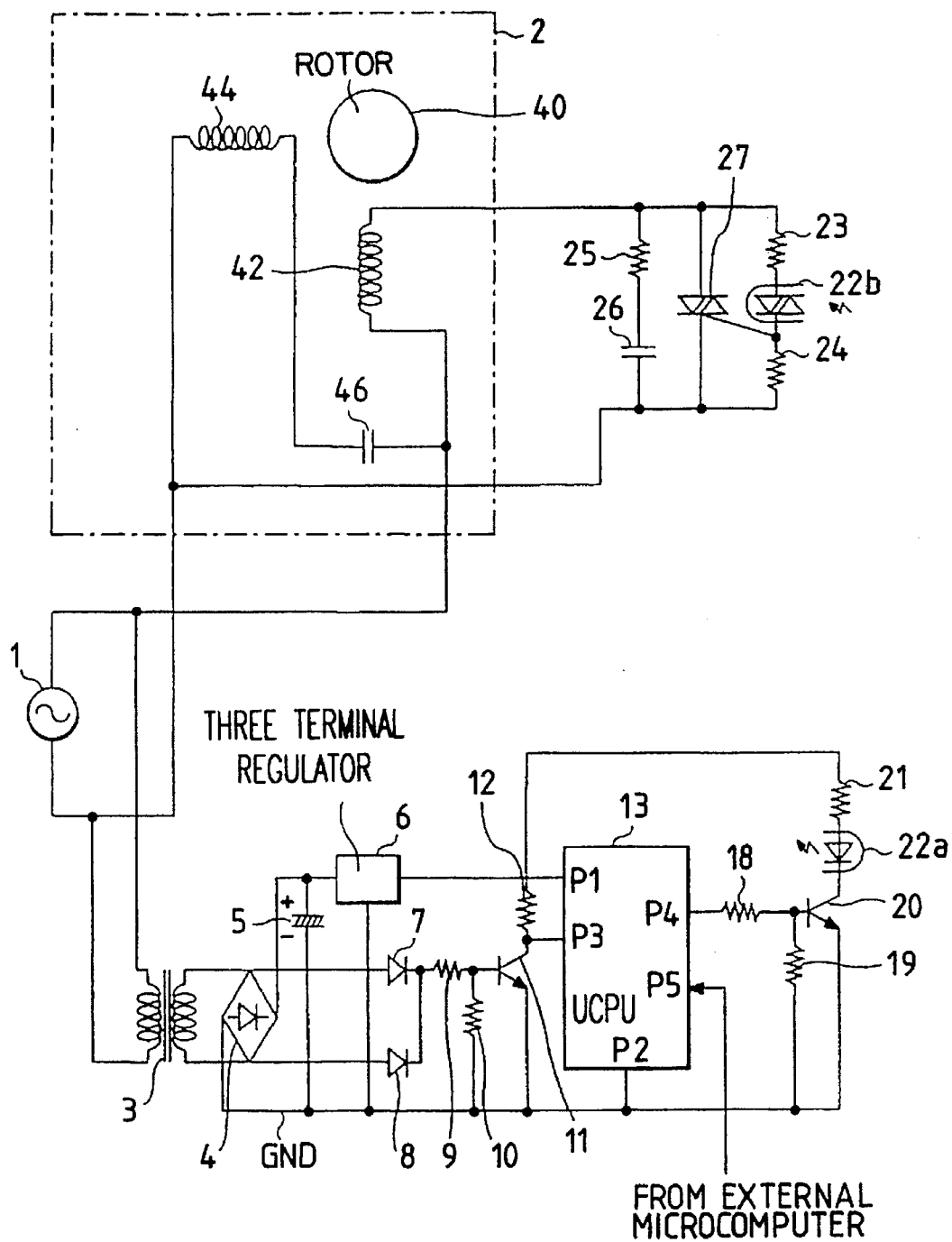
FIG. 1 is a circuit diagram showing a motor drive unit according to Example 1 of the invention.

FIG. 1 shows the configuration of a circuit for controlling a fan motor according to an example of the invention. Referring to FIG. 1, numeral 2 designates a fan motor as in the prior art case shown in FIG. 59 but its constituent elements are shown in detail in FIG. 1; numeral 40 designates a rotor, 42 is the main winding, 44 is an auxiliary winding, and 46 is a capacitor. The other components in FIG. 1 are identical to those shown in FIG. 59.

AC 100 V power source 1 supplies power to the main winding 42 and auxiliary winding 44 on fan motor 2. Since auxiliary winding 44 is energized through capacitor 46, the current flowing through auxiliary winding 44 leads in phase compared to the current flowing through the main winding 42 and a rotating magnetic field is created around rotor 40. Rotor 40 is a squirrel-cage rotor that has an iron core fixed in aluminum by die casting and the interaction with the surrounding rotating magnetic field causes an induction current to flow, allowing the rotor to rotate at a smaller rotating speed than the field.

Energization of the main winding 42 can be controlled by turning on or off the triac 27. Thus, in Example 1, triac 27 acts upon the fan motor 2 in such a way that it performs on-off control over the energization of the main winding alone, not over the energization of the main and auxiliary windings altogether as in the prior art technology shown in FIG. 59.

Operational details of detection as to whether the voltage applied to the main winding 42 is zero-crossing or not and those of control over energization or de-energization of the main winding 42 by means of turning on or off the triac 27 are the same as in the prior art technology and, hence, need not be described.

Example 1 assumes the use of triac 27 as the thyristor to be used in the switching circuit but this is not the sole case of the invention and any types of switches that are capable of controlling the ON function of AC switches may be used, as exemplified by a thyristor, a thyristor and diode combination, and a solid-state relay.

For the purpose of the present discussion, the on-off control that is achieved by a thyristor in such a way as to produce current waveforms consisting of one or two cycles of sine waves shall be called "low-frequency pulsation". In this connection, it should be noted that the shaped current waveform may occasionally be distorted from the ideal sine waveform on account of the time constant of the current flowing through the windings.

Figure 2:
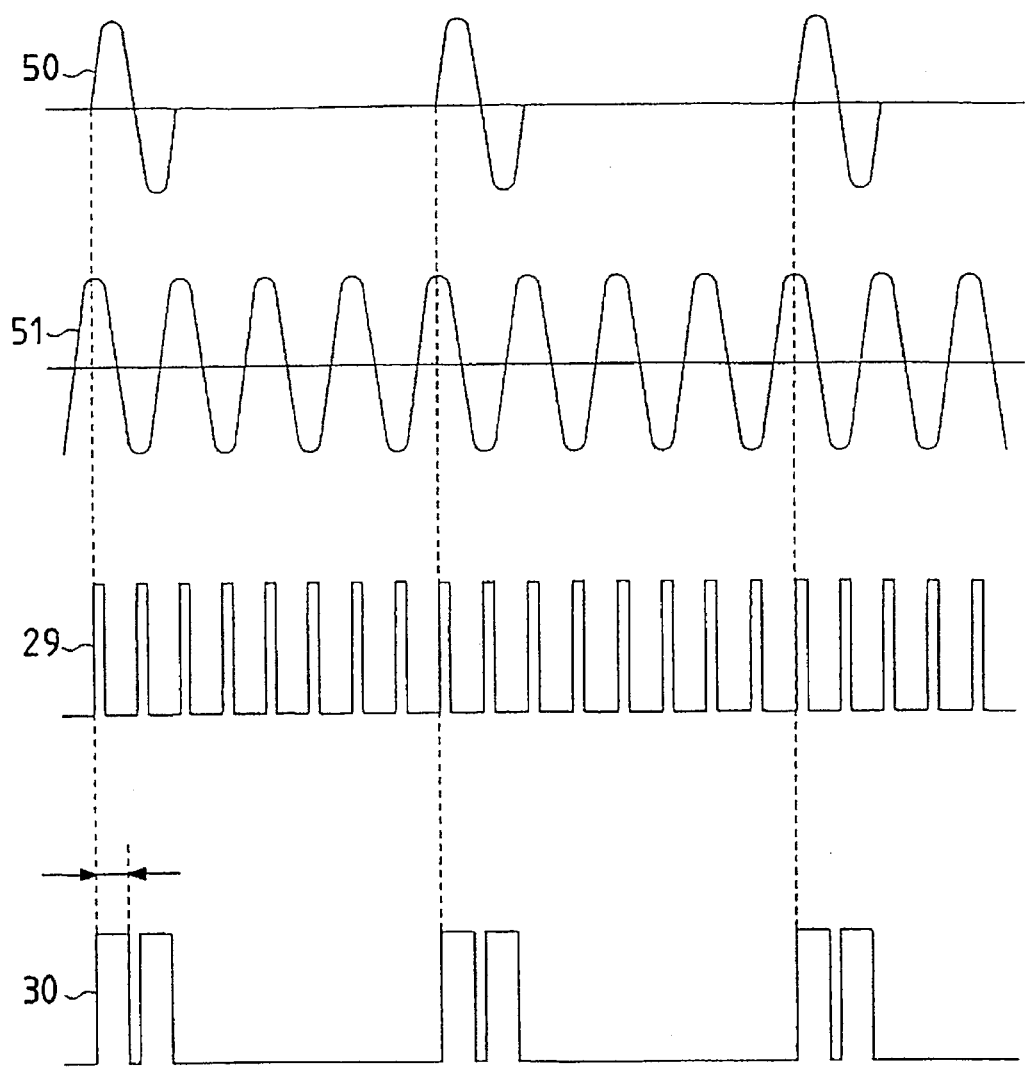
FIG. 2 shows various waveforms to illustrate the motor drive unit of Example 1 of the invention.

FIG. 2 shows output waveforms as produced by performing this "low-frequency pulsation" in accordance with Example 1 of the present invention which is implemented by the circuit shown in FIG. 1, and FIGS. 3A and 3B show the contents of the memory map stored in the electronic control circuit. Referring to FIG. 2, numeral 50 indicates the waveform of a current flowing through the main winding 42, numeral 51 indicates the waveform of a current flowing through auxiliary winding 44, numeral 29 indicates the waveform of a zero-crossing signal supplied at input terminal P3 of microcomputer 13 (this input waveform is identical to what is obtained in the prior art), and numeral 30 indicates the waveform of an output as produced at output terminal P4 of microcomputer 13.

Microcomputer 13 counts the number of cycles by means of the zero-crossing signal already described above and the way it delivers outputs is as follows: it switches the output terminal P4 from "L" to "H" in synchronism with the zero-crossing signal and, when a predetermined time lapses thereafter, the microcomputer switches the output terminal P4 from "H" to "L".

The process will now be described more specifically, assuming the case where the main winding 42 is to be energized through a given number of cycles. First, the output terminal P4 is switched from "L" to "H" in synchronism with the zero-crossing signal. When a specified time, say, 6 msec, passes thereafter, the output terminal P4 is switched from "H" to "L". The time interval of "6 msec" is determined with a built-in timer in the microcomputer 13. The zero-crossing signal is produced at a period of either 8.3 msec (when the source frequency is 60 Hz) or 10 msec (when the source frequency is 50 Hz) and, therefore, when 2.3 msec or 4 msec lapses after the output terminal P4 was switched from "H" to "L", the zero-crossing signal is again fed into the microcomputer 13; in synchronism with this entry, the output terminal P4 is again switched from "L" to "H" and, 6 msec thereafter, P4 is switched from "H" to "L". Such pulse outputs are successively delivered in numbers that are twice the required number of energization cycles (because the zero-crossing signal is entered in every half cycle).

The "required number of energization cycles" means the number of current ON cycles and shall include the current through the main winding if the thyristor supplies a current to the main winding, or it shall include the current supplied to the motor if the thyristor supplies a current to the motor, or the terminal common to both the main and auxiliary windings.

Stated briefly, given the object of providing a desired number of revolutions, on-off patterns are so set that the stated object is attained and the necessary number of on-off cycles is determined. As a already mentioned, the gate of triac 27 is triggered in response to the "H" signal at the output terminal P4. As already mentioned, the gate trigger signal turns off in 6 msec but the triac gate is re-triggered each time the zero-crossing signal occurs; hence, as long as the output pulse from the terminal P4 remains "H", triac 27 is conducting and the main winding 42 is energized. To deenergize the main winding 42, one may hold the output terminal P4 at "L" level even if the zero-crossing signal is entered. The number of OFF cycles is counted by the zero-crossing signal.

In order to provide the fan motor 2 with the number of revolutions that is determined by control factors such as the temperature of the heat exchanger in an air conditioner, the main winding 42 is energized in accordance with patterns in a memory map such as those shown in FIG. 3A. The applicable patterns in a memory map are such that with the number of ON cycles fixed at a certain value, the number of OFF cycles is adjusted to provide a desired number of revolutions. If the energization period (the number of ON cycles) of drive patterns is 4 or 5, the fundamental frequency of on-off cycles will decrease. If a 4-ON and 2-OFF pattern is selected, the fundamental frequency of on-off cycles is 10 Hz and the repetition of on-off cycles is prone to be discernible as continual or intermittent sounds by the auditory sense. However, if the fundamental frequency of on-off cycles is about 20 Hz, the repetition of on-off cycles will be heard as continuous sounds. Thus, by adapting the technique of low-frequency pulsation which intentionally increases the fundamental frequency of on-off cycles, intermittent "swishes" can be attenuated to such an extent that they become continuous and mix with the sound of wind until they are no longer jarring.

Thus, an optimal fundamental frequency occurs at 20 Hz or whereabouts and motor operation will be in the audible range at higher frequencies whereas continual sounds will develop at lower frequencies.

Auxiliary winding 44 is energized at all times. The percent energization α is calculated by the following formula:

$$\alpha = \frac{1}{2}(Non/(Non+Noff)+1) \times 100(\%)$$

where Non is the number of ON cycles and Noff is the number of OFF cycles.

In Example 1, the system is so adapted that only the main winding 42 is subjected to the on-off control of energization and, hence, the axial vibration that develops due to a magnet center displacement is reduced to about one half the amount that occurs when both the main winding 42 and the auxiliary winding 44 are subjected to the on-off control of energization and this enables the attenuation of the "tapping" sound.

The data on the number of revolutions that are given in FIG. 3A were obtained by actual measurements in a test conducted with an in-the-ceiling cassette of a package air conditioner. Obviously, the velocity of wind produced from the air conditioner could be controlled to vary in four ranges, high, medium, low and breeze.

It is also clear from FIG. 3A that when the percent energization was 75% or more, the fundamental frequency of on-off cycles was no less than 15 Hz and high enough to attenuate the continual sound which develops at 10 Hz in Prior Art Case 2. In other words, the frequency of continual sounds increased to such a level that they were heard as continuous to the auditory sense, thereby producing sounds of improved quality.

In the case shown in FIG. 3A, the number of ON cycles was fixed at the value 2. If the number of ON cycles is fixed at unity as in the case shown in FIG. 3B, the fundamental frequency of on-off cycles doubles at a given percent energization and frequencies of at least 20 Hz can be insured over the entire range of percent energization, thereby contributing to a further attenuation of the continual sounds.

While the foregoing description assumes the use of powers supplies operating at commercial frequencies with the number of ON cycles being fixed at 1 or 2, it should be understood that other embodiments are of course applicable as long as they are effective in suppressing noise and vibrations such as by attenuating continual sounds. What is important is to control the speed of a motor with the number of energization (or de-energization) cycles being fixed at a specified value either equal to or twice the cycle period of an AC power supply whereas the number of de-energization (or energization) cycles is varied by an integral multiple of one half the cycle period of the AC power supply.

In a preferred embodiment, said specified value is selected in such a way that the fundamental frequency at which the switching circuit is turned on or off is at least 15 Hz over the range in which the percent energization of the motor is 75% or more.

EXAMPLE 1-1

Figure 4:
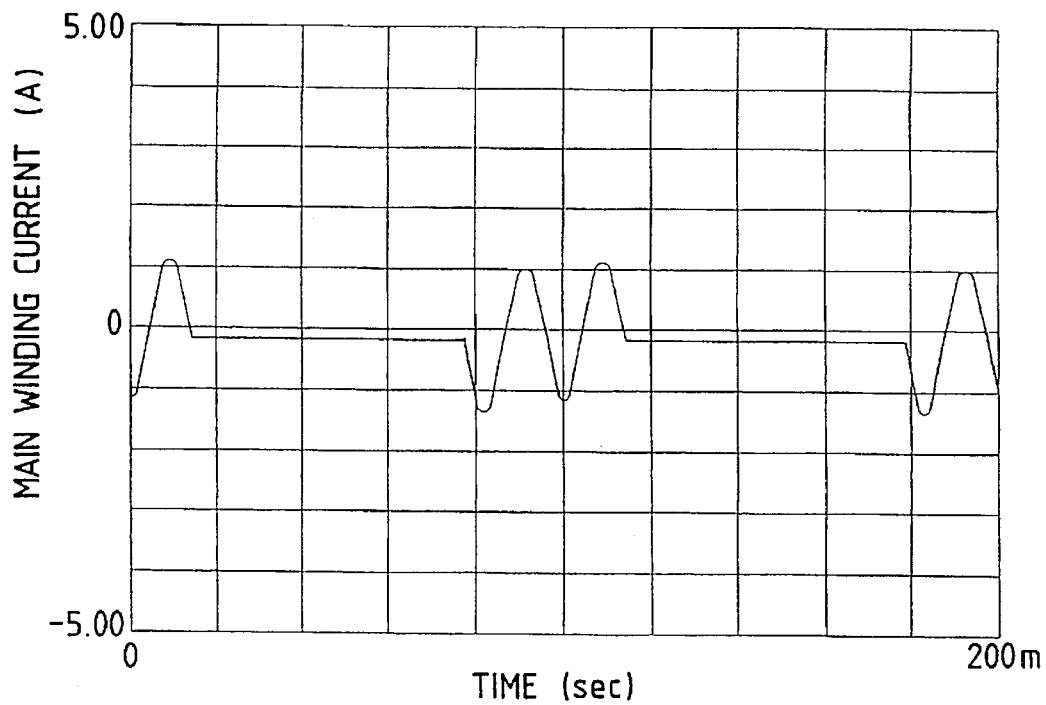
FIG. 4 shows the waveform of a current that actually flowed through the main winding in a motor when it was driven according to a pattern of 2 cycles ON and 4 cycles OFF by means of the drive unit of Example 1.
Figure 5:
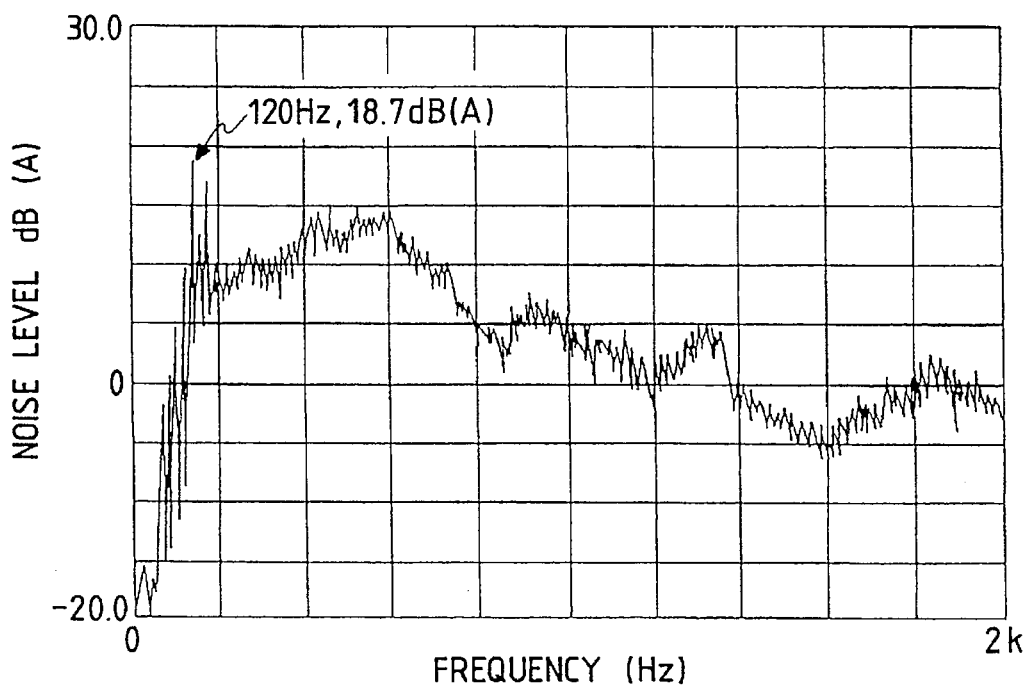
FIG. 5 shows the power spectrum of the noise that actually occurred when motor of Model A was driven according to a pattern of 2 cycles ON and 4 cycles OFF by means of the drive unit of Example 1.

An in-the-ceiling cassette of a package air conditioner (Model A) was driven according to one of the patterns shown in FIG. 3A (i.e., 2 cycles ON and 4 cycles OFF). The results of actual measurements of the current flowing through the main winding and the noise level are shown in FIGS. 4 and 5, respectively. The rotational speed of the motor was 428 rpm.

FIG. 4 shows the temporal waveform of the current through the main winding on the motor that was operated on a 60 Hz power source while it was controlled for energization according to the pattern of 2 cycles ON and 4 cycles OFF. FIG. 5 shows the power spectrum of the noise that occurred when the motor was driven with the main winding current waveform shown in FIG. 4; a noise peak value was 18.7 dB(A) at 120 Hz. The overall value, or the cumulative noise level over the entire frequency band, was 34.69 dB(A).

Figure 6:
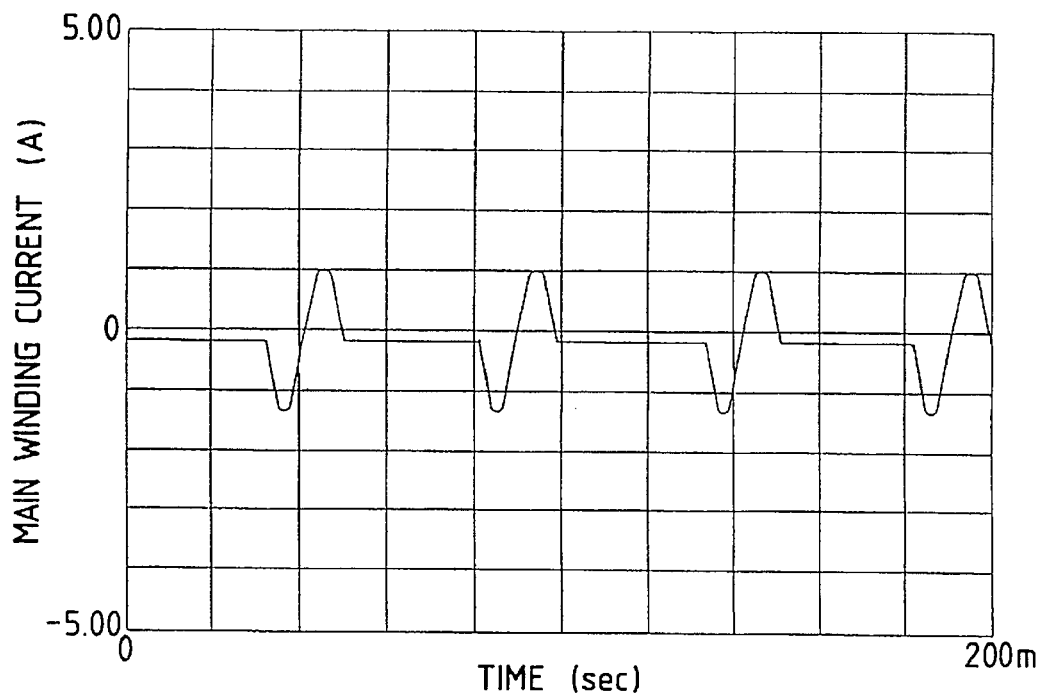
FIG. 6 shows the waveform of a current that actually flowed through the main winding in a motor when it was driven according to a pattern of 2 cycles ON and 2 cycles OFF by means of the drive unit of Example 1.
Figure 7:
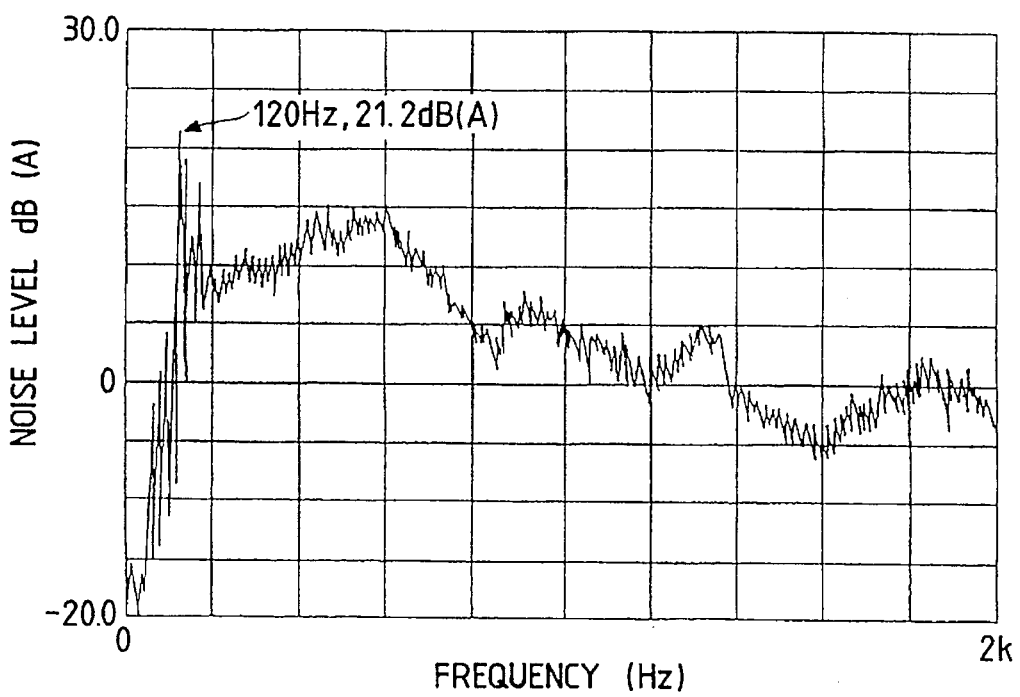
FIG. 7 shows the power spectrum of the noise that actually occurred when motor of Model A was driven according to a pattern of 1 cycle ON and 2 cycles OFF by means of the drive unit of Example 1.

In another experiment, the same cassette (Model A) was driven according to a pattern of 1 cycle ON and 2 cycles OFF that would provide the same percent energization as the pattern of 2 cycles ON and 4 cycles OFF. The resulting temporal waveform of the current through the main winding and the power spectrum of the noise are shown in FIGS. 6 and 7, respectively. The rotational speed of the motor was 426 rpm, which was practically the same as the value 428 rpm which was obtained in the first experiment; the reason would be that given the same percent energization, comparable torques developed to produce substantially the same rotational speed. A noise peak value in the FIG. 7 power spectrum was 21.2 dB(A) at 120 Hz. The overall value was 34.96 dB(A).

Obviously, the motor as driven according to the pattern of 2 cycles ON and 4 OFF cycles produced a weaker magnetic sound than when it was driven according to the pattern of 1 cycle ON and 2 cycles OFF on account of damped resonance with its mechanical makeup.

EXAMPLE 1-2

Figure 8:
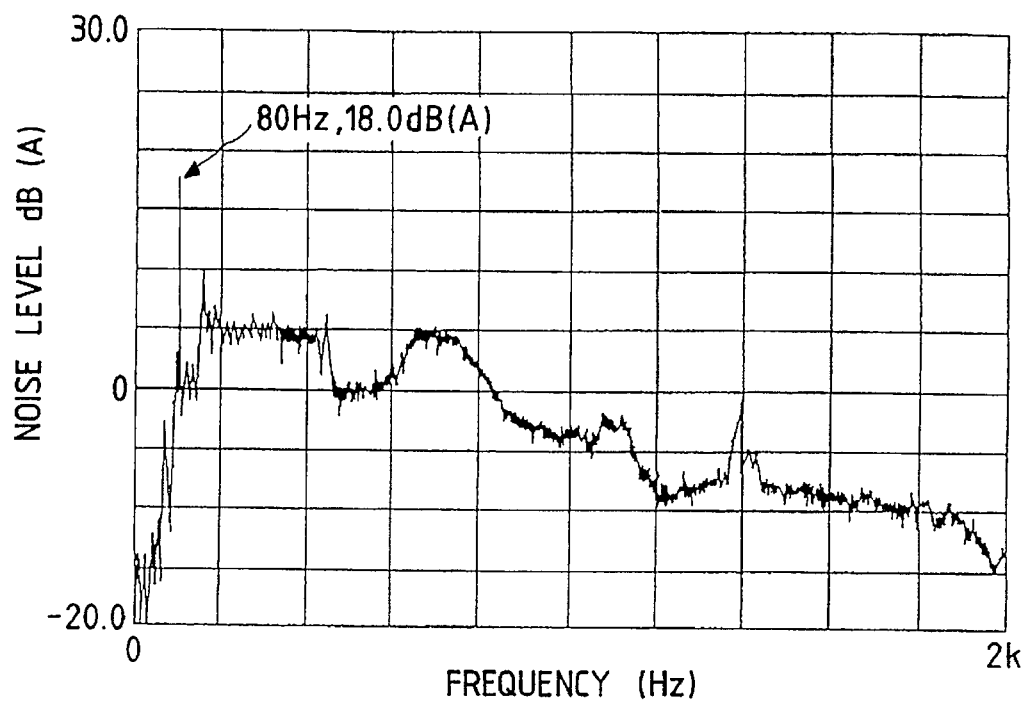
FIG. 8 shows the power spectrum of the noise that actually occurred when motor of Model B was driven according to a pattern of 2 cycles ON and 4 cycles OFF by means of the drive unit of Example 1 of the invention.
Figure 9:
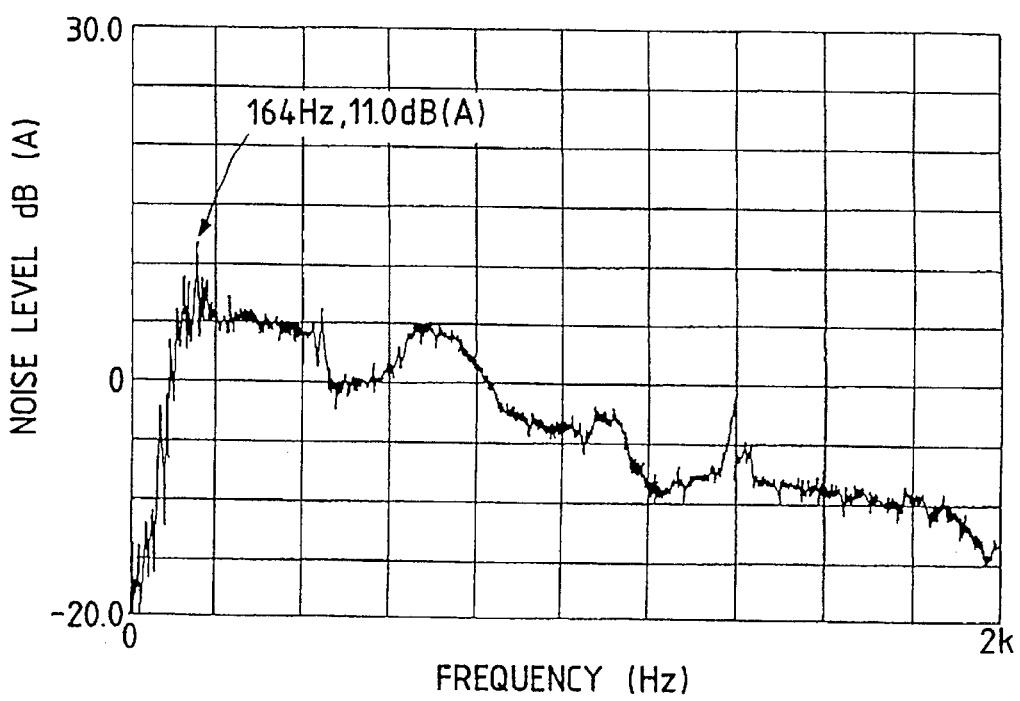
FIG. 9 shows the power spectrum of the noise that actually occurred when motor of Model B was driven according to a pattern of 1 cycle ON and 2 cycles OFF by means of the drive unit of Example 1 of the invention.

Another in-the-ceiling cassette of a package air conditioner (Model B) having a different mechanical makeup than Model A was driven according to two different patterns, one consisting of 2 ON cycles and 4 OFF cycles, and the other consisting of 1 ON cycle and 2 OFF cycles. The power spectra of the noise that developed in the two cases are shown in FIGS. 8 and 9, respectively. FIG. 8 shows the power spectrum of noise that developed when the cassette was driven with the main winding current waveform shown in FIG. 4; a noise peak value was 18.0 dB(A) at 80 Hz. FIG. 9 shows the power spectrum of noise that developed when the cassette was driven with the main winding current waveform shown in FIG. 6; a noise peak value was 11.0 dB(A) at 164 Hz. The motor rotational speed was 360 rpm in the case shown in FIG. 8 and 375 rpm in the case shown in FIG. 9.

Obviously, the motor as driven according to the pattern of 1 cycle ON and 2 cycles OFF produced a weaker magnetic sound than when it was driven according to the pattern of 2 cycles ON and 4 cycles OFF on account of damped resonance with its mechanical makeup.

Models A and B differed in mechanical makeup in such aspects as the shape of the motor supporting base plate, the size of the fan and its material of construction (Model A uses a metal fan whereas Model B uses a plastic fan).

Comparative Example

Figure 10:
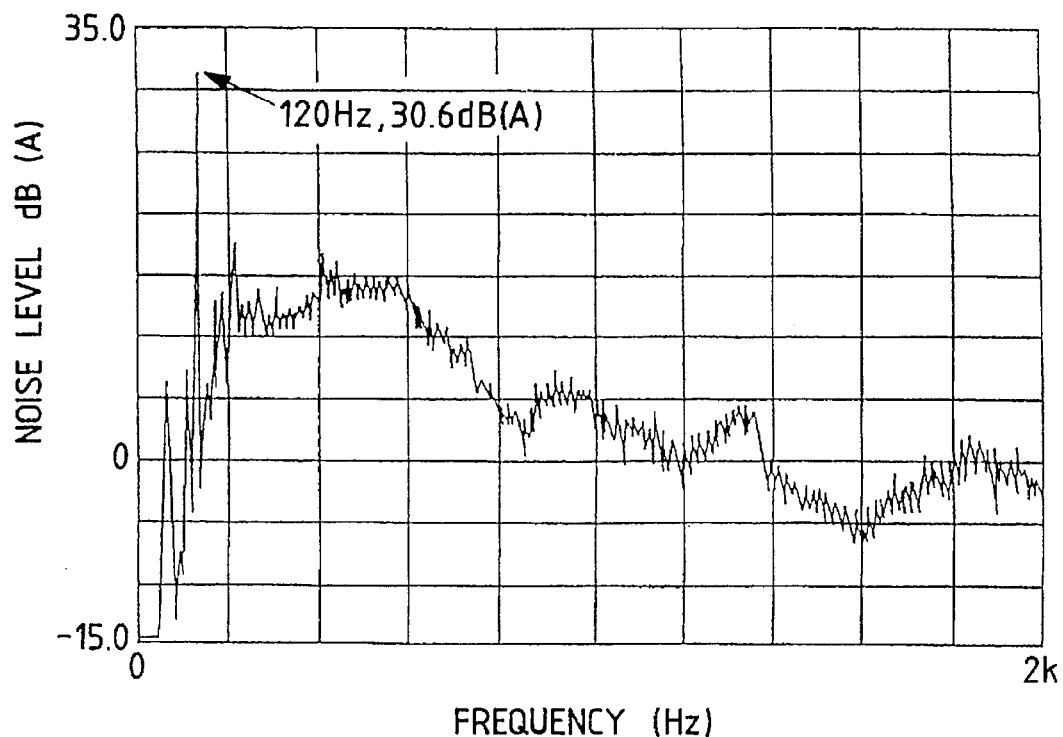
FIG. 10 shows the power spectrum of the noise that actually occurred when motor of Model A was driven in the Comparative Example by the prior art phase control approach.

Model A cassette was driven at 428 rpm by performing phase control as in Prior Art Case 1 and the power spectrum of the resulting noise is shown in FIG. 10. A noise peak value was 30.6 dB(A) at 120 Hz, which was 11.9 dB(A) higher than the corresponding value in FIG. 5. The overall value was 36.14 dB(A).

FIGS. 11 to 16 show waveforms as obtained in the Comparative Example by simulating the driving of a fan motor with the main winding being subjected to phase control as in Prior Art Case 1. Numeral 60 indicates the waveform of a current as supplied to the motor; numeral 61 indicates the waveform of a voltage as applied to the main winding on the motor; 62 indicates the waveform of a current as flowing through the main winding; 63 indicates the waveform of a current as flowing through the auxiliary winding; 64 is a waveform plotting the rotor speed; and 65 is a waveform plotting the motor torque.

Figure 11:
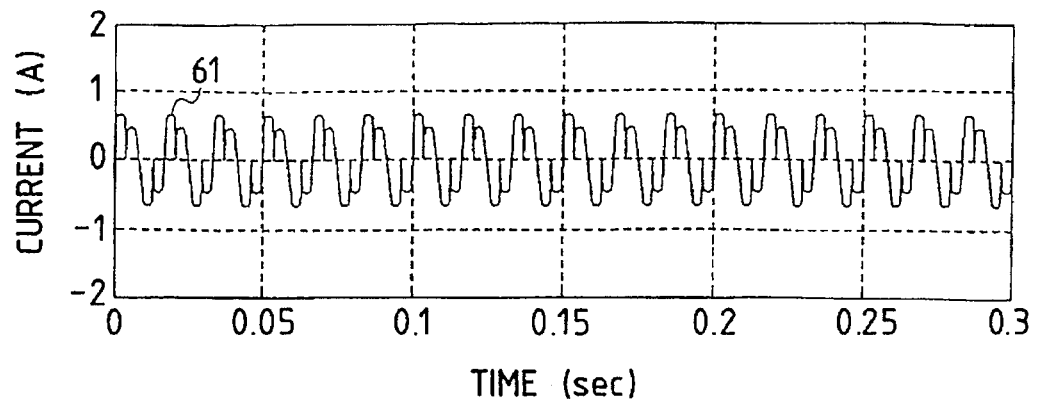
FIG. 11 shows a motor current waveform as the result of simulating the driving of a motor in the Comparative Example with the main winding being subjected to the prior art phase control approach.
Figure 12:
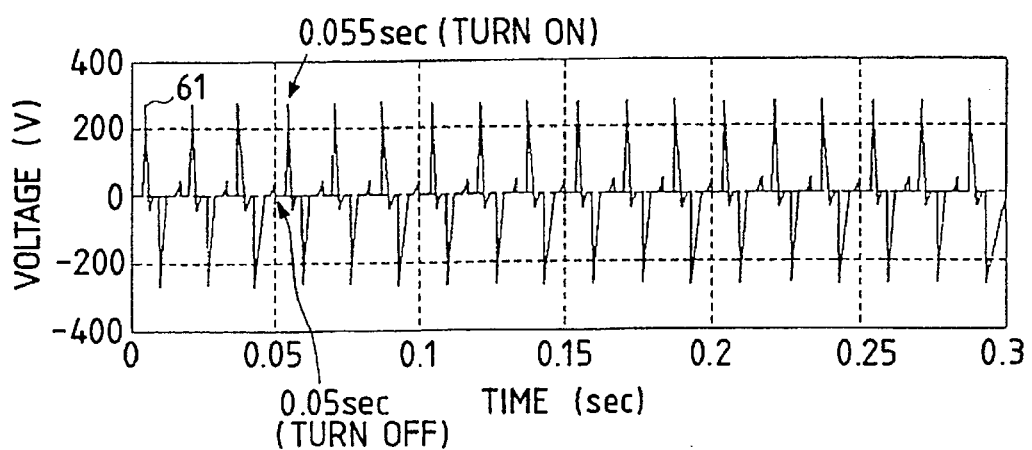
FIG. 12 shows a motor voltage waveform as the result of simulating the driving of a motor in the Comparative Example with the main winding being subjected to the prior art phase control approach.
Figure 13:
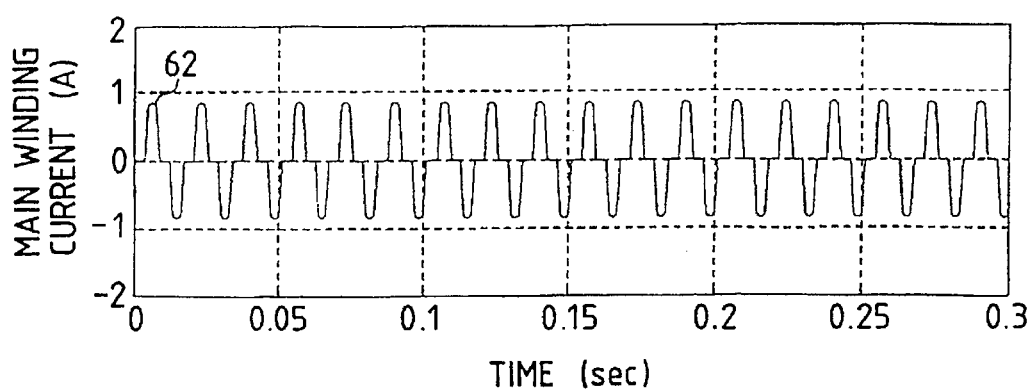
FIG. 13 shows a main winding current waveform as the result of simulating the driving of a motor in the Comparative Example with the main winding being subjected to the prior art phase control approach.
Figure 14:
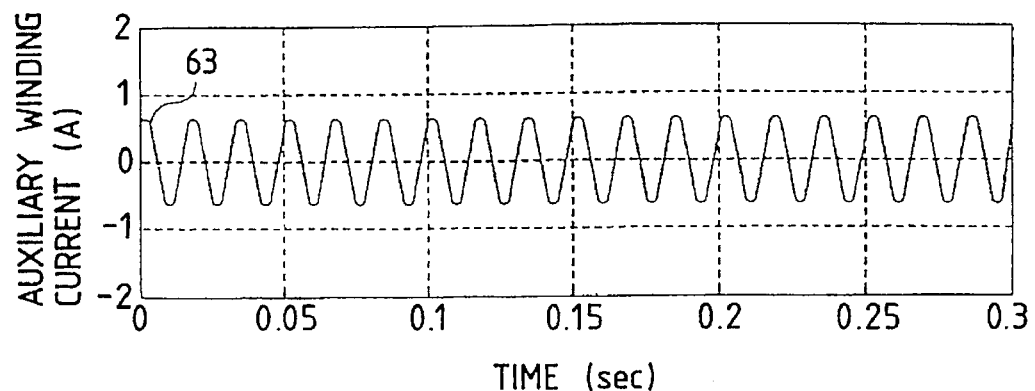
FIG. 14 shows an auxiliary winding current waveform as the result of simulating the driving of a motor in the Comparative Example with the main winding being subjected to the prior art phase control approach.
Figure 15:
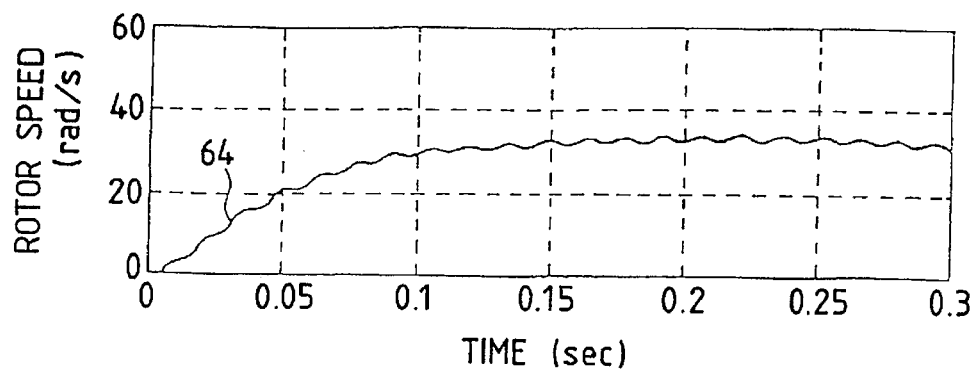
FIG. 15 shows a rotor speed waveform as the result of simulating the driving of a motor in the Comparative Example with the main winding being subjected to the prior art phase control approach.

To perform phase control in Prior Art Case 1, triac 27 (see the conventional circuit configuration shown in FIG. 59) is turned on and off, whereby the AC 100 V power supply which would otherwise produce sine waves is driven in such a way that they are shaped to produce a motor current waveform as indicated by 60 in FIG. 11. When the triac 27 is turned on, the waveform 61 of the voltage on the main winding rises abruptly from 0 V to 280 V at a certain time, say, 0.055 sec and this is accompanied by an abrupt rise of the motor torque waveform 65. Thus, in response to the turning on of the triac 27, the motor torque changes abruptly to produce a vibrational force, which is transmitted to the structural assembly to develop noise.

The results of simulation of the driving of the same motor fan by performing "low-frequency pulsation" in accordance with the present invention are shown in FIGS. 17 to 22. The pattern of low-frequency pulsation shown in FIG. 17 consisted of 2 ON cycles and 4 OFF cycles (hereunder sometimes referred to as "2 ON, 4 OFF"). The rotor speed was 34 rad/sec in a steady state whether phase control (FIGS. 11 to 16) or low-frequency pulsation (FIGS. 17 to 22) was performed. In the low-frequency pulsation according to the invention, triac 27 was turned on at a source voltage of 0 volts. In the conventional phase control approach, turning on the triac 27 caused both the motor current waveform 60 and the motor torque waveform 65 to change abruptly from the downtrend to an uptrend to develop a great vibrational force at a certain time, say 0.055 sec (see FIGS. 11 and 16).

Figure 16:
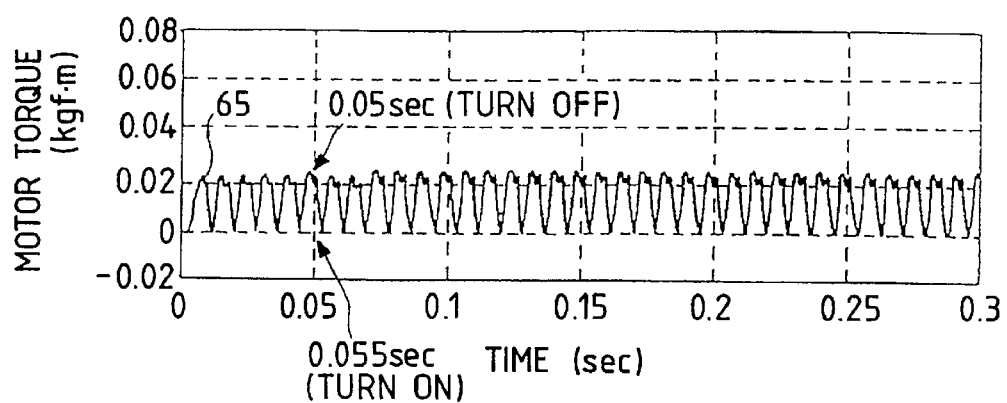
FIG. 16 shows a motor torque waveform as the result of simulating the driving of a motor in the Comparative Example with the main winding being subjected to the prior art phase control approach.
Figure 17:
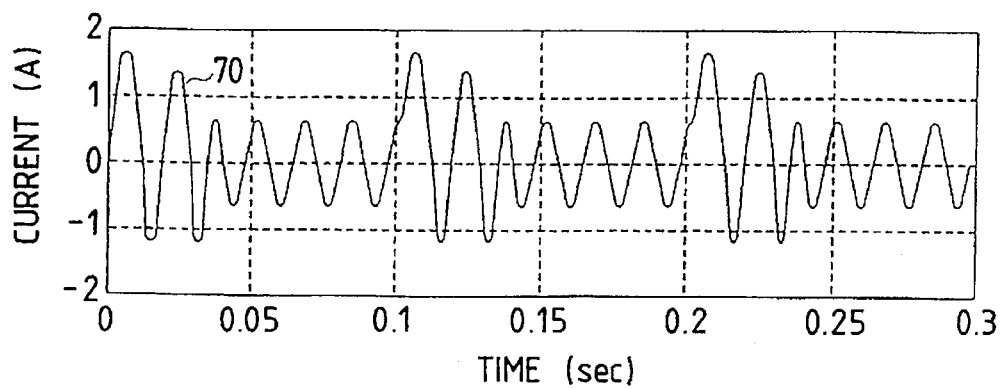
FIG. 17 shows a motor a current waveform as result of simulating the driving of a motor in Example 1 of the invention according to a pattern of 2 cycles ON and 4 cycles OFF.
Figure 18:
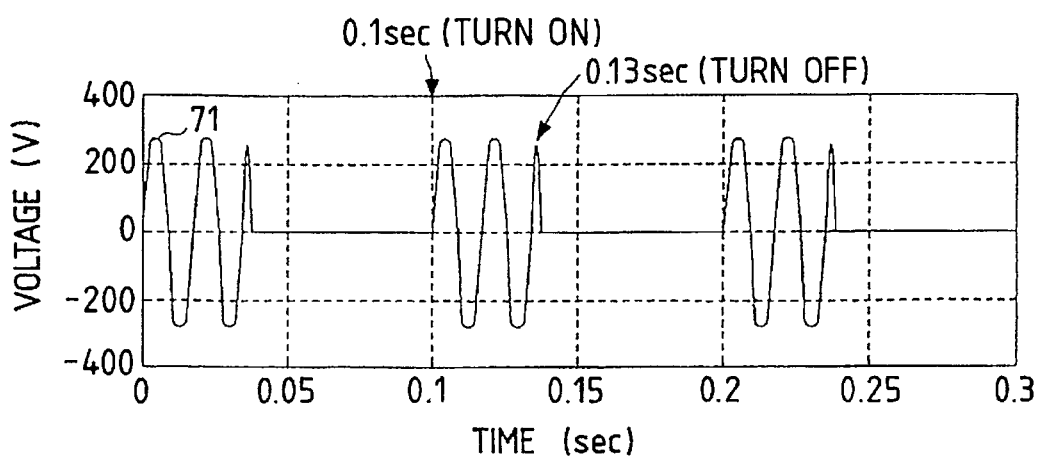
FIG. 18 shows a motor voltage waveform as the result of simulating the driving of a motor in Example 1 of the invention according to a pattern of 2 cycles ON and 4 cycles OFF.
Figure 19:
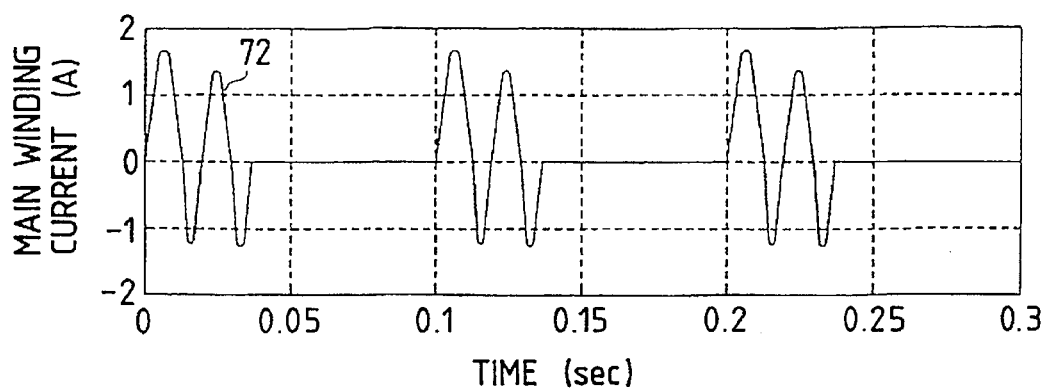
FIG. 19 shows a main winding current waveform as the result of simulating the driving of a motor in Example 1 of the invention according to a pattern of 2 cycles ON and 4 cycles OFF.
Figure 20:
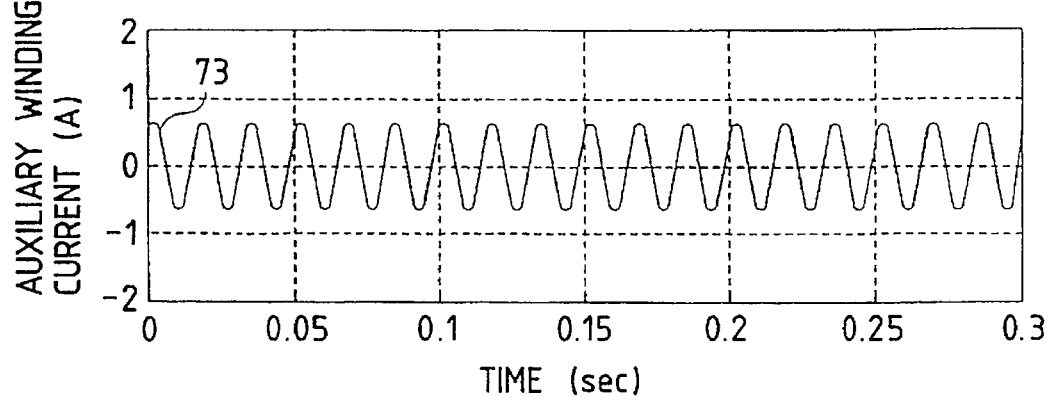
FIG. 20 shows an auxiliary winding current waveform as the result of simulating the driving of a motor in Example 1 of the invention according to a pattern of 2 cycles ON and 4 cycles OFF.
Figure 21:
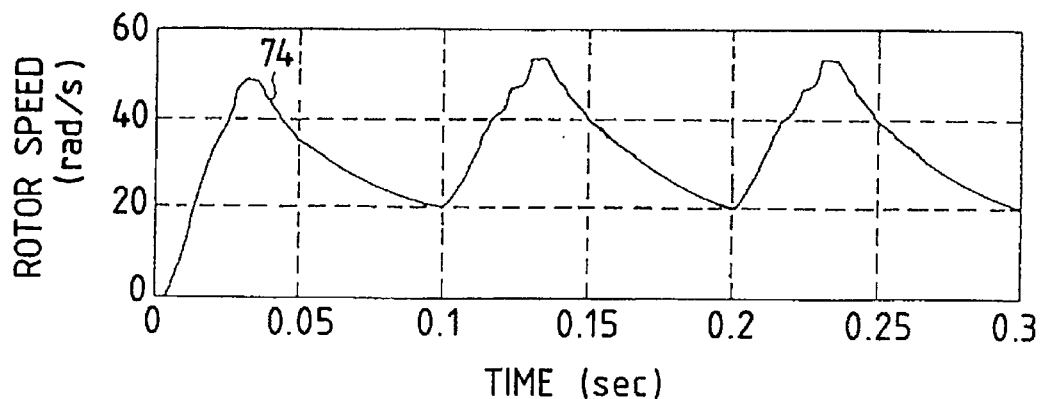
FIG. 21 shows a rotor speed waveform as the result of simulating the driving of a motor in Example 1 of the invention according to a pattern of 2 cycles ON and 4 cycles OFF.

In the low-frequency pulsation according to the invention, triac 27 was turned on at a predetermined time, say, 0.1 sec and yet the motor current waveform which was still on the uptrend merely increased in slope; similarly, the motor torque waveform 75 (see FIG. 22) was still on the uptrend and its slope increased by several times; nevertheless, the change was less abrupt than what occurred at a time of 0.055 sec in FIG. 16. Such reduced variations in motor torque that occurred following the turning on of triac 27 is the first mechanism by which the low-frequency pulsation according to the invention can accomplish sound attenuation.

Figure 22:
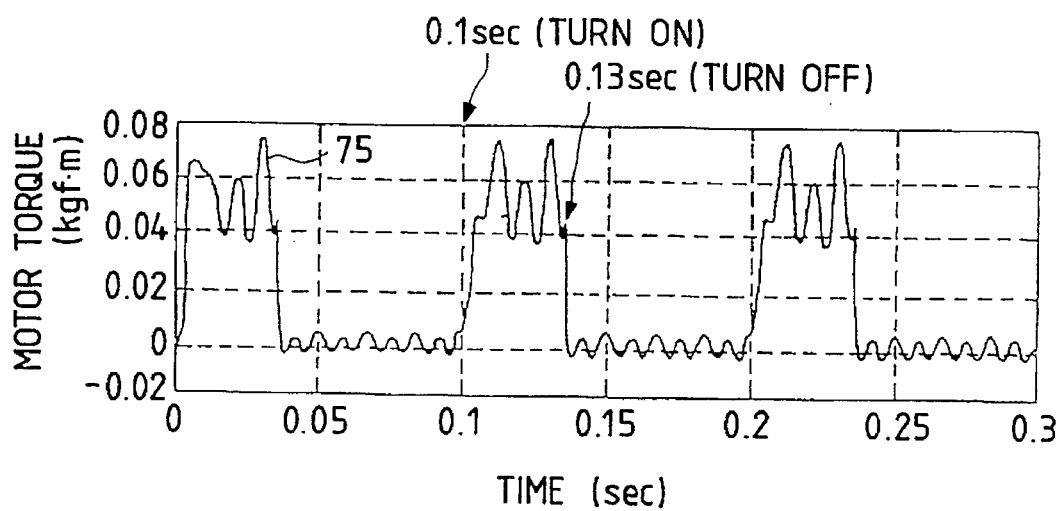
FIG. 22 shows a motor torque waveform as the result of simulating the driving of a motor in Example 1 of the invention according to a pattern of 2 cycles ON and 4 cycles OFF.

When triac 27 is turned off, comparable vibrational forces would develop in the two approaches as one can see by comparing the spiky torque variation at 0.055 sec in FIG. 16 with the spiky torque variation at 0.13 sec in FIG. 22.

Comparison will now be made of the number of times by which triac 27 is turned on and off per unit time. In the conventional phase control system shown in FIGS. 11 to 16, triac 27 is turned on and off at a frequency twice the commercial frequency (60 Hz) and, hence, it is not only turned on but also turned off at a frequency of 120 Hz, whereas in the low-frequency pulsation according to the invention which is shown in FIGS. 17 to 22, the triac is not only turned on but also turned off at a frequency of 10 Hz. The vibrational force in a frequency band that contributes greatly to the development of noise at higher frequencies than the commercial frequency is substantially affected by the torque pulsation that occurs as the triac 27 is turned on and off. Compared to the conventional phase control the low-frequency pulsation according to the invention allows the triac 27 to be turned on and off a smaller number of times per unit time (in the example under consideration, 1/12 of the number of times the triac is turned on and off in the prior art) and, hence, provides a sound attenuating effect.

Figure 23:
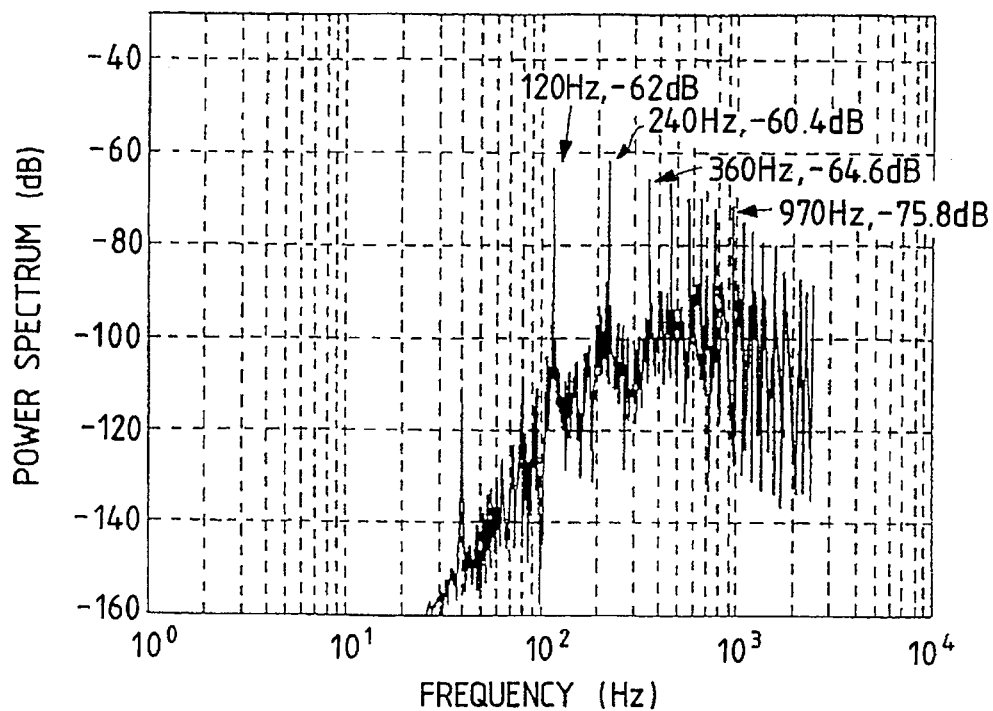
FIG. 23 shows the result of calculating the power spectrum of the motor torque waveform shown in FIG. 16.
Figure 24:
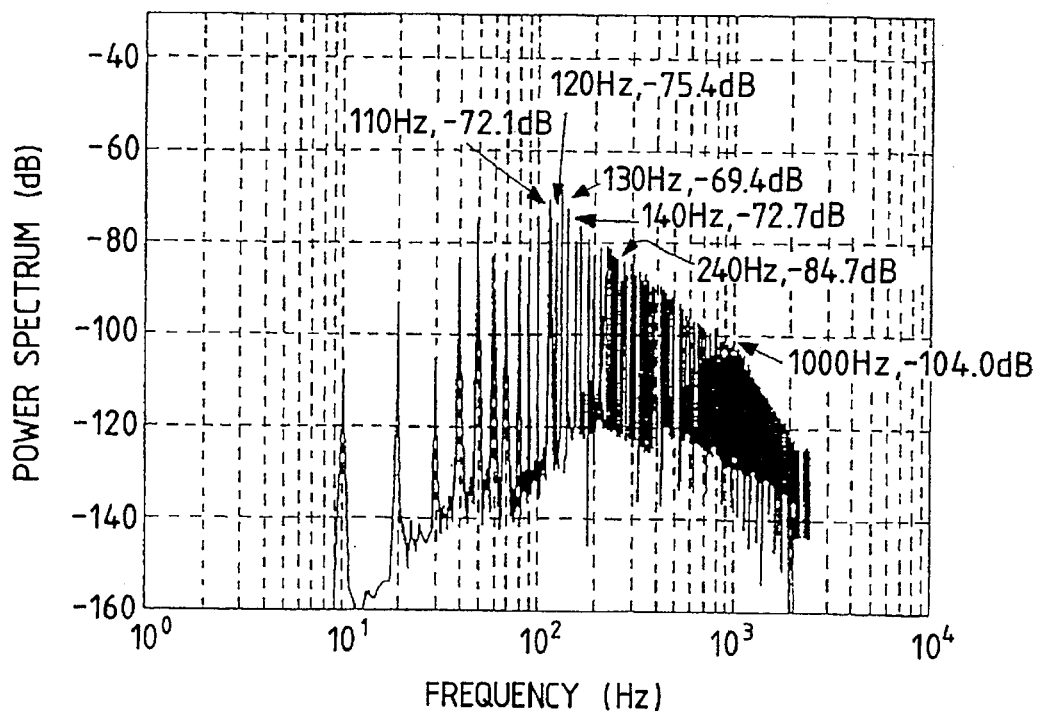
FIG. 24 shows the result of calculating the power spectrum of the motor torque waveform shown in FIG. 22.

Power spectra as calculated for the motor torque waveform 65 shown in FIG. 16 and for the motor torque waveform 75 shown in FIG. 22 are shown in FIGS. 23 and 24, respectively. The vertical axis of each diagram plots the common logarithm of a power spectrum times ten, which is then corrected with a circuit having noise characteristic A. As is generally known, a correcting circuit having characteristic A is a filter that performs frequency weighting of the human auditory sense. A sound level meter differs from a simple amplifier of a microphone output in that it has a built-in circuit for providing normalized auditory sense corrected characteristics. It is an electric circuit composed of a resistor and capacitor combination for insuring that the overall frequency characteristics of all components starting with a microphone and ending with the meter will approximate the characteristics of the auditory sense. In Japan, two characteristics A and C are specified for the sound level meter (characteristic B is optional in accordance with the JIS); some types of sound level meter are additionally provided with characteristic D for especial use in the evaluation of airplane noise or with a characteristic that is flat over a broad range. In the Weight and Measure Act, noise levels are defined by characteristic A and it is internationally agreed upon to perform all sound level measurements with characteristic A.

For the purposes of the present discussion, the supply frequency (f) is assumed to be 60 Hz. When the motor was driven under phase control (FIG. 23), predominant spectral values occurred at frequencies (120 Hz, 240 Hz, 360 Hz, . . . ) which were integral multiples of 2f (=120 Hz) and they were −62 dB (120 Hz), −60.4 dB (240 Hz) and −64.6 dB (360 Hz). At a frequency near 1 KHz, say, 970 Hz, the spectral value was −75.8 dB.

When the motor was driven under the low-frequency pulsation according to the present invention (FIG. 24), predominant spectral values occurred at frequencies that were multiples of 10 Hz. In the case under consideration, low-frequency pulsation is performed through 2-ON, 4-OFF cycles and each cycle consists of 6 wavelengths. Since the source frequency is 60 Hz, one can understand that predominant spectral values occurred at frequencies that were multiples of 10 Hz; the values at 120 Hz, 240 Hz and 360 Hz were −75.4 dB, −84.7 dB and −88.9 dB, respectively. At 1 KHz, the spectral value was −104.0 dB.

The difference between the two methods of motor energization control is obvious by comparing FIGS. 23 and 24. The low-frequency pulsation produced smaller spectral values than the phase control approach by amounts of 13.4 dB (at 120 Hz), 24.3 dB (at both 240 Hz and 360 Hz), and 28.2 dB (at 1 KHz or whereabouts).

In the actual model experiments already described, the noise level as measured at 120Hz in the low-frequency pulsation was different from the corresponding value in the phase control approach by as much as 11.9 dB (compare FIGS. 5 and 10). Since the simulated difference was 13.4 dB at 120 Hz, it can be seen that the results of simulation are in good agreement to the experimental results. FIG. 24 also shows that the effect of torque pulsation was the greatest at 130 Hz; however, as FIG. 5 shows, resonance with the mechanical system caused the actual model to produce the highest noise level by the component at 120 Hz.

Thus, the foregoing results demonstrate that the low-frequency pulsation is more effective than the phase control approach in Prior Art Case 1 for the purpose of suppressing the vibrations and noise due to components having frequencies proportional to 2f. The low-frequency pulsation is particularly effective in sharply cutting the spectral values in a high-frequency range and, hence, it will prove to be a powerful tool for evaluation in consideration of the audible range for humans.

Figure 25:
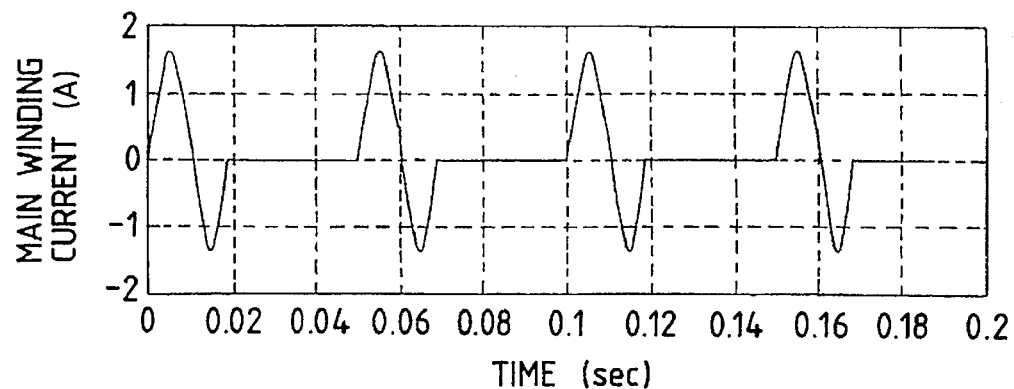
FIG. 25 shows a main winding current waveform as the result of simulating the driving of a motor by the method of the invention according to a pattern of 1 cycle ON and 2 cycles OFF.
Figure 26:
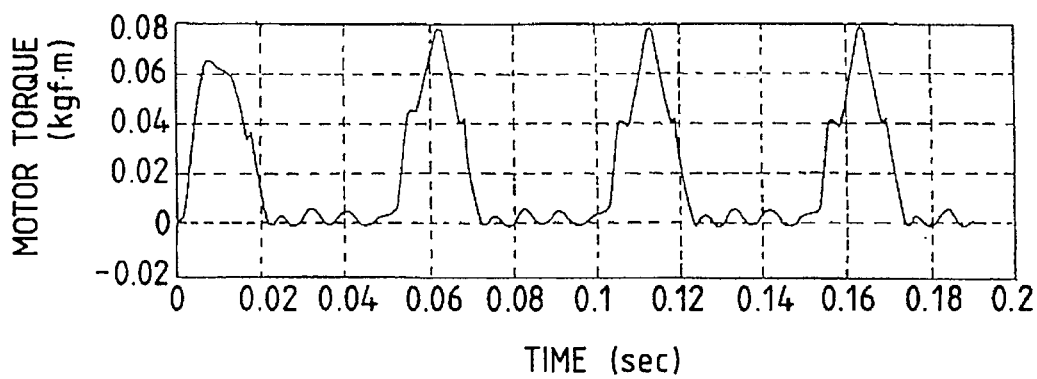
FIG. 26 shows a motor torque waveform as the result of simulating the driving of a motor by the method the invention according to a pattern of 1 cycle ON and 2 cycles OFF.
Figure 27:
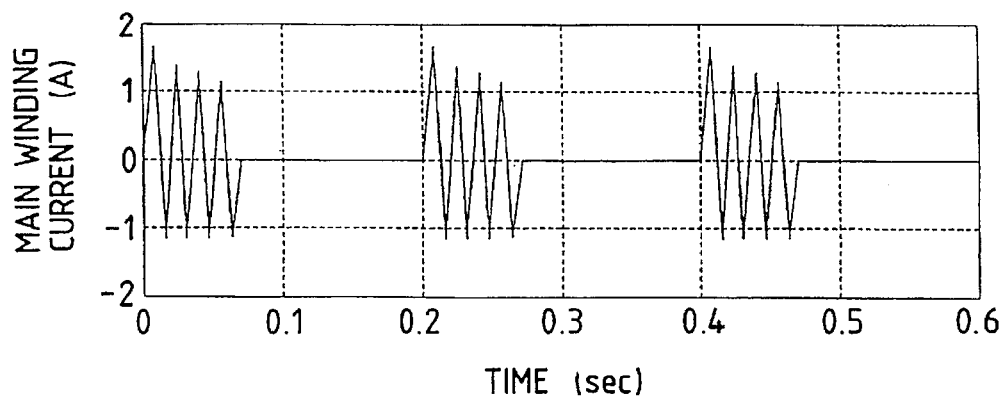
FIG. 27 shows a main winding current waveform as the result of simulating the driving of a motor by the method of the invention according to a pattern of 4 cycles ON and 8 cycles OFF.
Figure 28:
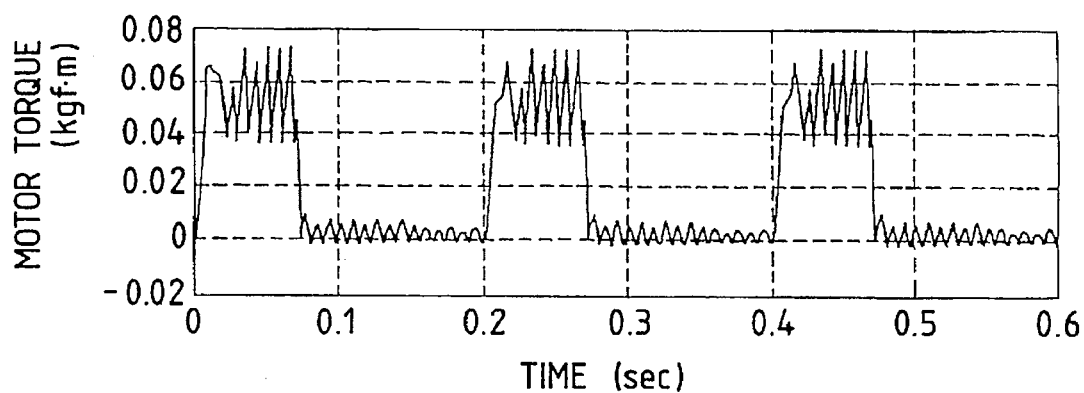
FIG. 28 shows a motor torque waveform as the result of simulating the driving of a motor by the method of the invention according to a pattern of 4 cycles ON and 8 cycles OFF.

FIGS. 25 and 26 show the results of simulation of driving with the 1-ON, 2-OFF pattern in terms of the waveform of a current flowing through the main winding and the waveform of motor torque, respectively. FIGS. 27 and 28 show the results of simulation of driving with the 4-ON, 8-OFF pattern in terms of the waveform of a current flowing through the main winding and the waveform of motor torque, respectively. Since both driving patterns produce the same percent energization, the rotational speed was substantially the same.

Figure 29:
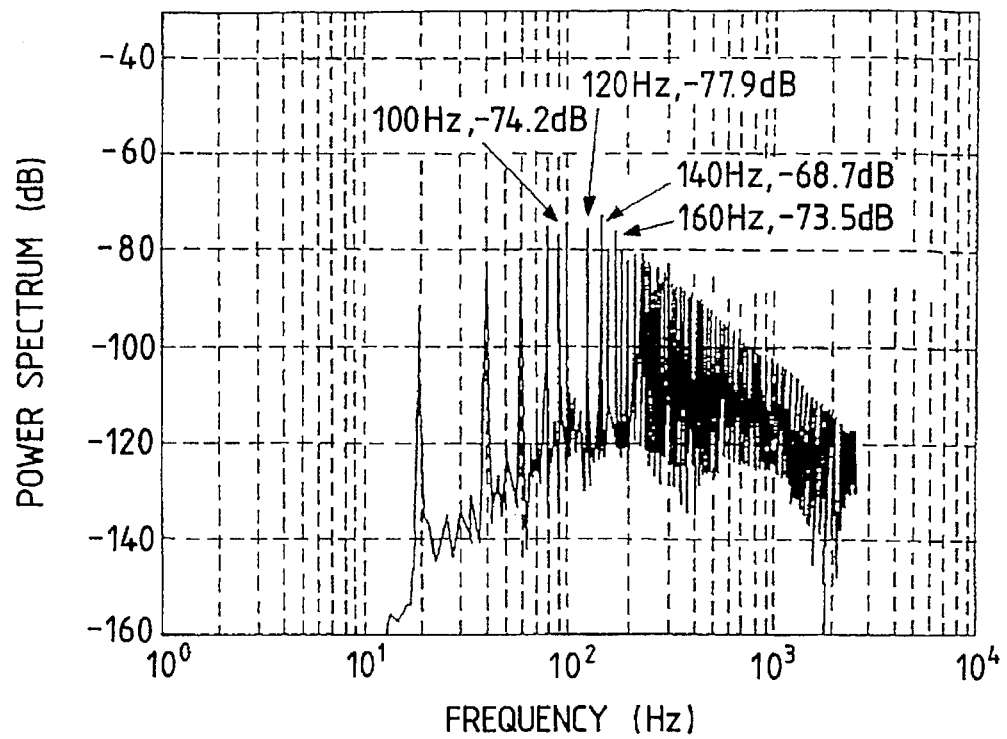
FIG. 29 shows the result of simulating the power spectrum of the motor torque waveform shown in FIG. 26.
Figure 30:
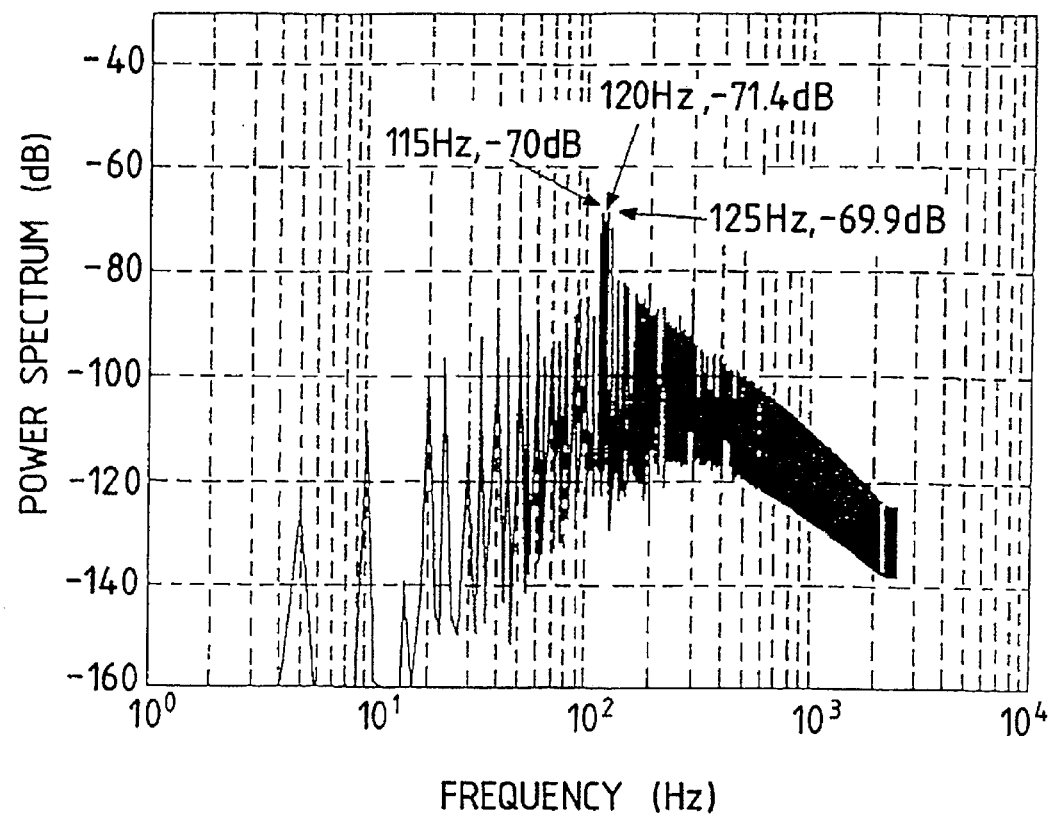
FIG. 30 shows the result of simulating the power spectrum of the motor toque waveform shown in FIG. 28.

The results of simulation of power spectra of the torque waveforms shown in FIGS. 26 and 28 are depicted in FIGS. 29 and 30, respectively. FIG. 29 shows the results of simulation of driving with the 1-ON, 2-OFF pattern at a fundamental frequency of 20 Hz, which was 1/3 of the source frequency 60 Hz. Spectral peaks occurred at frequencies of 40 Hz, 60 Hz, 80 Hz, . . . , which were integral multiples of 20 Hz. After correction with characteristic A, a maximum peak of −68.7 dB occurred at 140 Hz and that was 9.2 dB greater than −77.9 dB which occurred at 2f (=120 Hz).

FIG. 30 shows the results of simulation of driving with the 4-ON, 8-OFF pattern at a fundamental frequency of 5 Hz, which was 1/12 of the source frequency 60 Hz. Spectral peaks occurred at frequencies of 5 Hz, 10 Hz, 15 Hz, 20 Hz, . . . which were integral multiples of 5 Hz. After correction with characteristic A, a maximum peak of −69.9 dB occurred at 125 Hz and that was 1.5 dB greater than −71.4 dB which occurred at 2f (=120 Hz).

Table 1 shows the frequencies of the top three torque spectral peaks as read from FIGS. 24, 29 and 30, as well as the spectral values at 120 Hz.

TABLE 1

| Drive pattern | Frequency/dB value of spectral peak | | | Spectral value (dB) at 120 Hz |
| --- | --- | --- | --- | --- |
| | 1st | 2nd | 3rd | |
| 1-ON, 2-OFF | 140 Hz/−68.7 dB | 160 Hz/−73.5 dB | 100 Hz/−74.2 dB | −77.9 dB |
| 2-ON, 4-OFF | 130 Hz/−69.4 dB | 110 Hz/−72.1 dB | 140 Hz/−72.6 dB | −75.4 dB |
| 4-ON, 8-OFF | 125 Hz/−69.9 dB | 115 Hz/−70 dB | 120 Hz/−71.4 dB | −71.4 dB |

As is clear from Table 1, the frequency of torque pulsation changed greatly with the drive pattern. For each drive pattern, a maximum peak occurred at a frequency that was the result of addition of the fundamental frequency of the drive pattern of interest to 2f (=120 Hz). The second peak occurred at 160 Hz in the 1-ON, 2-OFF pattern (160 Hz was the result of addition of twice the fundamental frequency 20 Hz to 2f), at 110 Hz in the 2-ON, 4-OFF pattern (110 Hz was the result of subtraction of the fundamental frequency 10 Hz from 2f), and at 115 Hz in the 4-ON, 8-OFF pattern (115 Hz was the result of subtraction of the fundamental frequency 5 Hz from 2f).

The torque pulsation at 2f (=120 Hz) was the smallest in the 1-ON, 2-OFF pattern, the second smallest in the 2-ON, 4-OFF pattern, and the greatest in the 4-ON, 8-OFF pattern; the difference between the 1-ON, 2-OFF pattern and the 4-ON, 8-OFF pattern was 6.5 dB.

Figure 31:
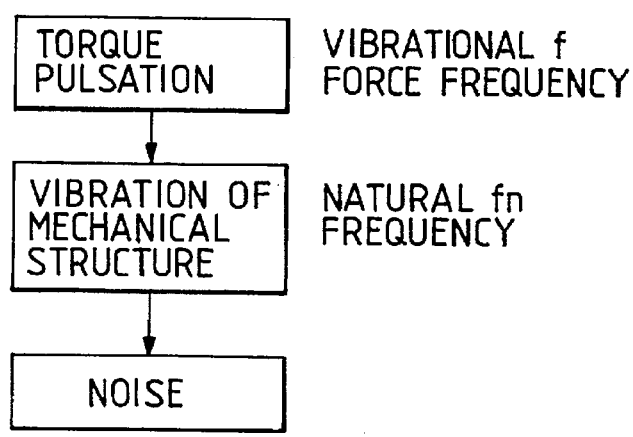
FIG. 31 illustrates the mechanism by which a vibrational force eventually causes noise and which provides the basis for the operating principle of the invention.

As described above, the frequency characteristics of torque pulsation vary subtly with the drive pattern and, hence, magnetic sound can be reduced by selecting an appropriate drive pattern in accordance with the vibrational characteristics of the mechanical structures on which a fan motor is to be installed. As FIG. 31 shows, the torque pulsation of a fan motor vibrates the associated mechanical structures to develop a magnetic sound and, hence, the vibration of the mechanical structures will increase if their natural frequency fn coincides with the dominant frequency f of the torque pulsation. In other words, by selecting an appropriate drive pattern in accordance with the mechanical structures used, the unwanted mechanical resonance can be avoided to attenuate the magnetic sound.

In practice, the low-frequency pulsation produces torque waveforms as shown in FIG. 22 (4-ON, 8-OFF pattern) and FIG. 26 (1-ON, 2-OFF pattern). Obviously, subtle differences in the shape of torque waveforms produce changes in the dominant frequencies of torque spectra.

EXAMPLE 1-3

Example 1-3 of the invention will now be compared with the drive pattern of Prior Art Case 2 as they were used in the control of a current being applied through the main winding. Actually, both the main and auxiliary windings are subjected to on-off control in Prior Art Case 2; however, in order to enable comparison of different energization patterns, simulation was performed under the stated conditions.

The specifications of the motor and associated mechanical structures that were used in the simulation were the same as those adopted to obtain the data shown in FIGS. 23, 24, 29 and 30. With varying energization patterns, the temporal waveforms of motor torque were simulated to determine the spectra of torque variations and the results are shown in FIGS. 32 to 35. The respective drive patterns were as follows: 2-ON, 1-OFF (FIG. 32); 4-ON, 2-OFF (FIG. 33); 2-ON, 2-OFF (FIG. 34); and 3-ON, 3-OFF (FIG. 35). Table 2 lists the characteristics of the top six peaks in the respective spectra. The dB values for the spectra shown in FIGS. 32 to 35 and Table 2 are after correction with characteristic A.

TABLE 2

| Drive pattern | Frequency/dB value of spectral peak | | | | | |
|---|---|---|---|---|---|---|
| | 1st | 2nd | 3rd | 4th | 5th | 6th |
| 2-ON, 1-OFF | 120 Hz/−64.3 dB | 140 Hz/−66.5 dB | 100 Hz/−67.0 dB | 160 Hz/−69.6 dB | 60 Hz/−73.5 dB | 220 Hz/−74.5 dB |
| 4-ON, 2-OFF | 120 Hz/−63.1 dB | 130 Hz/−67.0 dB | 110 Hz/−67.1 dB | 140 Hz/−72.1 dB | 170 Hz/−76.4 dB | 160 Hz/−76.7 dB |
| 2-ON, 2-OFF | 135 Hz/−66.4 dB | 120 Hz/−68.6 dB | 105 Hz/−69.0 dB | 165 Hz/−73.2 dB | 150 Hz/−75.5 dB | 195 Hz/−76.0 dB |
| 3-ON, 3-OFF | 120 Hz/−66.8 dB | 120 Hz/−67.4 dB | 110 Hz/−68.1 dB | 150 Hz/−74.0 dB | 140 Hz/−76.6 dB | 170 Hz/−76.9 dB |

Figure 32:
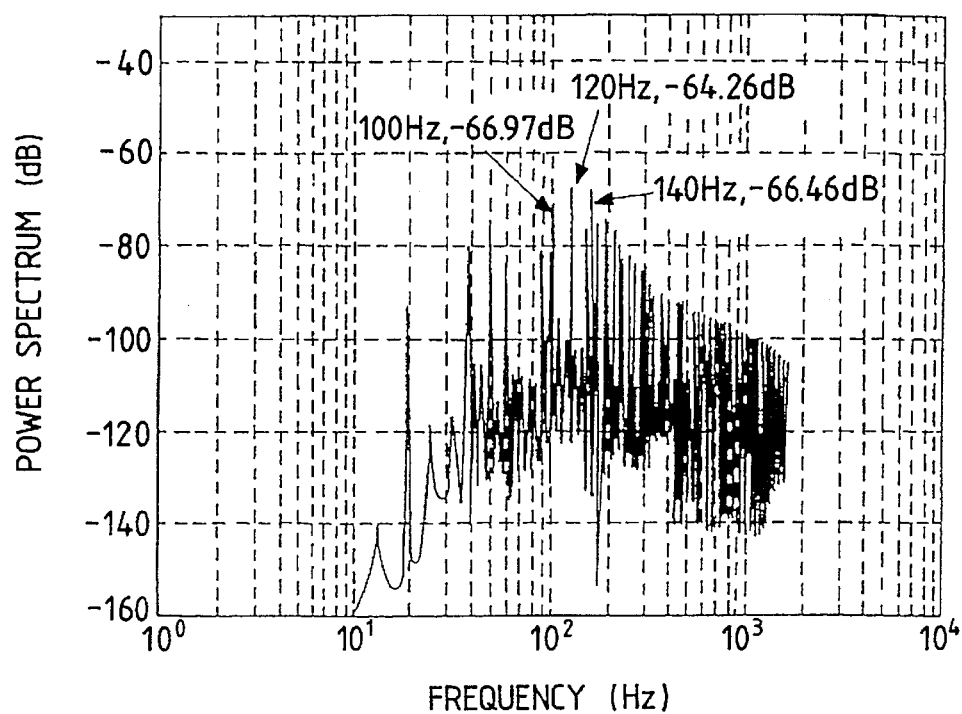
FIG. 32 shows the result of simulating the power spectrum of a motor torque waveform that occurred during motor driving by the method of the invention according to a pattern of 2 cycles ON and 1 cycle OFF.
Figure 33:
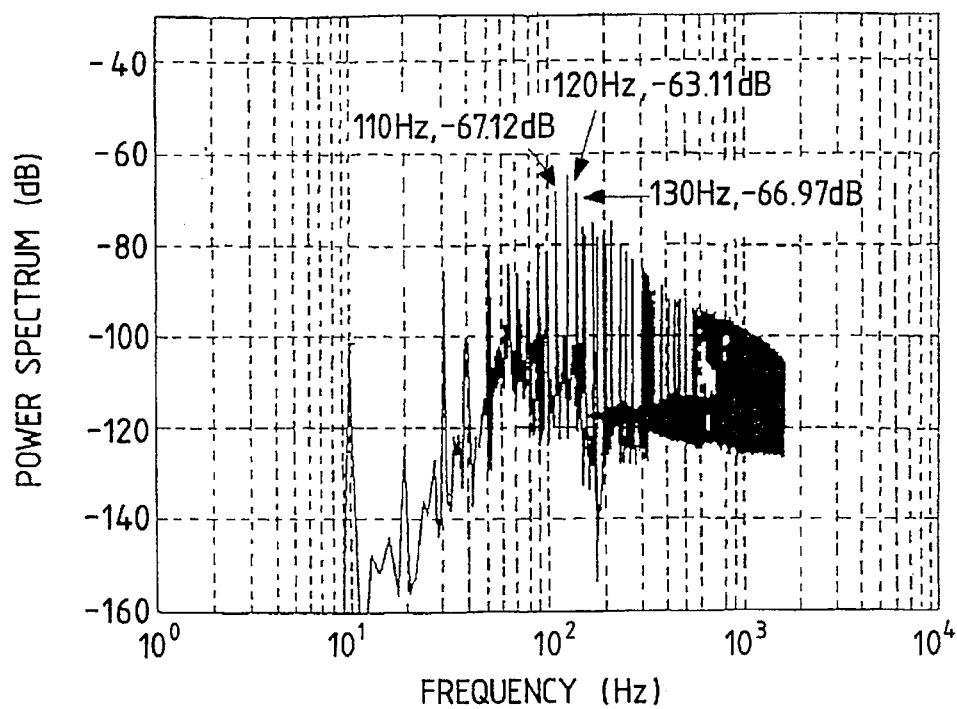
FIG. 33 shows the result of simulating the power spectrum of a motor torque waveform that occurred during motor driving by the method of the invention according to a pattern of 4 cycles ON and 2 cycles OFF.
Figure 34:
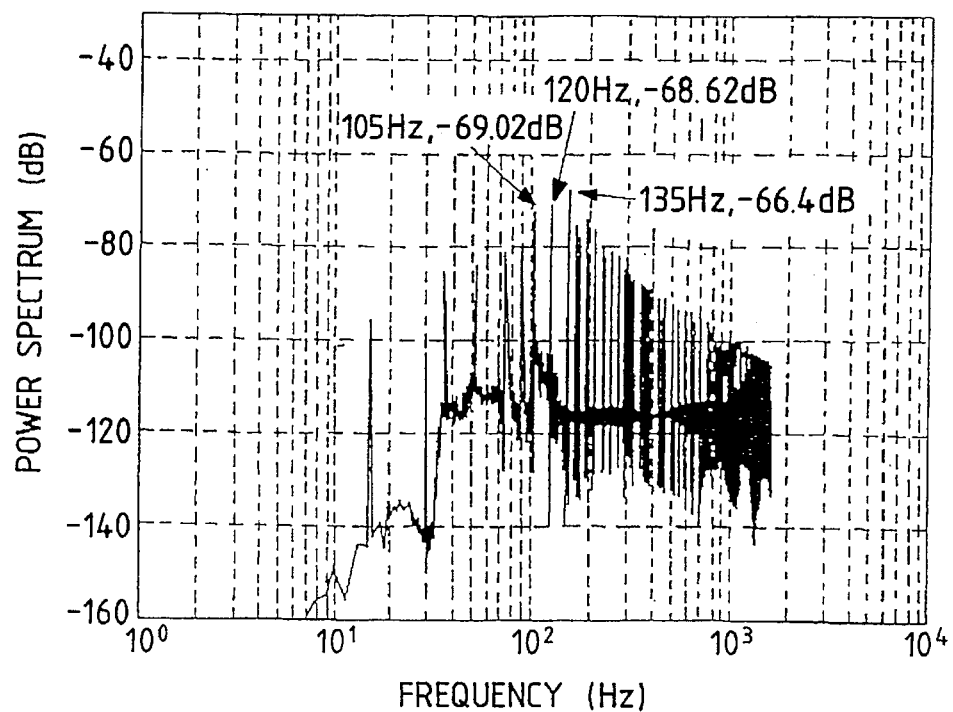
FIG. 34 shows the result of simulating the power spectrum of a motor torque waveform that occurred during motor driving by the method of the invention according to a pattern of 2 cycles ON and 2 cycles OFF.
Figure 35:
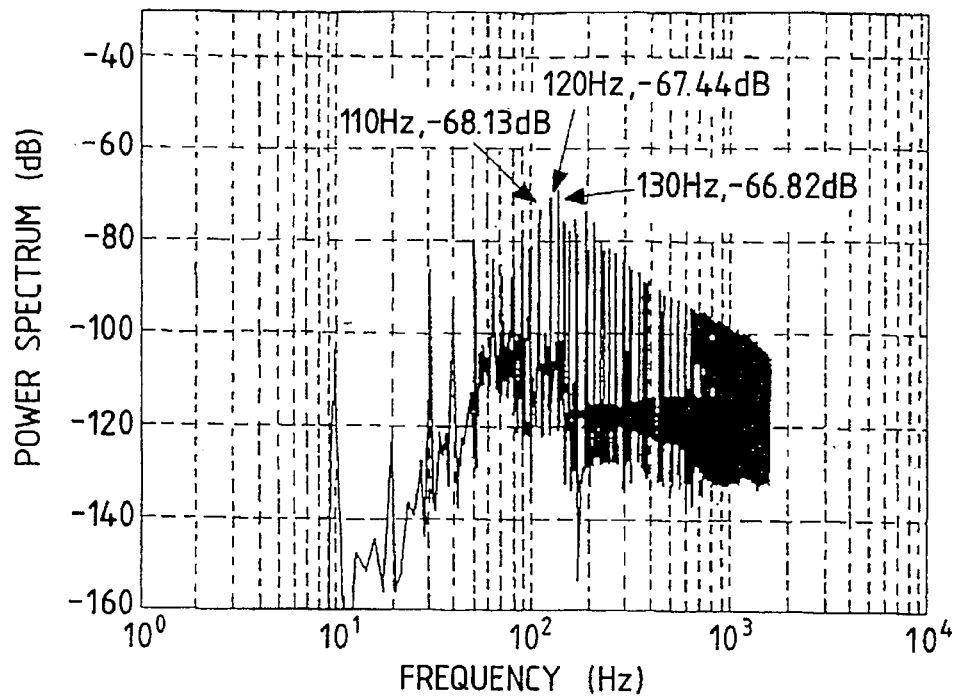
FIG. 35 shows the result of simulating the power spectrum of a motor torque waveform that occurred during motor driving by the method of the invention according to a pattern of 3 cycles ON and 3 cycles OFF.

FIGS. 32 and 34 show the energization patterns of the low-frequency pulsation that was effected in Example 1-3, and FIGS. 33 and 35 show the energization patterns used in Prior Art Case 2. Comparing FIGS. 32 and 33 (67% energization) and FIGS. 34 and 35 (50% energization), one can see that the level of 120 Hz torque pulsation that occurred in Example 1-3 was 1.2 dB(A) lower than the level that occurred in Prior Art Case 2. Obviously, the small number of ON cycles contributed to suppress the development of 2f torque pulsation in the capacitor motor.

While Example 1-3 of the invention and Prior Art Case 2 have been compared in order to demonstrate the superiority of the former in terms of the frequency characteristics of torque, it should also be noted that the present invention has the following advantages as regards the rotational angle of the stator in a motor and the axial displacement of the rotor. Generally speaking, the increase in the vibrational frequency leads to a smaller amplitude of vibrations under the vibrational force on account of the effect of the mass of the member which receives the vibrational force. Hence, given the same vibrational force, the amplitude of vibrations can be reduced by increasing the vibrational frequency. If the amplitude of vibrations decreases, not only the rattling and play of mechanical members but also their bumping and vibrations in clearances can be avoided to reduce abnormal sounds such as "tapping". In Example 1-3, the number of ON cycles is fixed at 2 and 50% energization is attained by using a 2-ON, 2-OFF pattern. In this case, the fundamental frequency of the vibrational force by ON-OFF cycles is 15 Hz (=60 Hz/4). In contrast, each on-off pattern consists of 6 cycles in Prior Art Case 2 and 50% energization is attained by using a 3-ON, 3-OFF pattern. In this case, the fundamental frequency of the vibrational force by ON-OFF cycles is 10 Hz (=60 Hz/6). Thus, according to the present invention, the fundamental frequency of the vibrational force can be increased to reduce the amplitude of vibrations by a sufficient degree to avoid bumping due to rattling, thereby attenuating "tapping" and other abnormal sounds.

A specific discussion will now be made. The load of a fan motor in an indoor unit of an air conditioner is supported by anti-vibration rubber to protect against vibrations and the motor frame for supporting the motor stator is often supported elastically in a torsional direction. A reaction force to the torque that develops in the motor causes the motor frame to be vibrated in the torsional direction. Then, in the region where the vibrational frequency is higher than the natural frequency of the anti-vibrational support system, the amplitude of vibrations is generally in inverse proportion to the square of the vibrational frequency. In the case under consideration, (10 Hz/15 Hz)×(10 Hz/15 Hz)=1/2.25 and, hence, the vibrational amplitude can be reduced to 1/2.25 of the value achieved in Prior Art Case 2. This advantage of the invention is particularly great if the natural frequency of the motor load supporting system is adjusted to 100 Hz or below.

It should also be noted that in a motor, the axial dimensions of the rotor are offset slightly from those of the stator on account of the unavoidable low precision in manufacture. This defect is generally called "displacement in the magnet center", which produces not only torque but also an axial vibrational force in the motor. If the rotor or stator is skewed to provide slots at an angle, the axial vibrational force will act irrespective of whether the magnet center is correctly positioned. The rotor is retained axially by suitable means such as a conical spring but the spring constant of the retainer system is sometimes designed to be so low as to attain balance with the life of the bearing. In this case, the vibrational frequency of the motor becomes higher than the natural frequency of the retainer system and, by the same mechanism as described in the preceding paragraph, the increased vibrational force frequency contributes to damped vibrations in the axial direction. What is worth particular mention is the shaft part of the motor. This is composed of a bearing and other mechanical elements and, therefore, if the intensity of vibrations increases, vibrational bumping will occur in the clearance between mechanical elements to increase the chance of the development of an abnormal sound. Therefore, if the vibrational frequency is increased as in the example under consideration, the development of abnormal sounds can be prevented. This advantage is also attained with a motor design in which the shaft force of a fan is directly transmitted as an axial force to the shaft of the motor.

EXAMPLE 2

Another example of the invention will now be described. In order to suppress noise and vibrations, the number of ON cycles is fixed at 2 and the number of OFF cycles is varied to change the percent energization of a motor. Cycle patterns that are effective for this purpose may be applied in the manner described in Example 2. FIG. 36 lists the values of percent energization as achieved by various cycle patterns with the number of ON cycles being fixed at 2. Four principal patterns (Nos. 1 to 4) are combined and the number of OFF cycles in each of those patterns is adjusted to cause fine tuning of the percent energization. The combinations shown in FIG. 36 are just an example and similar techniques may be employed to produce other values of percent energization.

EXAMPLE 3

Figure 37:
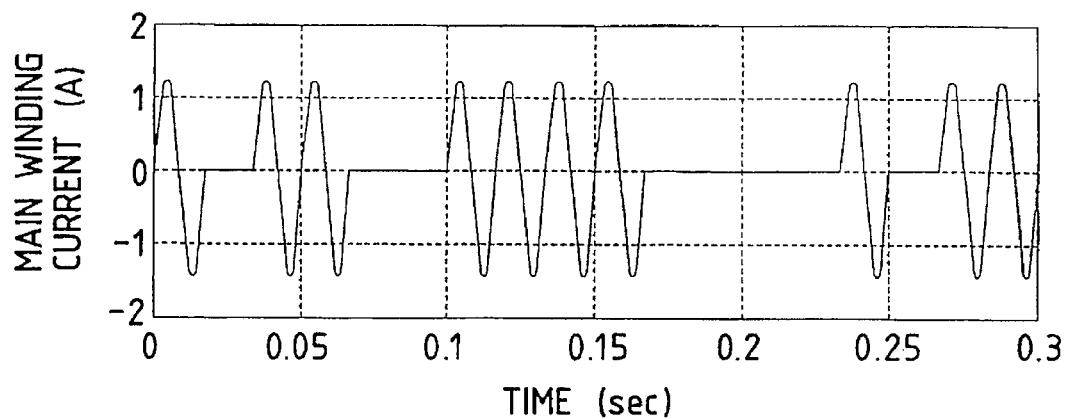
FIG. 37 shows a main winding current waveform as the result of simulating the driving of a motor with the drive unit of Example 3 of the invention using the combination of three different patterns that would produce the same percent energization.
Figure 38:
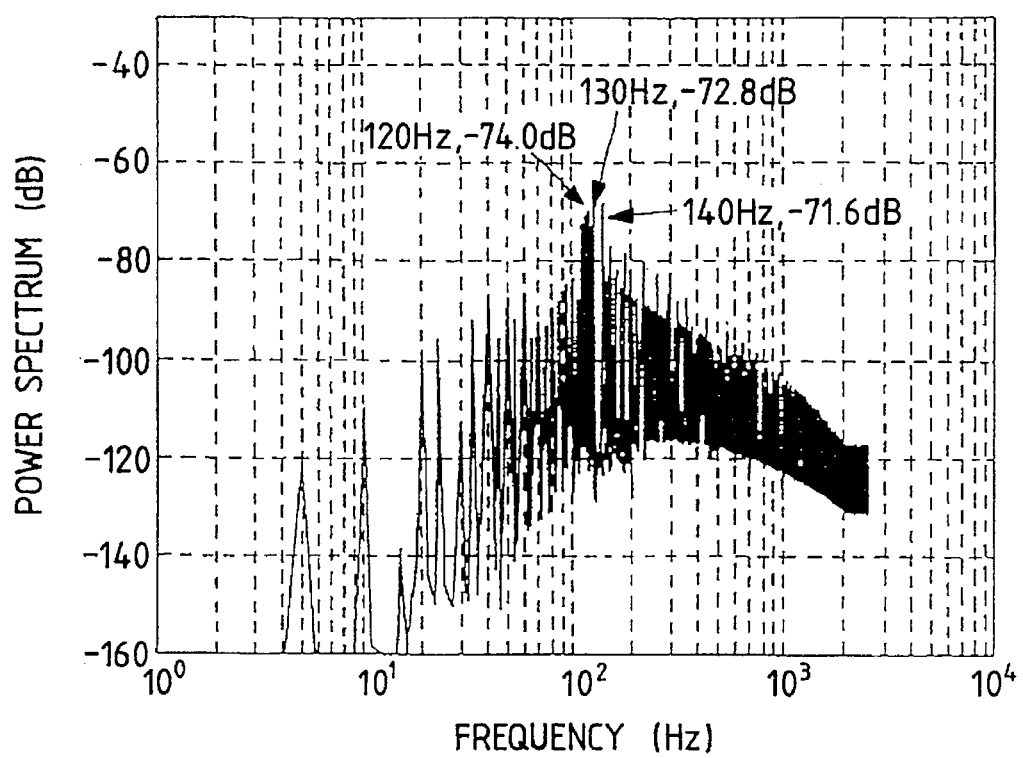
FIG. 38 shows the result of simulating the power spectrum of the noise that would be caused by the drive patterns employed to produce the waveform shown in FIG. 37.

Still another example of the invention will now be described. This is an example of low-frequency pulsation as performed with drive patterns that are intended to produce smaller peak values in the spectrum of torque pulsation. FIG. 38 shows the results of simulation of the torque spectrum that would be obtained when a motor of the same type as used in Example 1 were driven by repeating three different patterns that produce the same percent energization, i.e., 1-ON/2-OFF, 2-ON/4-OFF and 4-ON/8-OFF patterns (see FIG. 37). As one can see from FIG. 38, the greatest torque pulsation was caused by a frequency component of 140 Hz and the pulsation level was −71.6 dB. Comparison with the maximum peaks of torque pulsation shown in FIGS. 24, 29, 30 and Table 1 indicates that the pulsation level −71.6 dB is 2.9 dB lower than −68.7 dB which is the maximum value for the 1-ON/1-OFF pattern in Example 1 and 1.7 dB lower than −69.9 dB which is the maximum value for the 4-ON/8-OFF pattern in Example 1.

Looking at Table 1, one can see that the 1-ON/2-OFF, 2-ON/4-OFF and 4-ON/8-OFF patterns produce spectral peaks at slightly varying frequencies. Hence, by driving the motor according to the sequence of those patterns, the frequencies of spectral peaks can be sufficiently distributed to produce smaller spectral values.

Thus, the torque level and, hence, the noise and vibrations can be reduced by combining several drive patterns that yield the same percent energization.

Figure 40:
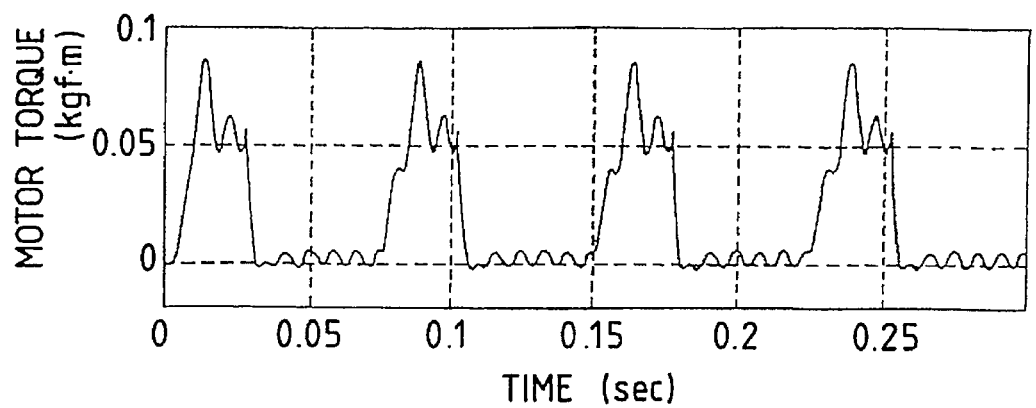
FIG. 40 shows a torque waveform as produced by driving according to a pattern of 1.5 cycles ON and 3 cycles OFF.

The foregoing description assumes that the number of energization or de-energization cycles (times) is an integral multiple (e.g. 1, 2, . . . ) of the power source period. It should, however, be understood that those cycles may be counted in integral multiples of one half the cycle period of power source, e.g. 1.5, 2.5, 3.5 . . . An example is driving to a 1.5-ON/3-OFF pattern and FIG. 40 shows the result of simulation of the torque waveform that would be produced in this case. Obviously, the waveform is of an intermediate nature between the waveforms shown in FIGS. 26 and 28 and a satisfactory result was attained by energizing the motor through a number of cycles that is an integral multiple of one half the source period.

Figure 41:
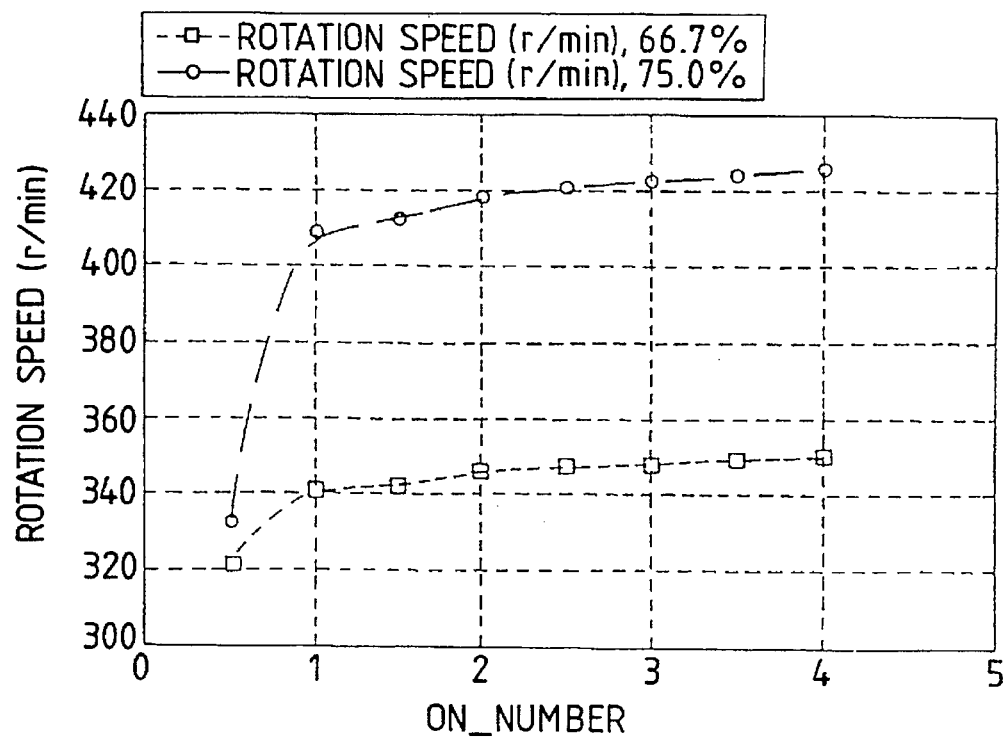
FIG. 41 shows the relationship between the number of ON cycles and the rotational speed of a motor.

FIG. 41 shows how the rotational speed of a motor varied when the number of ON cycles was changed with the percent energization α being held at a constant value. Obviously, 1.5 ON cycles, 2.5 ON cycles and 3.5 ON cycles are equally applicable.

The foregoing description also assumes the use of a single-phase motor with a capacitor. It should, however, be understood that polyphase motors which merely differ from the single-phase in the number of phases can be used to achieve the same results by applying the same concept of the invention.

An additional discussion need be made about another construction of a single-phase motor. In the foregoing examples, discussion has been directed to the case of performing on-off control over the main winding alone. However, this is not the sole case of the invention and reasonable advantages can be attained by performing on-off control over both the main and auxiliary windings.

EXAMPLE 4

Figure 39:
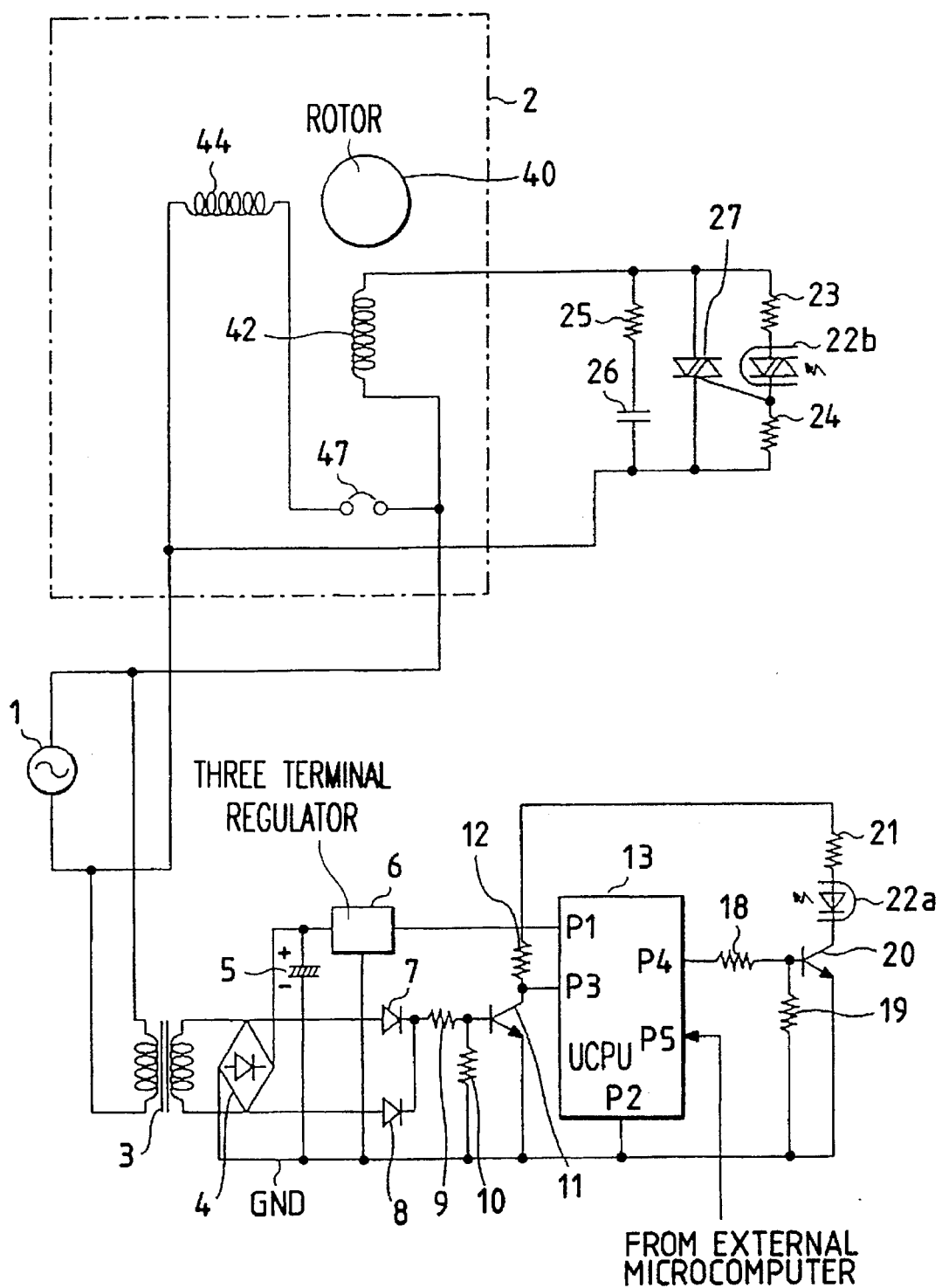
FIG. 39 shows a circuit configuration for Example 4 of the invention.

This example concerns the application of the invention to a pure, single-phase induction motor. FIG. 39 shows a circuit configuration of a split-phase start, single-phase induction motor. As shown, an auxiliary winding 44 is connected to an AC power supply 1 via a start switch 47. At start time, auxiliary winding 44 is also energized to produce a starting torque; however, after startup, the rotational speed increases and the resulting centrifugal force causes the start switch 47 to open and the machine operates as a pure, single-phase induction motor with only the main winding energized. Triac 27 is then controlled to perform speed control in the same manner as with a capacitor motor.

Another problem with air conditioners is that their outdoor units produce audible abnormal sounds due to pulsation while the compressor is on. While this could be solved by several methods, one applicable approach is as follows.

Provide an Lo tap (T connection) in the form of an additional winding to the motor. The tap is not for speed control but for setting various units at a common minimum rotational speed. If the rated rotational speed is yet to be determined because the motor is under development, tapping is provided at a minimal rotational speed that is set to be low enough to allow for a safety margin.

Figure 42:
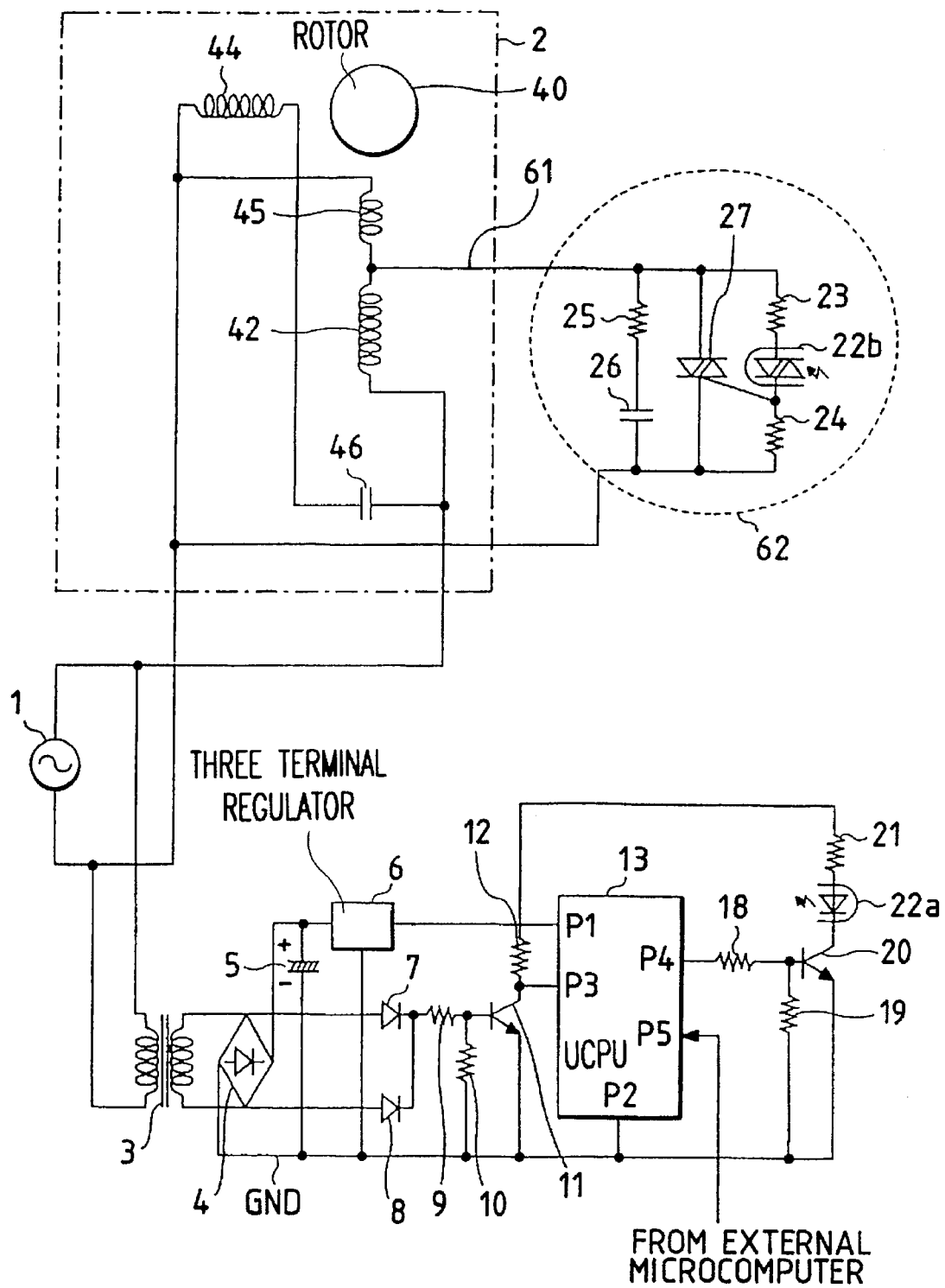
FIG. 42 shows a circuit configuration for low-frequency pulsation with an additional winding provided on a motor.

A specific circuit configuration for implementing this approach is shown in FIG. 42. An Lo tap (T connection) provided in the form of an additional winding is connected to a solid-state relay 62. Selection between a Hi notch and Lo notch 61 is made by means of the solid-state relay 62. Conventionally, control for full (100%) energization starts at speed zero; this is not the case in pulsation that uses Lo notch 61 but speed control is effected between the Lo notch and the Hi notch (full energization), thereby producing smaller torque pulsations. The reduction in torque pulsations is from about a third to about one half of the conventional value and, hence, the expected noise attenuation is by 6 dB to 10 dB.

Figure 43:
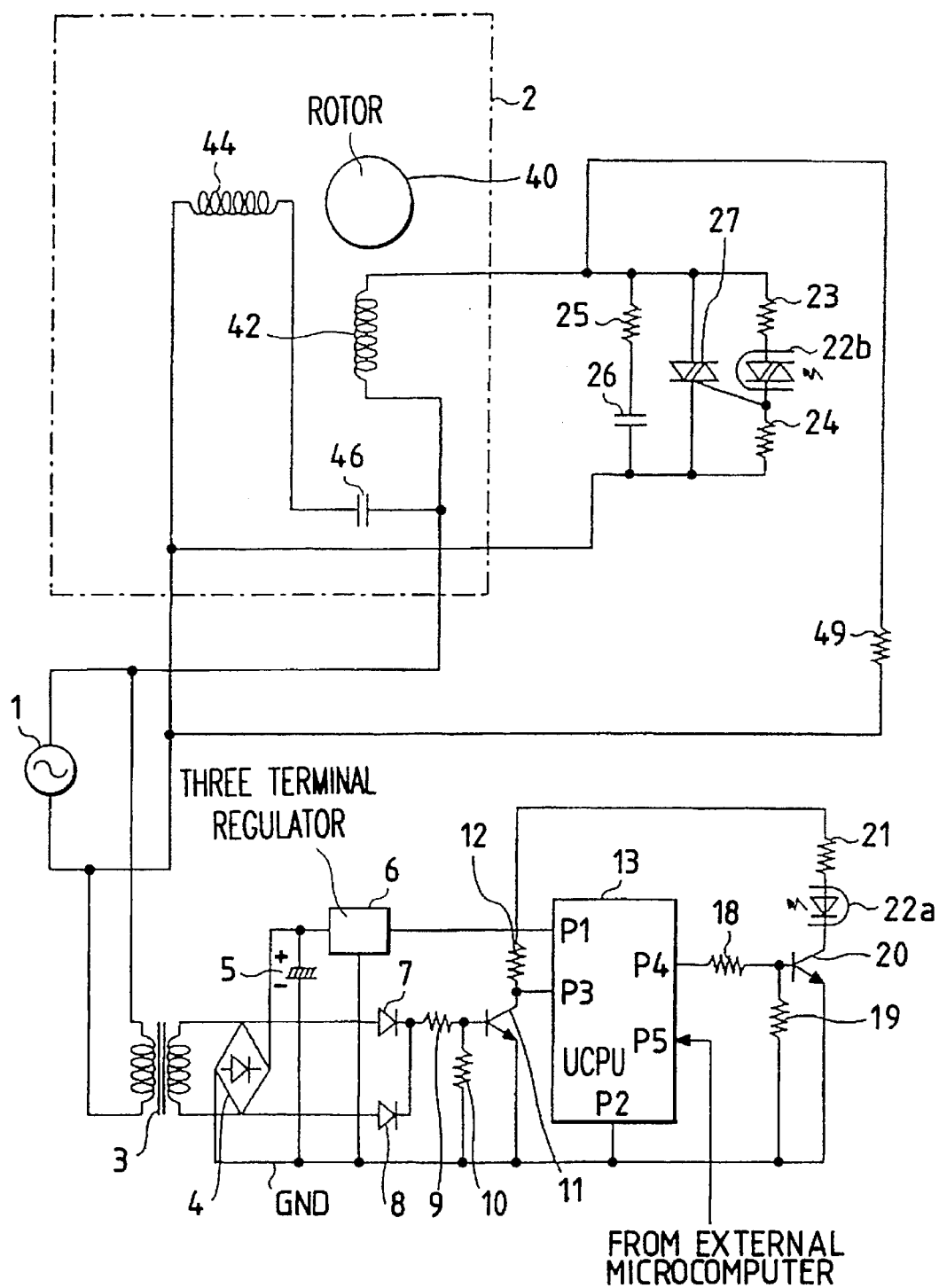
FIG. 43 shows a circuit configuration for a modification of Example 4 in which the additional winding is fitted with an external resistance.

The additional winding may be fitted with an external resistance as indicated by 49 in FIG. 43. This design is also effective in eliminating abnormal sounds during low-frequency pulsation.

EXAMPLE 5

Figure 44:
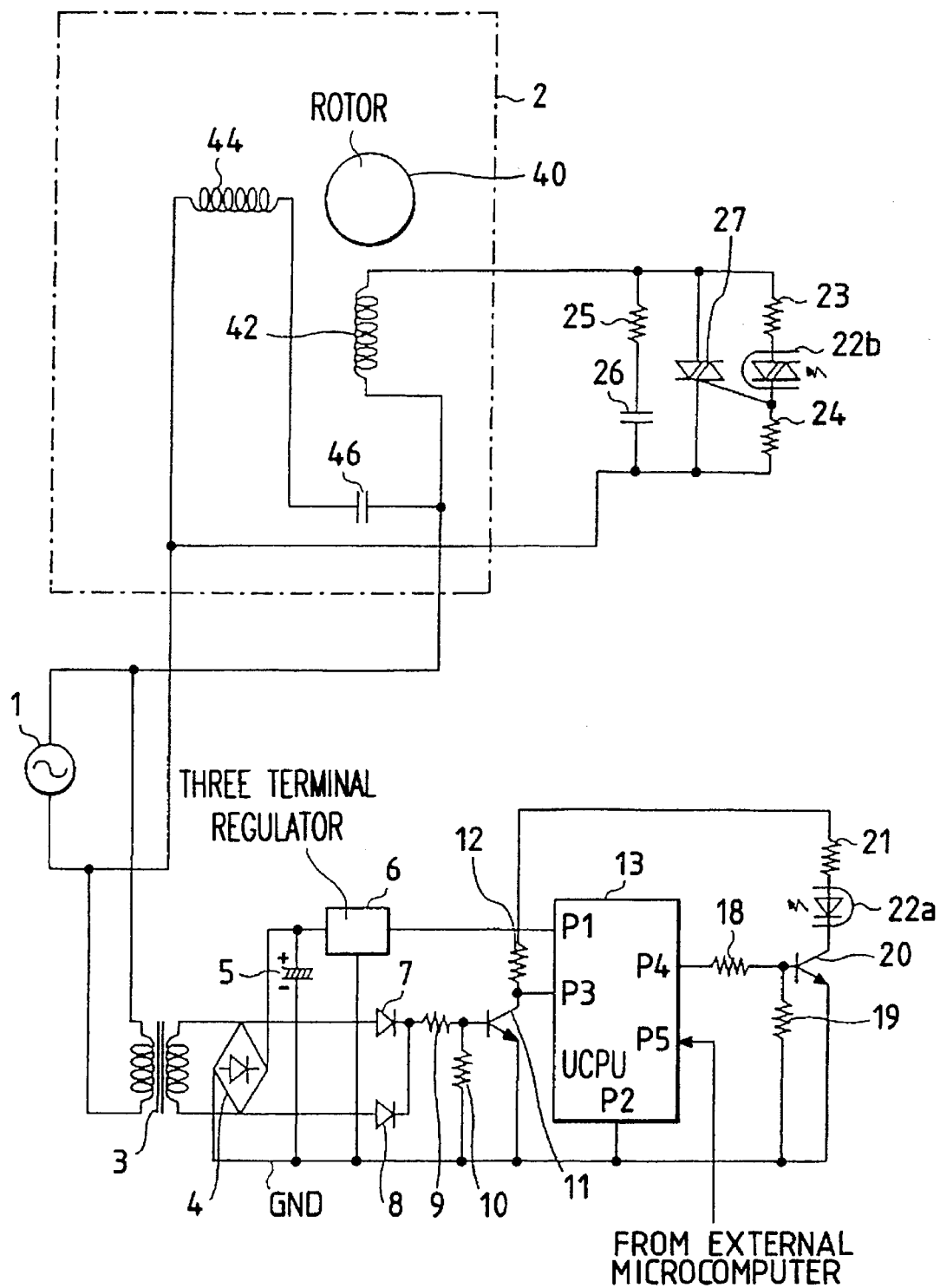
FIG. 44 shows the configuration of a control circuit according to Example 5 of the invention.

FIG. 44 shows the configuration of a circuit for controlling a fan motor according to still another example of the invention.

Operational details of detection as to whether the voltage applied to the main winding 42 is zero-crossing or not and those of control over energization or de-energization of the main winding 42 by means of turning on or off the triac 27 are the same as described hereinabove.

Figure 45:
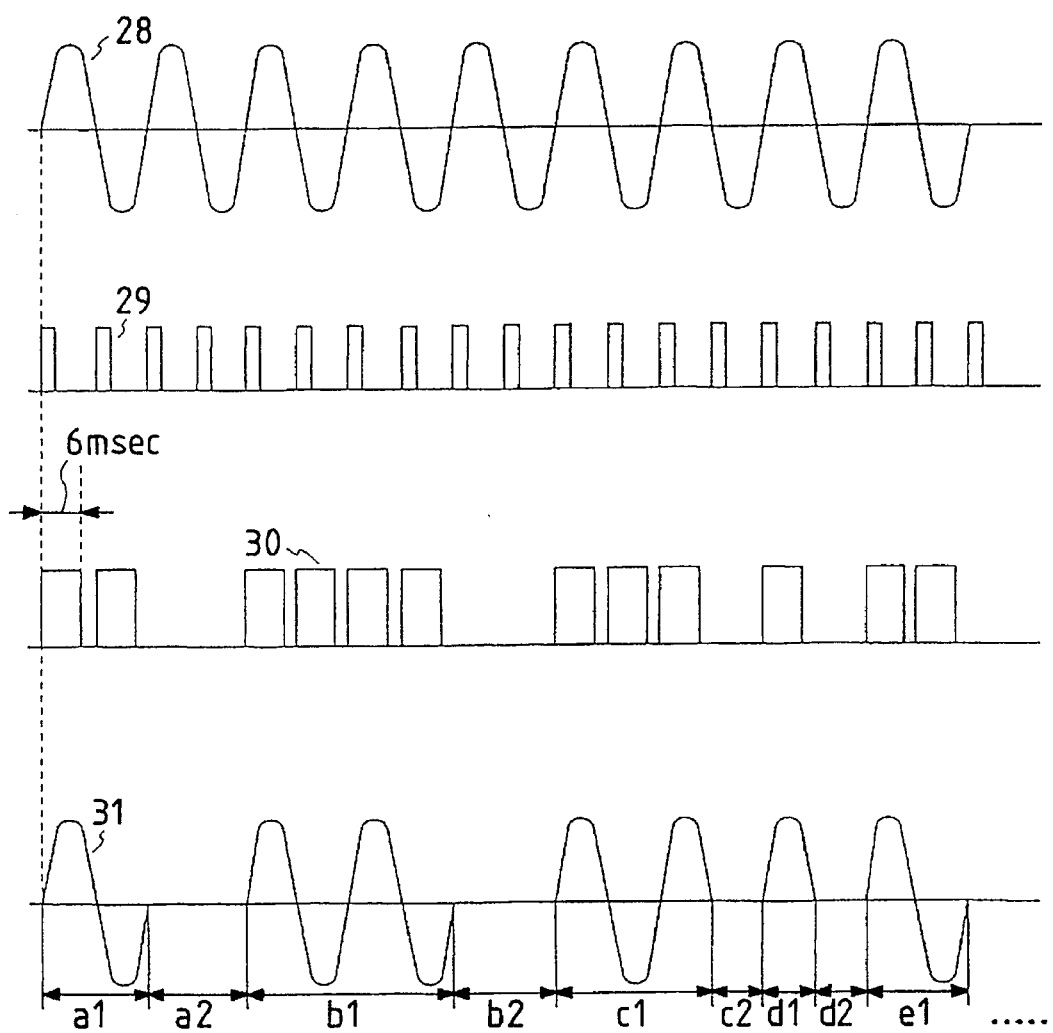
FIG. 45 shows waveforms that are produced when a fan motor is energized in Example 5 of the invention.

FIG. 45 shows waveforms that are produced when the fan motor is energized by performing control according to the example under consideration as can be implemented by the circuit shown in FIG. 44. Referring to FIG. 45, numeral 28 indicates the waveform of a source voltage; 29 indicates the waveform of a zero-crossing signal supplied at input terminal P3 of microcomputer 13 and this input waveform is identical to what is obtained in the prior art; numeral 30 indicates the waveform of an output as produced at output terminal P4 of microcomputer 13; and numeral 31 indicates the waveform of a current flowing through the fan motor. In the example under consideration, ON and OFF cycles are to be counted in numbers that are integral multiples of one half the power source period.

Microcomputer 13 counts the number of cycles by means of the zero-crossing signal already described above and the way it delivers outputs is as follows: it switches the output terminal P4 from "L" to "H" in synchronism with the zero-crossing signal and, when a predetermined time lapses thereafter, the microcomputer switches the output terminal P4 from "H" to "L".

The process will now be described more specifically, assuming the case where the main winding 42 is to be energized through a given number of cycles. First, the output terminal P4 is switched from "L" to "H" in synchronism with the zero-crossing signal. When a specified time, say, 6 msec, passes thereafter, the output terminal P4 is switched from "H" to "L". The time interval of "6 msec" is determined with a built-in timer in the microcomputer 13. The zero-crossing signal is produced at a period of either 8.3 msec (when the source frequency is 60 Hz) or 10 msec (when the source frequency is 50 Hz) and, therefore, when 2.3 msec or 4 msec lapses after the output terminal P4 was switched from "H" to "L", the zero-crossing signal is again fed into the microcomputer 13; in synchronism with this entry, the output terminal P4 is again switched from "L" to "H" and, 6 msec thereafter, P4 is switched from "H" to "L". Such pulse outputs are successively delivered through the required number of energization cycles. As already mentioned, the gate of triac 27, is triggered in response to the "H" signal at the output terminal P4. As already mentioned, the gate trigger signal turns off in 6 msec but the triac gate is re-triggered each time the zero-crossing signal occurs; hence, as long as the output pulse from the terminal P4 remains "H", triac 27 is conducting and the main winding 42 is energized. To de-energize the main winding 42, one may hold the output terminal P4 at "L" level even if the zero-crossing signal is entered. The number of OFF cycles is counted by the zero-crossing signal.

In order to provide the fan motor 2 with the number of revolutions that is determined by control factors such as the temperature of the heat exchanger in an air conditioner, the microcomputer 13 randomly changes the energization or de-energization time, thereby producing the desired number of revolutions; this method differs from the already-described method which determines the timings of ON and OFF cycles in accordance with specified patterns in a memory map. Random data are stored in the form of a lookup table in a memory and special means is provided for successively reading the data.

The auxiliary winding 44 is energized at all times. The percent energization $\alpha$ is calculated by the following formula as in the prior art:

$$\alpha = \frac{1}{2}(\text{Non}/(\text{Non}+\text{Noff})+1) \times 100 (\%)$$

where Non is the number of ON cycles and Noff is the number of OFF cycles.

Figure 46:
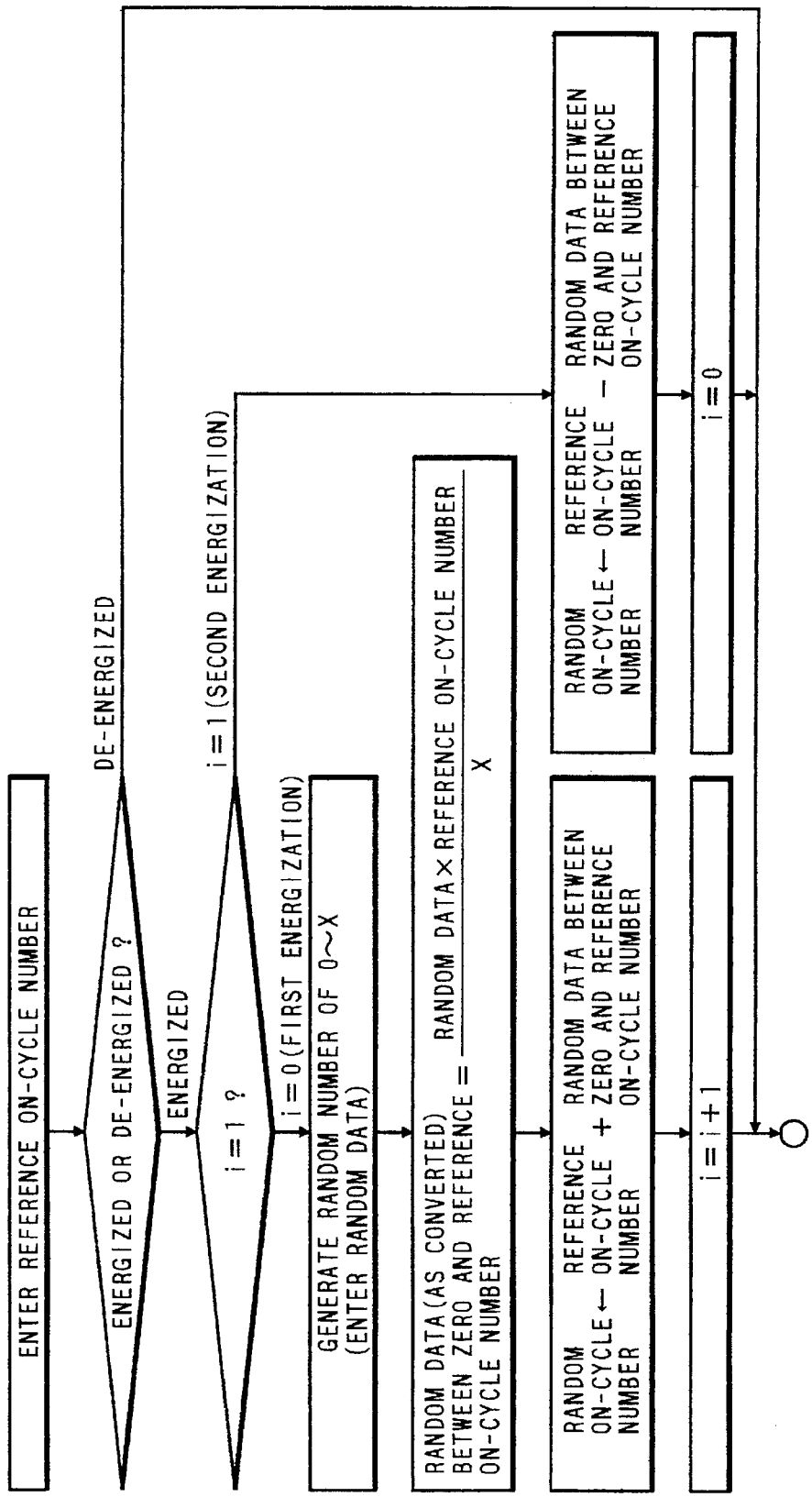
FIG. 46 is a flowchart describing means for controlling the randomly changing energization time in Example 5 of the invention.
Figure 47:
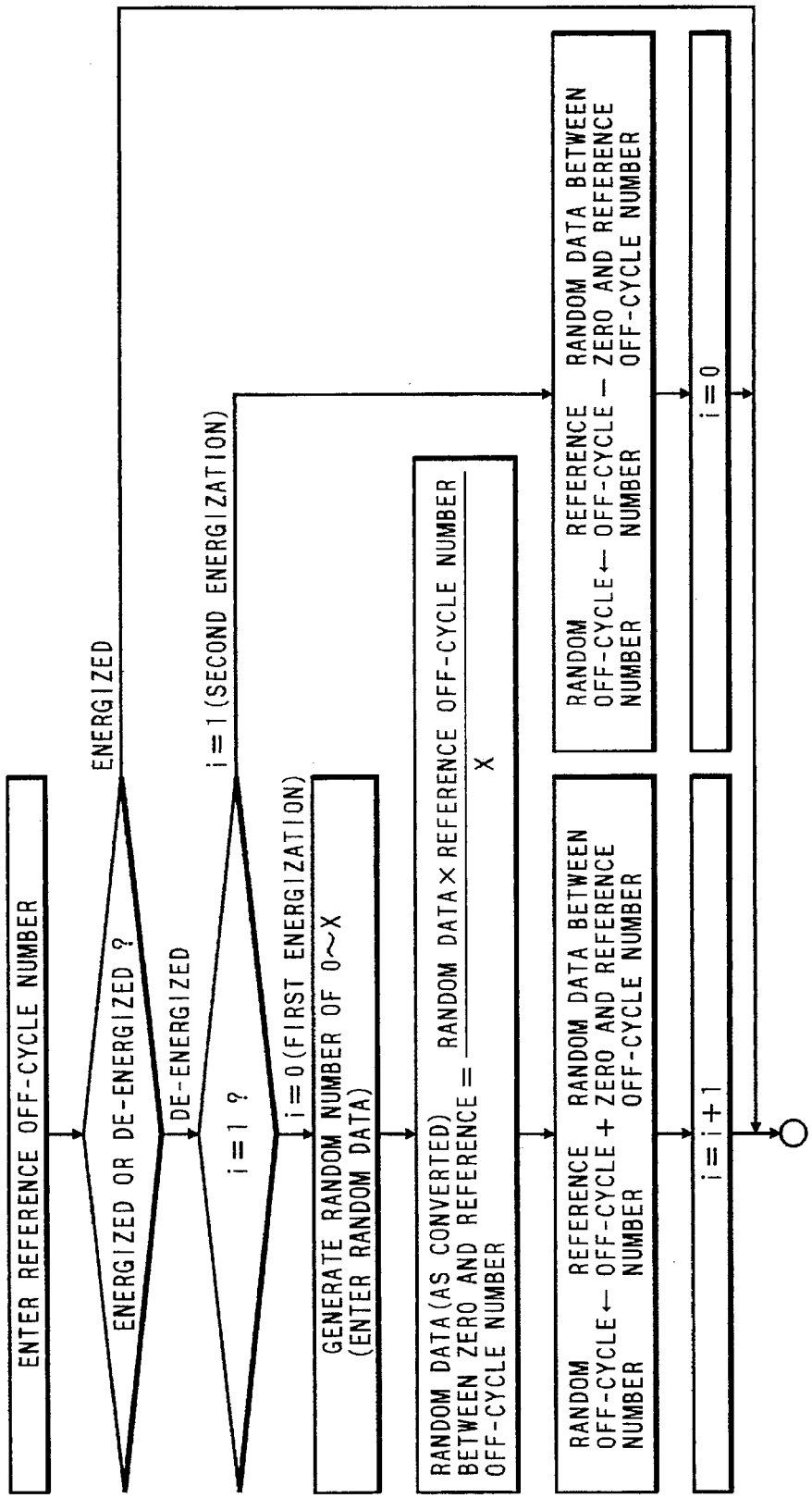
FIG. 47 is a flowchart describing means for controlling the randomly changing de-energization time in Example 5 of the invention.
Figure 48:
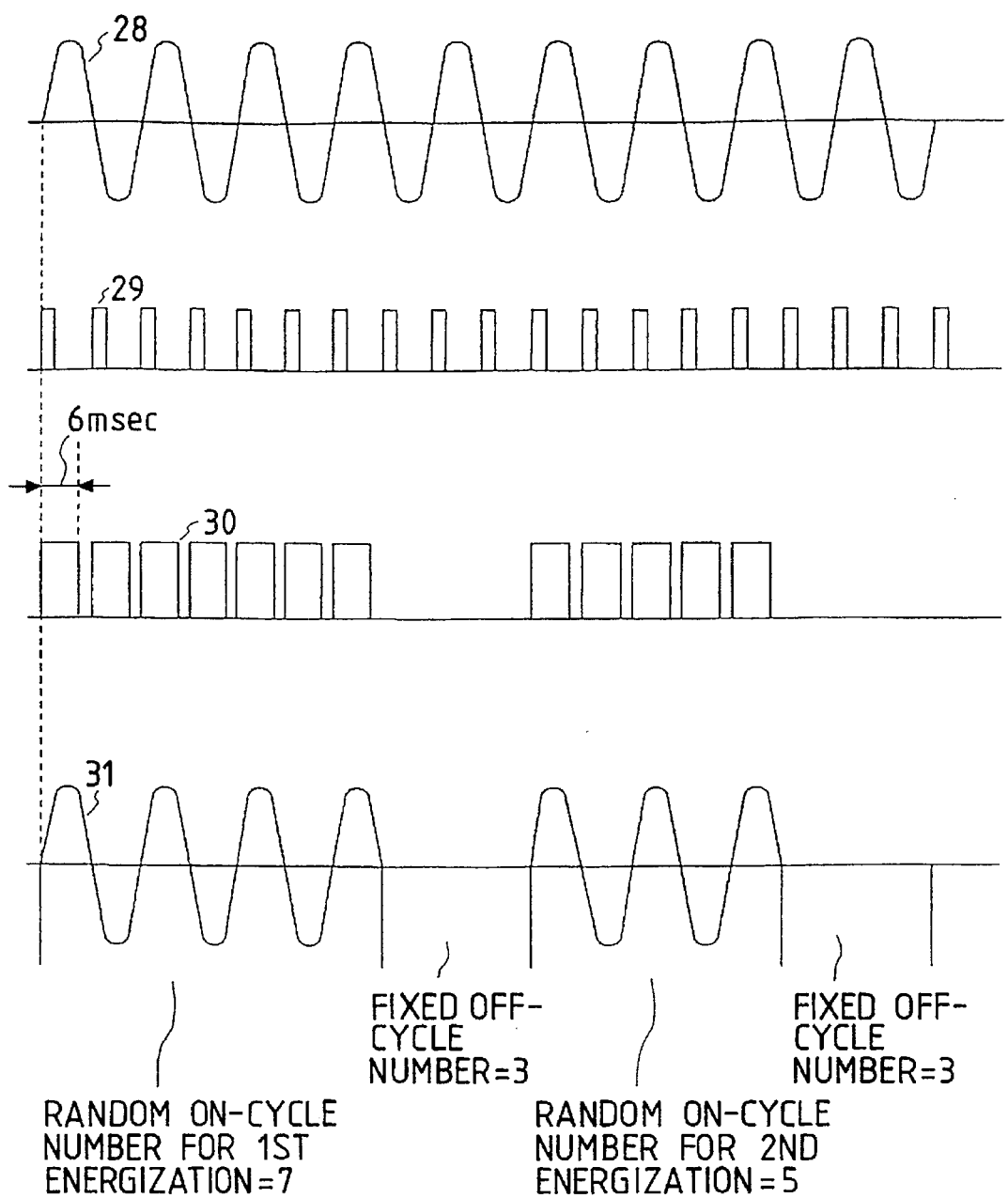
FIG. 48 shows the waveforms that are produced when a fan motor is energized with the randomly changing energization time being controlled by the means described in FIG. 46.

FIG. 46 is a flowchart describing means for computing the number of ON cycles as it changes randomly; FIG. 47 is a flowchart describing means for computing the number of OFF cycles as it changes randomly; and FIG. 48 shows the waveforms that are produced when the fan motor is energized in the case described below.

The flowchart shown in FIG. 46 is first described, assuming the case where the number of OFF cycles is fixed. The process starts with entering a reference number of ON cycles that is necessary for attaining a desired percent energization. A random number ranging from zero to X is generated once out of two instances of energization to produce random data, which is converted to a numeric value ranging from zero to the reference number of ON cycles. In the first instance of energization, the reference ON-cycle number is added to the random data which has been converted to a numeric value ranging from zero to the reference ON-cycle number, whereby the randomly changing number of ON cycles is computed. In the second instance of energization, the random data which has been converted to a numeric value ranging from zero to the reference ON cycle number is subtracted from the reference ON-cycle number, whereby the randomly changing number of ON cycles is computed. Hence, the average of the ON-cycle numbers for the two instances of energization gives the number of cycles necessary to produce the desired percent energization. Random data that has been generated once out of two instances of energization is converted to a numeric value ranging from zero to the reference ON-cycle number because if the reference ON-cycle number (A) is smaller than the random data (B), the result of subtraction of B from A takes a negative value and the desired percent energization is not attainable. To avoid this problem, the random data is converted to a numeric value ranging from zero to the reference ON-cycle number.

Take, for example, the case where the number of OFF cycles is fixed at 3 and the number of ON cycles necessary to produce a desired percent energization is 6. Also suppose that a random number ranging from zero to ten is generated to give random data 3. Converting this random data to a numeric value in the range from zero to the reference ON-cycle number (6) gives:

Random data from 0 to 6=3×6/10=1.8

Neglecting the decimal fraction, we obtain 1. Therefore, to compute the randomly changing number of ON cycles for the first instance of energization, the reference ON-cycle number is added to the random data ranging from zero to the reference ON-cycle number (6), giving:

6+1=7

To compute the randomly changing number of ON cycles for the second instance of energization, the random data ranging from zero to the reference ON-cycle number (6) is subtracted from the reference ON-cycle number, giving:

6−1=5

By repeating this procedure, the desired percent energization is achieved from the constantly randomly changing number of ON cycles.

If the number of ON cycles is fixed, the flowchart shown in the FIG. 47 is used to compute the randomly changing number of OFF cycles in essentially the same manner as described above and the procedure is repeated to achieve the desired percent energization from the constantly randomly changing number of OFF cycles.

EXAMPLE 6

Figure 50:
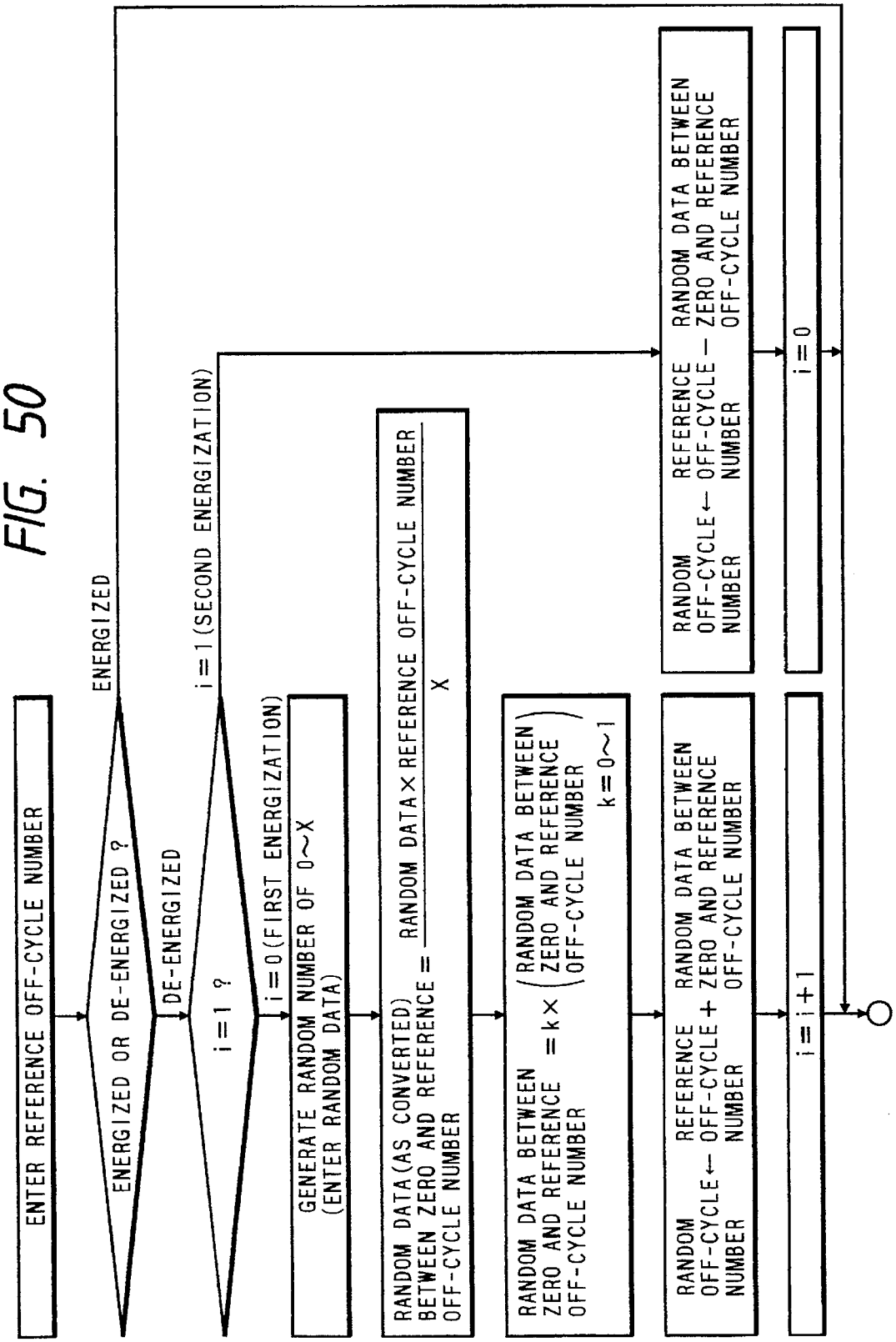
FIG. 50 is a flowchart describing means for controlling the randomly changing de-energization time in Example 6 of the invention.
Figure 51:
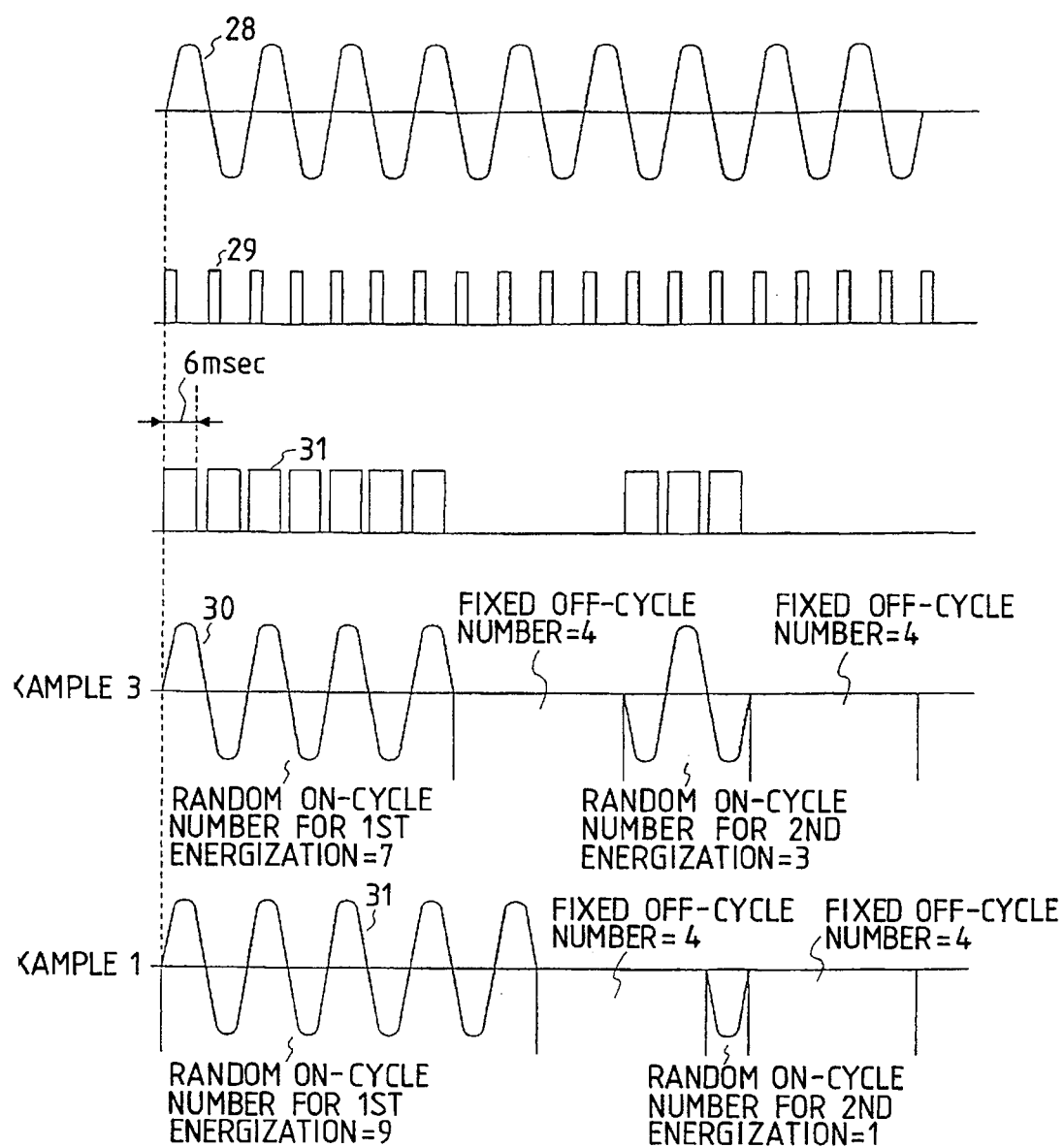

FIG. 49 is a flowchart describing an example in which the de-energization time is fixed; FIG. 50 is a flowchart describing an example in which the energization time is fixed; and FIG. 51 shows the waveforms that are produced when the fan motor is energized in the case described below.

Referring to FIG. 49 (or 50), random data as generated once out of two instances of energization (or de-energization) is multiplied by a coefficient k so as to vary the effect of random numbers. The randomly changing number of ON (or OFF) cycles is computed by adding the reference number of ON (or OFF) cycles to the random data or subtracting the latter from the former. Therefore, if the random data is greater than the reference number of ON (or OFF) cycles, the result of subtraction gives a negative value and a desired percent energization is not attainable. To avoid this problem, the coefficient k by which the random data is multiplied is selected from the range between 0 and 1 so that the result of subtraction will not give a negative value. An appropriate value of the coefficient k is selected by a plurality of switches or some other suitable means.

Consider, for example, the case where the number of OFF cycles is fixed at 4 and the number of ON cycles necessary for attaining a desired percent energization is 5. Also suppose that a random number ranging from 0 to 10 is generated to give random data 8. Converting this random data to a numeric value in the range from zero to the reference ON-cycle number (5) gives:

Random data from 0 to 5=8×5/10=4.0

If the procedure of Example 5 is followed, the randomly changing number of ON cycles is calculated as 5+4=9 for the first instance of energization and as 5−4=1 for the second instance of energization. In Example 6, the converted random data (4) is multiplied by a certain value of k, say, 0.5 to give:

4×0.5=2.0

In order to compute the randomly changing number of ON cycles for the first instance of energization, the reference number of ON cycles is added to the new random data (2.0) to give:

5+2=7

In order to compute the randomly changing number of ON cycles for the second instance of energization, the new random data is subtracted from the reference number of ON cycles to give:

5−2=3

Thus, the effect of random numbers can be varied. It should be noted that the value 0.5 is just an example of coefficient k and this may be of any value between 0 and 1 that can conveniently be selected by a plurality of switches or some other suitable means.

EXAMPLE 7

If the percent energization is high, there are not many patterns for the appearance of random numbers. Consider, for example, the case where the number of ON cycles is fixed at 4 whereas the number of OFF cycles necessary for attaining a desired percent energization is 1. In this case, random data for computing the randomly changing number of OFF cycles is either 0 or 1 and the patterns for the appearance of random numbers are limited. Then, the patterns of ON and OFF cycles become nonmonotonous to potentially produce noise and vibrations. Under the circumstances, the numbers of ON and OFF cycles are multiplied by an integer, say, 3 so that the number of ON cycles is increased to 12 whereas the number of OFF cycles is increased to 3 and the number of patterns for the appearance of random data for computing the randomly changing number of OFF cycles is increased from 0 to 3, thereby preventing the patterns of ON and OFF from becoming nonmonotonous.

This method of control is effective in increasing the number of patterns of the appearance of random data for computing the randomly changing number of OFF cycles but, at the same time, the number of ON cycles is also increased and the $2f$ torque pulsation becomes overt to produce $2f$ magnetic sounds. Therefore, the integer by which the numbers of ON and OFF cycles are to be multiplied should be such that the $2f$ torque pulsation will not become overt. If necessary, the multiplication factor may be varied in the process of control.

The randomly changing number of ON cycles, or the random ON-cycle number, may be expressed by a single equation (A×reference ON-cycle number)±k×H, where H is converted random data and expressed by Random data×(A× reference ON-cycle number)/X. The random ON-cycle number takes a positive value for the first instance of energization and a negative value for the second instance of energization. In the equation, symbol A corresponds to integer 3 for multiplication in Example 7 and k is a coefficient that corresponds to 0.5 in Example 6. If the random data is a numeral between 0 and 10, X=10. The cases where A=1 and k=1 in the equation are described in Examples 5, 8 and 9.

As is clear from the equation, coefficient k in Example 6 differs from the integer for multiplication in Example 7. Integer A is a numeric value by which the reference ON-cycle number per se is multiplied whereas coefficient k is a numeric value by which the converted random data is multiplied. The same explanation applies to the computation of the random OFF cycle number.

For the same purpose of varying the effect of random numbers but without causing unduly great variations in the random ON- or OFF-cycle number, coefficient k may be rendered variable. If A×reference ON-cycle number= converted random data and k=1 in the equation of interest, the random ON-cycle number for the first instance of energization is equal to 2×(A×reference ON-cycle number) whereas the random ON-cycle number for the second instance of energization is equal to zero. If the reference ON-cycle number is small, the difference between the two values of the random ON-cycle number is not great but as the reference ON-cycle number increases, the difference also increases to potentially result in the development of noise. Under the circumstances, k is so adjusted as to reduce the difference between the random ON-cycle numbers for the first and second instances of energization.

It should, however, be remembered that there is no knowing whether the difference between the random ON-cycle numbers for the first and second instances of energization will have any effect on the possibility of noise production when a motor is actually run and that, therefore, the value of k should be properly adjusted by a suitable method such as preliminary testing. This is also true with A and there is no knowing how the possibility of noise production will be affected by varying the value of A; hence, the value of A should also be adjusted by a suitable method such as preliminary testing.

EXAMPLE 8

FIGS. 52 and 53 are flowcharts describing an embodiment in which both energization and de-energization times are changed randomly; FIG. 54 shows the waveforms that are produced when the fan motor is energized in the case described below.

In FIGS. 52 and 53, the numbers of ON and OFF cycles are not fixed but are varied randomly. Stated more specifically, random numbers are generated once out of two instances each of energization and de-energization. The randomly changing ON-cycle numbers for the first and second instances of energization are computed from the random data as generated during the energization period. At the same time, the randomly changing OFF-cycle numbers for the first and second instances of de-energization are computed from the random data as generated during the de-energization period.

Consider, for example, the case where the reference ON-cycle number for attaining a desired percent energization is 6 whereas the reference OFF-cycle number is 3. First, a random number ranging from 0 to 10 is generated during energization to give random data 7. Converting this random data to a numeric value in the range from zero to the reference ON-cycle number (6) gives:

Random data from 0 to 6=7/6/10=4.2

Neglecting the decimal fraction, we obtain 4. Therefore, to compute the randomly changing ON-cycle number for the first instance of energization, the reference ON-cycle number is added to the random data ranging from zero to the reference ON-cycle number (6), giving:

6+4=10

To compute the randomly changing ON-cycle number for the second instance of energization, the random data ranging from zero to the reference ON-cycle number (6) is subtracted from the reference ON-cycle number, giving:

6−4=2.

By repeating this procedure, the constantly randomly changing ON-cycle number is obtained.

In the next step, a random number ranging from 0 to 10 is generated during de-energization to give random data 4. Converting this random data to a numeric value in the range from zero to the reference OFF-cycle number (3) gives:

Random data from 0 to 3=4×3/10=1.2

Neglecting the decimal fraction, we obtain 1. Therefore, to compute the randomly changing OFF-cycle number for the first instance of de-energization, the reference OFF-cycle number is added to the random data ranging from zero to the reference OFF-cycle number (3), giving:

3+1=4

To compute the randomly changing OFF-cycle number for the second instance of de-energization, the random data ranging from 0 to 3 is subtracted from the reference OFF-cycle number, giving:

3−1=2

By repeating this procedure, the constantly randomly changing OFF-cycle number is obtained.

In this way, the desired percent energization is attained from the randomly changing ON- and OFF-cycle numbers.

EXAMPLE 9

FIG. 55 is a flowchart describing the process of control based on the combination of a randomly changing ON-cycle number and a reference ON-cycle number; FIG. 56 is a flowchart describing the process of control based on the combination of a randomly changing OFF-cycle number and a reference OFF-cycle number; and FIG. 57 shows the waveforms that are produced when the fan motor is energized in the case described below.

Referring to FIG. 55, the number of OFF cycles is fixed and a reference ON-cycle number for attaining a desired percent energization is entered. A random number ranging from 0 to X is generated once out of four instances of energization to produce random data, which is converted to a numeric value ranging from zero to the reference number of ON cycles. In the first instance of energization, the reference number of ON cycles is added to the random data which has been converted to a numeric value ranging from one to the reference ON-cycle number, whereby the randomly changing number of ON cycles is computed. In the second instance of energization, the reference ON-cycle number is delivered as an output. In the third instance of energization, the random data which has been converted to a numeric value ranging from one to the reference ON-cycle number is subtracted from the reference ON-cycle number, whereby the randomly changing number of ON cycles is computed. In the fourth instance of energization, the reference ON-cycle number is delivered as an output. Thus, the control means used in Example 5 is combined with the reference ON-cycle number to attain the desired percent energization.

This is also true with the flowchart shown in FIG. 56, except that the number of ON cycles is fixed and a reference OFF-cycle number for attaining a desired percent energization is entered. The randomly changing OFF-cycle number is computed and combined with the reference OFF-cycle number to attain the desired percent energization.

Take, for example, the case where the number of OFF cycles is fixed at 3 and the number of ON cycles necessary to attain a desired percent energization is 4. Random numbers ranging from 0 to 10 are generated to give random data 6. Converting this random data to a numeric value in the range from zero to the reference ON-cycle number (4) gives:

$$\text{Random data from 0 to } 4 = 6 \times \tfrac{4}{10} = 2.4$$

Neglecting the decimal fraction, we obtain 2. Therefore, to compute the randomly changing ON-cycle number for the first instance of energization, the reference ON-cycle number is added to the random data ranging from zero to the reference ON-cycle number (4), giving:

$$4 + 2 = 6$$

In the second instance of energization, the reference ON-cycle number (4) is delivered as an output. In the third instance of energization, the random data ranging from zero to the reference ON-cycle number (4) is subtracted from the reference ON-cycle number, giving:

$$4 - 2 = 2$$

In the fourth instance of energization, the reference ON-cycle number (4) is delivered as an output. By repeating this procedure, the desired percent energization is attained from the randomly changing number of ON cycles.

EXAMPLE 10

FIG. 58 shows the configuration of a circuit for controlling the rotational speed of a motor by means of providing taps on a winding. As shown in FIG. 58, the rotational speed of a motor can be controlled by switching between taps that are provided on an auxiliary winding 44 on the motor. If the percent energization is low, increased vibrations will occur and, hence, the rotational speed of the motor is controlled by switching from one tap to another as shown in FIG. 58. If this design is combined with either one of the methods described in Examples 5 to 9, a desired percent energization is attained by non-steady cycles so as to reduce the effects of noise and vibrations.

The foregoing description of the preferred examples of the invention assumes that switching is done by a thyristor and that the start and end of energization are timed in synchronism with the zero-crossing signal. However, the invention is in no way limited to this particular case and, as will be apparent from the foregoing description, all that is needed is a circuit configuration that changes the ratio between the numbers of energization and de-energization cycles so as to select an appropriate percent energization, thereby changing the rotational speed of a motor.

The foregoing description also assumes that random numbers are generated once out of two instances of energization and a desired percent energization is calculated from the average for the two instances of energization; alternatively, random numbers are generated once out of four instances of energization and the average for the four instances is taken. It should, however, be noted that the base time for the generation of random numbers is in no way limited and all that is need is to attain a desired percent energization by averaging without using fixed patterns. Alternatively, a plurality of patterns that produce similar values of percent energization may be provided for random selection.

In short, the present invention is basically a motor drive unit that includes a zero-crossing voltage detector circuit for detecting whether the voltage from an AC power supply is zero-crossing and a switching circuit for performing on-off control by suitable means such as a thyristor, a triac or a solid-state relay so as to switch between energization and de-energization of the AC power supply to a motor and which controls the speed of the motor by changing the ratio between the times of energization and de-energization of the AC power supply to the motor. The drive unit starts energization in synchronism with the zero-crossing of the AC supply voltage and ends the energization in synchronism with the zero-crossing of an energization current by suitable means such as a thyristor, a triac or a solid-state relay; in addition, the energization or de-energization time is allowed to vary randomly in units that are integral multiples of one half the power supply period so that patterns of energization or de-energization are sufficiently offset to disperse the base frequency, thereby reducing noise and vibrations.

In a preferred embodiment, means is provided for insuring that the energization or de-energization time is controlled randomly in such a way that an overall percent energization will be a desired value; according to the means, random numbers are generated at a specified frequency, say, once out of two instances of energization or de-energization to produce random data, which is converted to a numeric value ranging from zero to either an energization or de-energization time that corresponds to the desired percent energization and the thus converted random data is added to the desired percent energization, thereby determining the randomly changing energization or de-energization time. In the next instance of energization or de-energization, the converted random data is subtracted from the energization or non-energization time which corresponds to the desired percent energization, thereby determining the randomly changing energization or de-energization time.

In another preferred embodiment, the random data as converted to a numeric value ranging from zero to either an energization or de-energization time that corresponds to the desired percent energization is multiplied by a coefficient and this contributes to render the effect of random numbers variable so that their effects on the production of noise and vibrations can be easily estimated.

If the desired percent energization is high, both energization and de-energization times are multiplied by an integer so as to increase the number of patterns for the appearance of random numbers; this is effective in rendering the patterns of energization and de-energization to be sufficiently non-monotonous to disperse the base frequency.

Advantages of the Invention:

As described on the foregoing pages, the invention relates to a motor drive unit that includes a zero-crossing voltage detector circuit for detecting whether the voltage from an AC power supply is zero-crossing and a switching circuit for performing on-off control so as to switch between energization and de-energization of the AC power supply to a motor and which controls the speed of said motor by changing the ratio between the times of energization and de-energization of the AC power supply to said motor and it is characterized in that the timing of start of energization is allowed to coincide with the timing of zero-crossing of said AC power supply voltage whereas the timing of end of energization is allowed to coincide with the zero-crossing of an energization current and further that said energization time is fixed at a value either equal to or twice the power supply period whereas said de-energization time is varied in units that are integral multiples of one half said power supply period. Since the ON cycles can be fixed at a smaller cycle number, the 2f torque pulsations can be damped. Additionally, by reducing the number of ON cycles, the fundamental frequency of ON-OFF cycles can be set at a sufficiently high value to suppress the amplitude of vibrations caused by the vibrational force that develops upon ON-OFF operations; hence, bumping vibrations that would otherwise occur due to the rattling of the mechanical structure can be eliminated to suppress the occurrence of abnormal sounds.

Also, according to the invention, a plurality of patterns for percent energization that are attained by varying the de-energization time in units that are integral multiples of one half the power supply period while fixing the energization time at a value either equal to or twice said power supply period are combined to attain a desired percent energization and this technique is effective for controlling the motor speed in a fine manner.

Further, the invention relates to a motor drive unit that includes a zero-crossing voltage detector circuit for detecting whether the voltage from an AC power supply is zero-crossing and a switching circuit for performing on-off control so as to switch between energization and de-energization of the AC power supply to a motor and which controls the speed of said motor by changing the ratio between the times of energization and de-energization of the AC power supply to said motor and it is characterized in that the timing of energization is allowed to coincide with the timing of zero-crossing of said AC power supply voltage whereas the timing of end of energization is allowed to coincide with the zero-crossing of an energization current and further that a plurality of patterns that are equal in the ratio between said energization and de-energization times are used in combination. Since this technique is effective in dispersing the fundamental frequency of ON-OFF cycles, the continual sound that occurs due to repeated ON-OFF operations are at frequencies near 10 Hz can be attenuated. Dispersing the fundamental frequency of ON-OFF cycles is also effective in dispersing the dominance of a specific frequency in torque pulsations, thereby attenuating the development of unwanted magnetic sound.

Further, in the invention, the motor is a single-phase capacitor motor having the main winding and an auxiliary winding that is to be energized via a capacitor and the ratio between the time of energization of said main winding from the AC power supply and the time of de-energization is varied; hence, the abnormal "tapping" sound which occurs when the motor shaft is significantly vibrated during the turning on or off of the energization can be attenuated.

Further, according to the invention, the 2f torque pulsations that occur to the motor can be reduced, whereby the development of noise and vibrations during motor running can be suppressed.

Further, according to the invention, jarring continual sounds that occur to the motor can be attenuated.

Further, according to the invention, the motor can be operated in a more finely controlled manner.

Further, according to the invention, the fundamental frequency of ON-OFF cycles is sufficiently dispersed to reduce the development of noise and vibrations.

Further, according to the invention, the overall system consisting of a motor and a drive unit can be manufactured at low cost.

Further, according to the invention, a system that is most environment friendly can be manufactured.

Further, according to the invention, a fan unit can be manufactured that is quiet even if it rotates at high speed.

Further, according to the invention, there is provided a fan unit that is quiet and that will not produce any jarring sounds.

Further, according to the invention, one can produce a quiet fan unit of a simple construction.

Further, according to the invention, one can produce a quiet fan unit of an inexpensive construction.

Further, according to the invention, noise and vibrations that are caused by an axial force can be suppressed.

Further, according to the invention, the base frequency for operations that are to be performed in fixed patterns can be sufficiently dispersed to reduce noise and vibrations.

Further, according to the invention, the fundamental frequency of ON-OFF cycles can be sufficiently dispersed to reduce noise and vibrations.

Further, according to the invention, noise and vibrations can be attenuated by a simple method.

Further, according to the invention, the base frequency can be dispersed in a positive and yet simple manner.

Further, according to the invention, the base frequency can be further dispersed by a simple method.

Further, according to the invention, the base frequency can be dispersed even if high percent energization is to be attained.

Further, according to the invention, the base frequency can be further dispersed by randomly changing both energization and de-energization cycles or times.

Further, according to the invention, noise and other abnormal sounds can be effectively prevented.

Further, according to the invention, vibrations can be effectively suppressed over the entire frequency range including low values.

What is claimed is:

1. A motor drive unit, comprising:

an AC power supply;

a zero-crossing voltage detector circuit for detecting when a voltage from the AC power supply is zero-crossing; and a switching circuit for performing on-off control to switch between energization and de-energization of the AC power supply to a motor to control a speed of said motor by changing the ratio between periods of energization and de-energization of the AC power supply to said motor;

wherein the switching circuit performs on-off control so that a start of energization coincides with a zero-crossing of said AC power supply voltage, an end of energization coincides with a zero-crossing of an energization current of said switching circuit, values of percent energization are attained by combining an energization period and a de-energization period, the energization period is fixed at a value either equal to or twice a power supply period for all provided values of percent energization, and the de-energization period is varied in units that are integral multiples of one half said power supply period within a range of provided values of percent energization.

2. A motor drive unit according to claim 1, further comprising:

a means for providing a plurality of patterns for generating the provided values of percent energization to the switching circuit; and wherein each of the plurality of patterns are attained by combining the de-energization period and the energization period to attain a desired percent energization.

3. A motor drive unit, comprising:

an AC power supply;

a zero-crossing voltage detector circuit for detecting when a voltage from the AC power supply is zero-crossing or not zero-crossing;

a switching circuit for performing on-off control to switch between energization and de-energization of the AC power supply to a motor to control the speed of the motor by changing a ratio between an energization period and a de-energization period of the AC power supply to said motor, the switching circuit performing on-off control so that a start of energization coincides with a zero-crossing of said AC supply voltage, and so that an end of energization coincides with a zero-crossing of an energization current provided by said switching circuit;

a means for providing a plurality of patterns for generating a desired value of percent energization, the plurality of patterns attained by combining energization and de-energization periods, wherein at least plural of the plurality of patterns have an equal ratio of energization and de-energization periods, but a different fundamental frequency at which the switching circuit is turned on or off, for the desired value of percent energization; and a means for selecting a pattern from said plurality of patterns based on the fundamental frequency, the selected pattern being selected to produce small noise or vibrations during motor operation.

4. A motor drive unit according to any one of claims 1 to 3, wherein said motor comprises a split phase capacitor motor having a main winding and an auxiliary winding that is energized via a capacitor and wherein the ratio between the period of energization of said main winding from the AC power supply and the period of de-energization is controlled.

5. A motor unit comprising:

a motor;

an AC power supply for supplying an energization current to said motor;

a switching circuit by which the energization current from said AC power supply is turned on and off so that the motor is energized and de-energized respectively; and a drive unit for controlling the turning on and off of said switching circuit to vary a ratio between energization and de-energization periods, said drive unit controlling a speed of the motor by varying the de-energization or energization period in units that are integral multiples of one half a cycle period of said AC power supply within a range of provided values of percent energization while the other period is fixed at a predetermined value that is an integral multiple of one half the cycle period of said AC power supply for all provided values of percent energization.

6. A motor unit according to claim 5, wherein said predetermined value is selected in such a way that a fundamental frequency at which the switching circuit is turned on or off is at least 15 Hz throughout a range of values of percent energization of said motor; and the range of values is greater than a threshold value.

7. A motor unit according to claim 6, further comprising:

means for providing a plurality of patterns for generating a desired value of percent energization, the plurality of patterns attained by varying the varied of said energization and de-energization periods between at least two values and combining the varied of said energization and de-energization periods with the fixed of said energization and de-energization periods.

8. A motor unit according to claim 5, further comprising:

means for providing a plurality of patterns for generating a desired value of percent energization, the plurality of patterns attained by varying the varied of said energization and de-energization periods between at least two values and combining the varied of said energization and de-energization periods with the fixed of said energization and de-energization periods, and said plurality of patterns being selectively used to attain the desired percent energization.

9. A method of controlling a motor drive unit that feeds an energization current to a motor from an AC power supply and which turns on and off the energization from said AC power supply by means of a switching circuit so that said motor is energized and de-energized, with a speed of said motor being controlled by varying a ratio between periods of energization and de-energization, comprising the steps of:

providing a plurality of patterns for generating values of percent energization by combining an energization or de-energization period which is selectably variable, within a range of provided values of percent energization, in units that are integral multiples of one half a cycle period of said AC power supply with a de-energization or energization period which is fixed at a predetermined value which is an integral multiple of one half the cycle period of said AC power supply for all provided values of percent energization;

selecting a specified pattern from said plurality of pattern; and providing the selected pattern to the switching circuit to control the speed of said motor.

10. A control method according to claim 9, further comprising the step of selecting as said specified pattern a pattern for producing small noise or vibrations during motor operation.

11. A fan unit comprising:

a fan;

a motor for driving said fan;

an AC power supply for supplying an energization current to said motor;

a switching circuit for turning on and off the energization current from said AC power supply so as to energize and de-energize said motor; and a drive unit for controlling the turning on and off of said switching circuit so as to vary a ratio between periods of energization and de-energization, said drive unit varying a speed of the motor by varying either the energization period or said de-energization period in units that are integral multiples of one half a cycle period of said AC power supply, within a range of provided values of percent energization, while the other of said energization and de-energization periods is fixed at a predetermined value that is an integral multiple of one half the cycle period of said AC power supply for all provided values of percent energization;

wherein the ratio between the energization and de-energization periods in a predetermined range of speeds to be controlled by said drive unit is set in such a way that a fundamental frequency at which said switching circuit is turned on or off lies within a predetermined range of frequencies.

12. The fan unit according to claim 11, wherein said predetermined range of frequencies is such that said fundamental frequency lies between 15 and 30 Hz.

13. A fan unit comprising:
a fan;
a motor for driving said fan;
an AC power supply for supplying an energization current to said motor;
a switching circuit for turning on and off the energization current from said AC power supply so as to energize and de-energize said motor; and
a drive unit for controlling the turning on and off of said switching circuit so as to vary a ratio between periods of energization and de-energization, said drive unit varying a percent energization of said motor by varying either the energization cycle or the de-energization cycle in units that are integral multiples of one half a cycle period of said AC power supply, within a range of provided values of percent energization, while the other of said energization and de-energization periods is fixed at a predetermined value that is an integral multiple of one half the cycle period of said AC power supply for all provided values of percent energization;
wherein the energization and de-energization periods are set in such a way that patterns for attaining a percent energization by turning said switching circuit on and off are within a range from 4 to 2 periods throughout a range of values of percent energization to be controlled by said drive unit; and
the range of values is greater than a threshold value.

14. A fan unit according to any one of claims 11 to 13, further comprising:
means for supporting the motor, said supporting means adapted to have a natural frequency of no more than 100 Hz.

15. A fan unit according to any one of claims 11 to 13, wherein an axial force is applied to a shaft of the motor.

16. A method of controlling a motor drive that feeds an energization current to a motor from an AC power supply and which turns on and off the energization current from said AC power supply by means of a switching circuit so that said motor is energized and de-energized, with a speed of said motor being controlled by varying a ratio between periods of energization and de-energization, the improvement, comprising the steps of:
changing, randomly, either the energization period or the de-energization period or both periods based on a randomly obtained numeric value for a plurality of times in units that are integral multiples of one half a power supply period so that an average of the energization and de-energization periods over said plurality of times generates a desired percent energization; and
providing the energization and de-energization periods to said switching circuit, thereby controlling the speed of said motor.

17. A method of controlling a motor drive unit that includes a zero-crossing voltage detector circuit for detecting when a voltage from an AC power supply is zero-crossing and a switching circuit for performing on-off control so as to switch between energization and de-energization of the AC power supply to a motor and which controls a speed of the motor by changing a ratio between periods of energization and de-energization of the AC power supply to said motor, the improvement, comprising the steps of:
providing a start of energization that coincides with a zero-crossing of said AC power supply voltage and an end of energization that coincides with a zero-crossing of an energization current by means of said switching circuit; and
providing a desired percent energization by changing randomly, based on a randomly obtained numeric value, either an energization period or a de-energization period or both periods in units that are integral multiples of one half a period of the power supply so that an average of the energization and de-energization periods over a plurality of times generates the desired percent energization.

18. A control method according to claim 16 or 17, further comprising the steps of:
changing, randomly, either the energization period or the de-energization period or both periods in units that are integral multiples of one half the power supply period so that an average of the energization and de-energization periods over a plurality of times generates the desired percent energization; and
providing the desired percent energization by combining the randomly obtained numeric value and a numeric value that is obtained by either adding said randomly obtained numeric value to a predetermined value or subtracting said randomly obtained numeric value from said predetermined value.

19. A control method according to claim 16 or 17, further comprising the steps of:
changing, randomly, either the energization period or the de-energization period or both periods in units that are integral multiples of one half the power supply period so that an average of the energization and de-energization periods over a plurality of times generates the desired percent energization; and
selecting the randomly obtained numeric value from among numeric values in a predetermined range.

20. A control method according to claim 16 or 17, further comprising the steps of:
selecting the randomly obtained numeric value from among numeric values in a first predetermined range;
processing the randomly obtained numeric value to be in a second predetermined range; and
changing, randomly, either the energization period or the de-energization period or both periods, in units that are integral multiples of one half the power supply period based on the processed random value so that an average of the energization and de-energization periods over a plurality of times generates the desired percent energization.

21. A control method according to claims 16 or 17, further comprising the steps of:
multiplying both the energization and de-energization periods by an integer so as to increase a number of patterns for which the randomly obtained numeric values are generated.

22. A control method according claims 16 or 17, further comprising the steps of:
controlling, randomly, both the energization and de-energization periods.

23. A motor unit comprising:
a motor;
an AC power supply for supplying an energization current to said motor;
a switching circuit by which the energization current from said AC power supply is turned on and off so that the motor is energized and de-energized; and a drive unit that controls the turning on and off of said switching circuit so as to vary a ratio between periods of energization and de-energization, said drive unit randomly changing either the energization period or the de-energization period or both periods for a plurality of times in units that are integral multiples of one half a power supply period so that an average of the energization and de-energization periods over said plurality of times generates a desired percent energization so as to control a speed of said motor; and wherein said motor is a split-phase motor having a main winding and an auxiliary winding that is energized via a capacitor.

24. A motor unit comprising:

a motor;

an AC power supply for supplying an energization current to said motor;

a switching circuit by which the energization current from said AC power supply is turned on and off so that the motor is energized and de-energized; and a drive unit that controls the turning on and off of said switching circuit so as to vary a ratio between periods of energization and de-energization, said drive unit randomly changing either the energization period or the de-energization period or both periods for a plurality of times in units that are integral multiples of one half a power supply period so that an average of the energization and de-energization periods over said plurality of times generates a desired percent energization so as to control a speed of said motor; and wherein said motor has a multi-contact tap lead connected from a winding, and said multi-contact tap lead can be selectively used depending on a value of the desired percent energization selected.

* * * * *